(12) United States Patent
Kriezman

(10) Patent No.: US 9,799,245 B2
(45) Date of Patent: Oct. 24, 2017

(54) VEHICLE PROJECTION SYSTEMS AND METHOD

(71) Applicant: Omri Kriezman, Givatayim (IL)

(72) Inventor: Omri Kriezman, Givatayim (IL)

( * ) Notice: Subject to any disclaimer, the term of this patent is extended or adjusted under 35 U.S.C. 154(b) by 0 days.

(21) Appl. No.: 15/404,885

(22) Filed: Jan. 12, 2017

(65) Prior Publication Data
US 2017/0124927 A1    May 4, 2017

Related U.S. Application Data

(62) Division of application No. 13/476,263, filed on May 21, 2012, now Pat. No. 9,584,783.

(51) Int. Cl.
| | |
|---|---|
| *G08G 1/123* | (2006.01) |
| *G08B 25/00* | (2006.01) |
| *G08B 5/24* | (2006.01) |
| *B60Q 1/00* | (2006.01) |
| *G09G 3/00* | (2006.01) |
| *H04N 9/31* | (2006.01) |
| *H04N 21/414* | (2011.01) |
| *G03B 21/60* | (2014.01) |
| *B60Q 1/50* | (2006.01) |
| *G09F 19/18* | (2006.01) |
| *G09F 21/04* | (2006.01) |

(52) U.S. Cl.
CPC ............ *G09G 3/002* (2013.01); *B60Q 1/503* (2013.01); *G03B 21/60* (2013.01); *G09F 19/18* (2013.01); *G09F 21/04* (2013.01); *H04N 9/3141* (2013.01); *H04N 21/41422* (2013.01); *G09G 2320/08* (2013.01); *G09G 2320/10* (2013.01); *G09G 2380/10* (2013.01)

(58) Field of Classification Search
CPC ....................................................... G09F 9/33
See application file for complete search history.

(56) References Cited

U.S. PATENT DOCUMENTS

| | | | | |
|---|---|---|---|---|
| 7,750,795 | B2* | 7/2010 | Nagata | B60K 35/00 116/54 |
| 8,542,108 | B1* | 9/2013 | Izdepski | G09G 5/00 340/438 |
| 2006/0202501 | A1* | 9/2006 | Tadakamalla | B60J 1/2016 296/97.8 |
| 2013/0179811 | A1* | 7/2013 | Nagara | G06F 3/0304 715/765 |

* cited by examiner

*Primary Examiner* — Joseph Feild
*Assistant Examiner* — Pameshanand Mahase
(74) *Attorney, Agent, or Firm* — Sughrue Mion, PLLC

(57) ABSTRACT

A system for displaying visually sensible patterns onto a surface of a vehicle including a display control subsystem responsive to an operational state of the vehicle, and a display device, operative in response to an input from the display control subsystem, to display a visually sensible pattern onto the surface. Preferably, the visually sensible pattern is visible from the exterior of the vehicle.

20 Claims, 46 Drawing Sheets

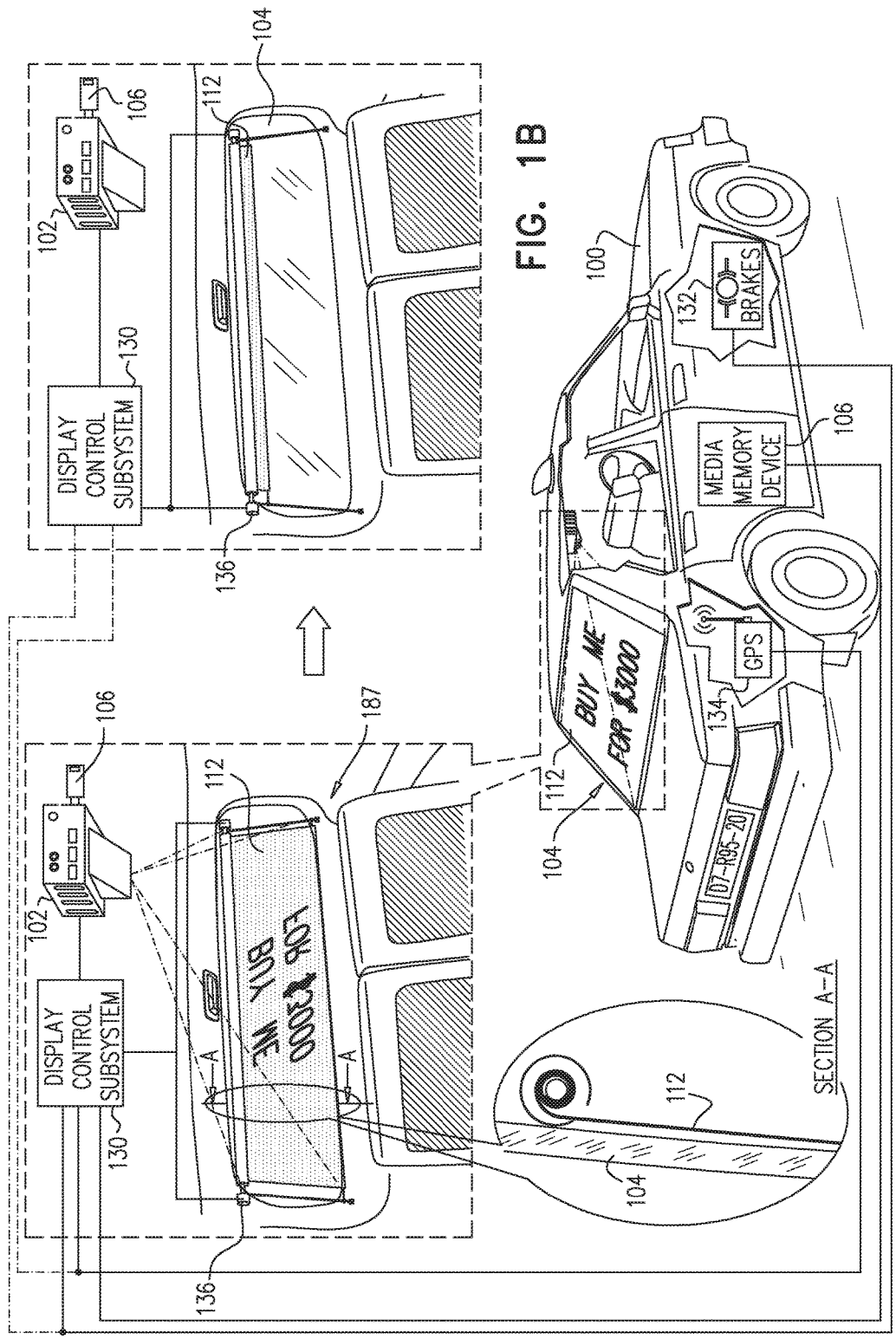

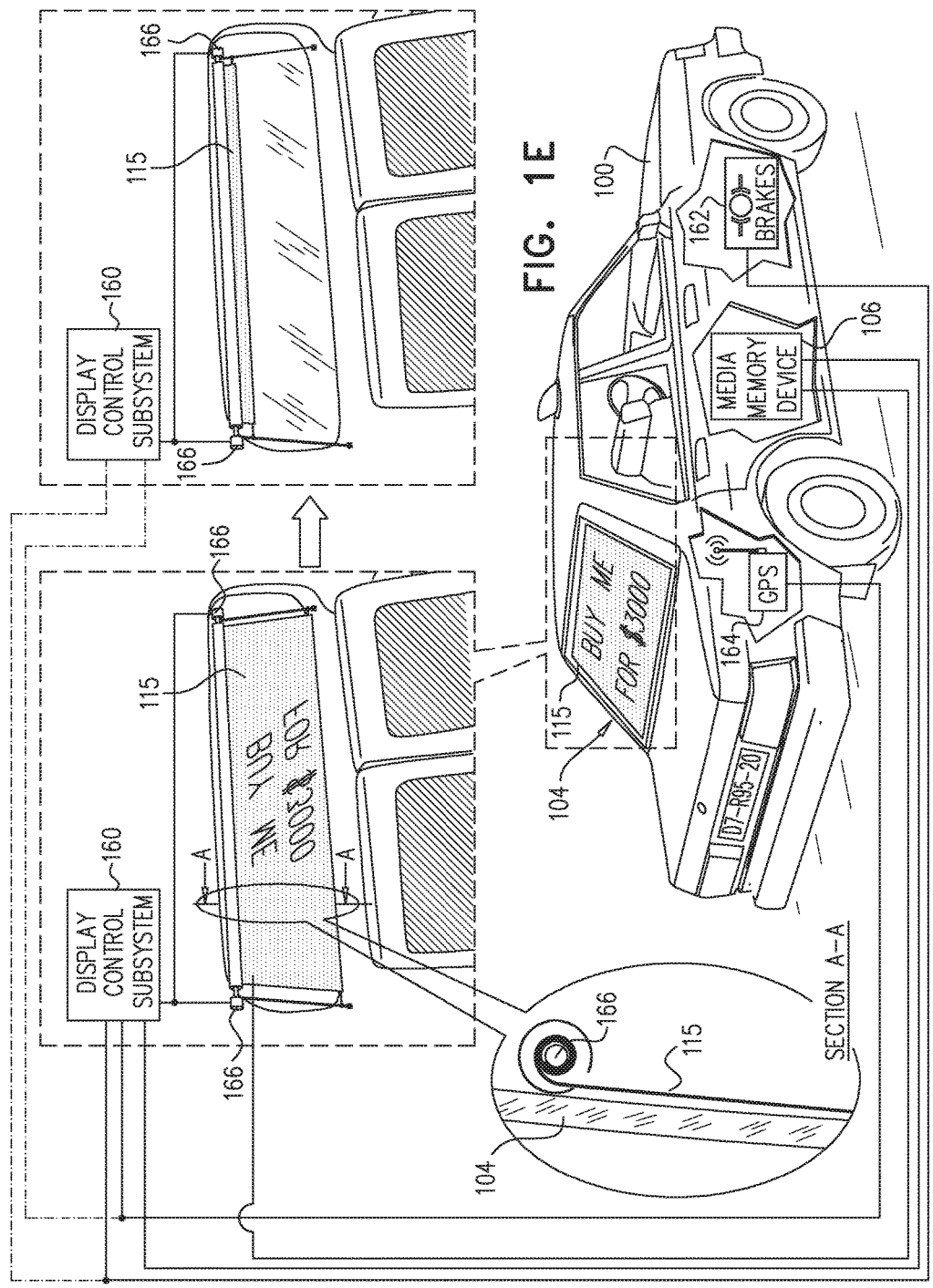

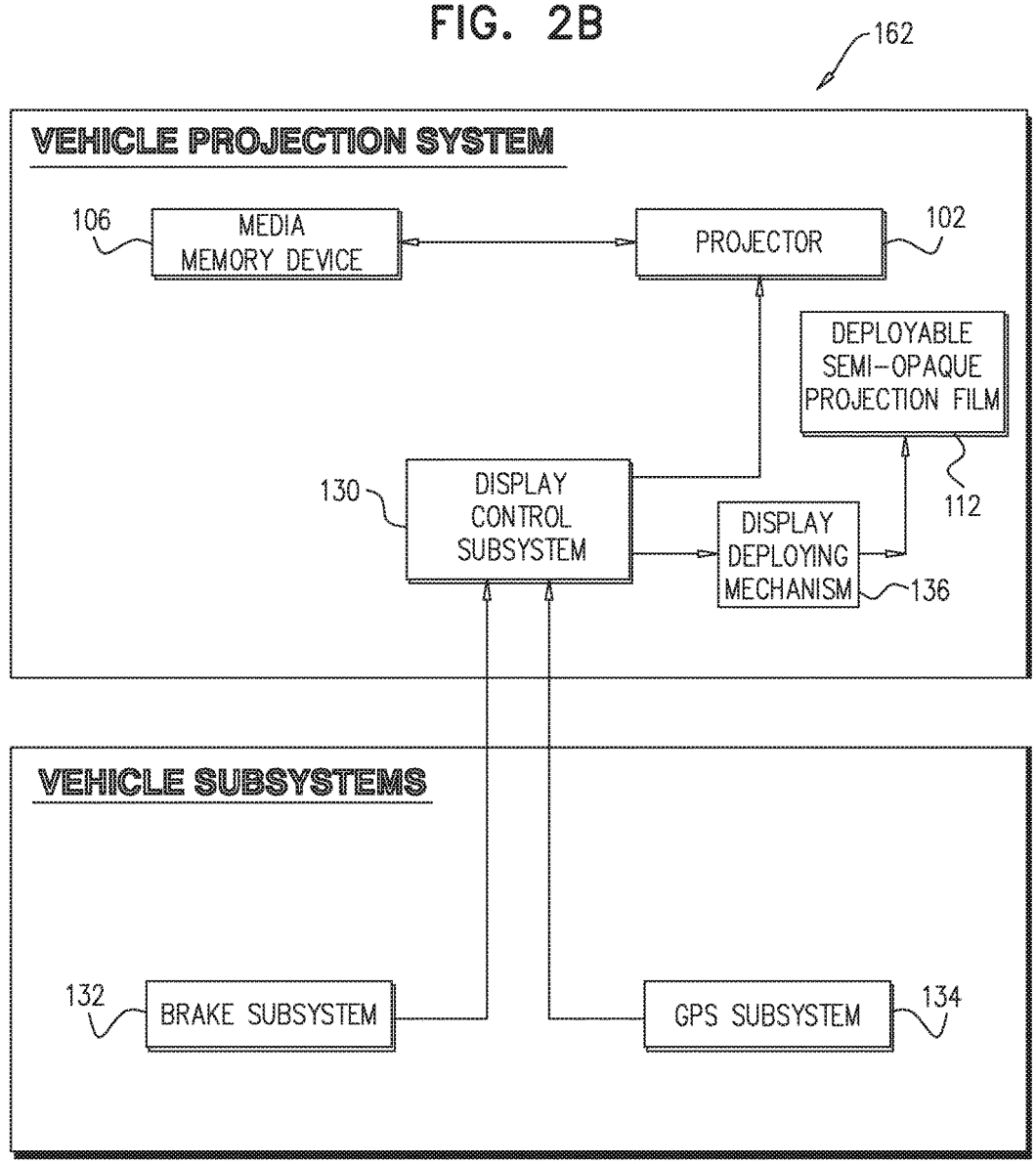

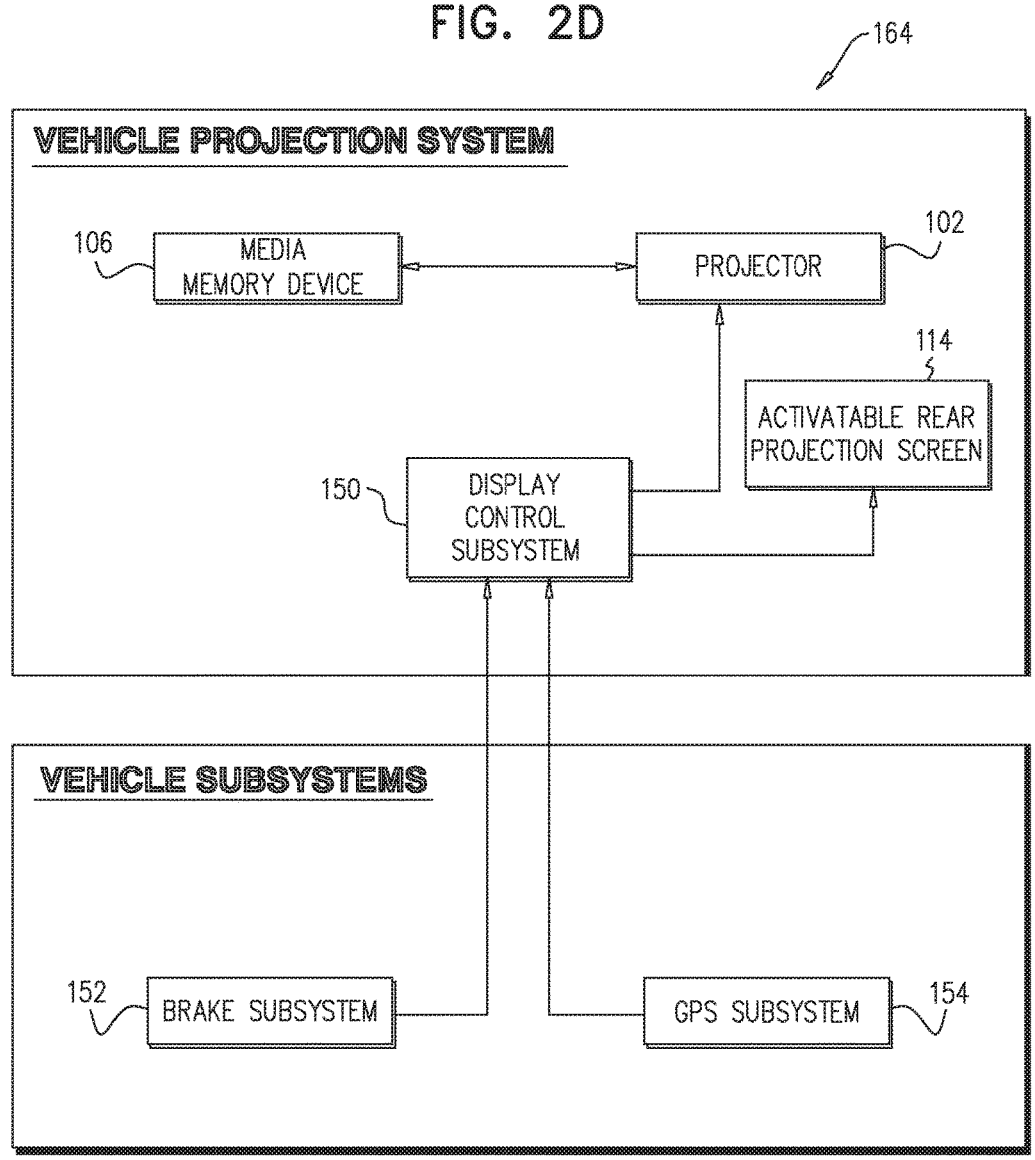

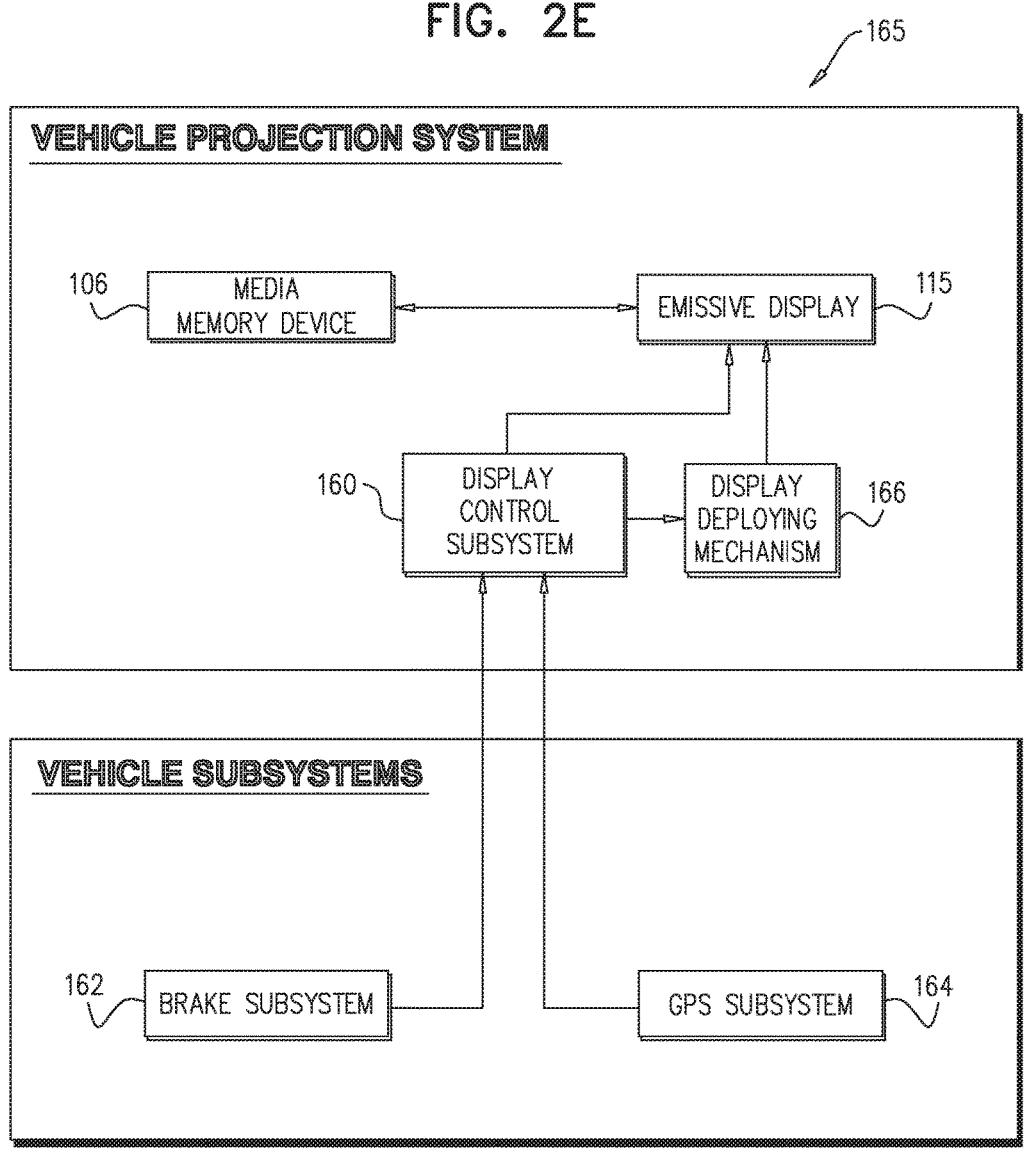

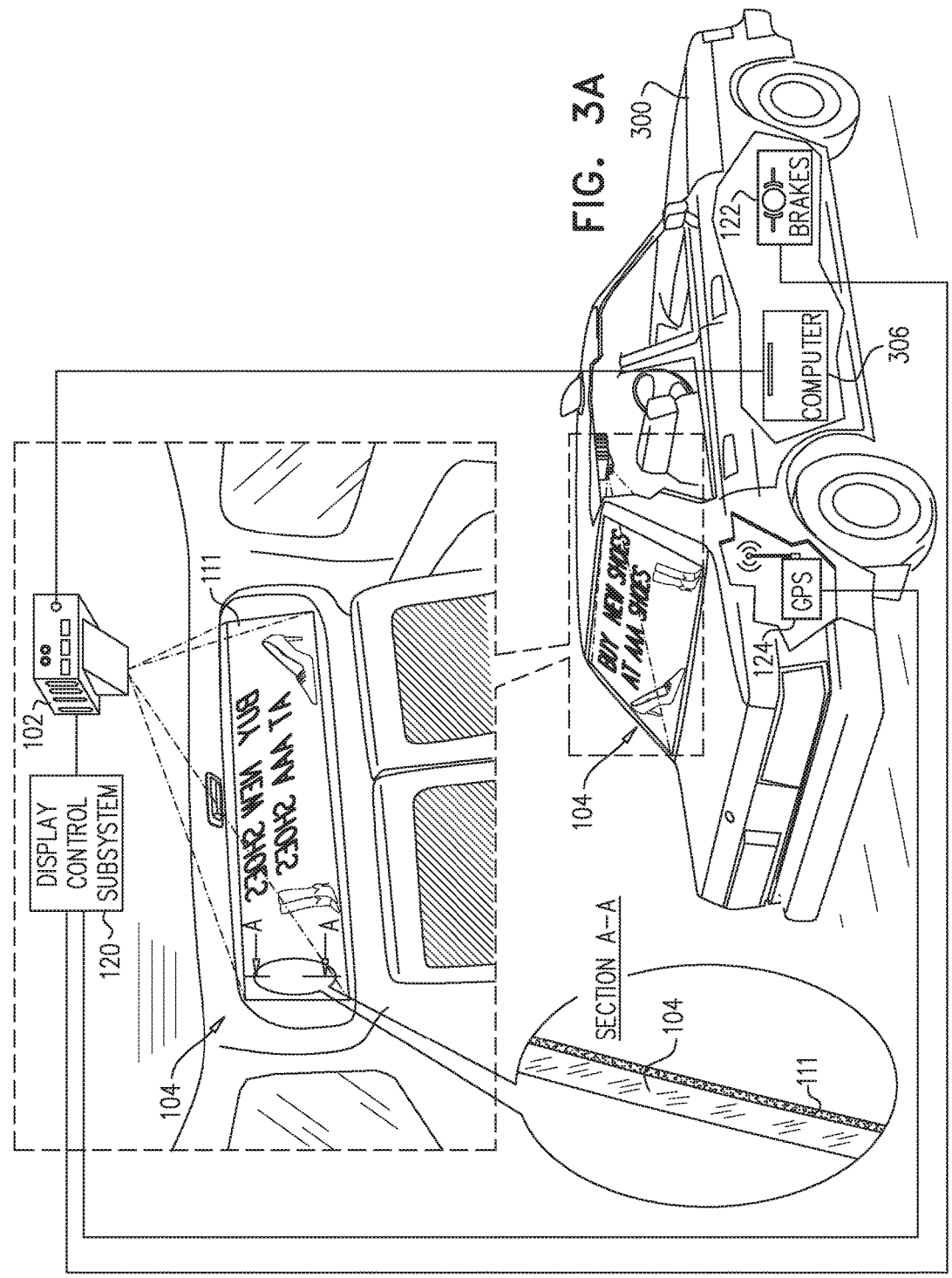

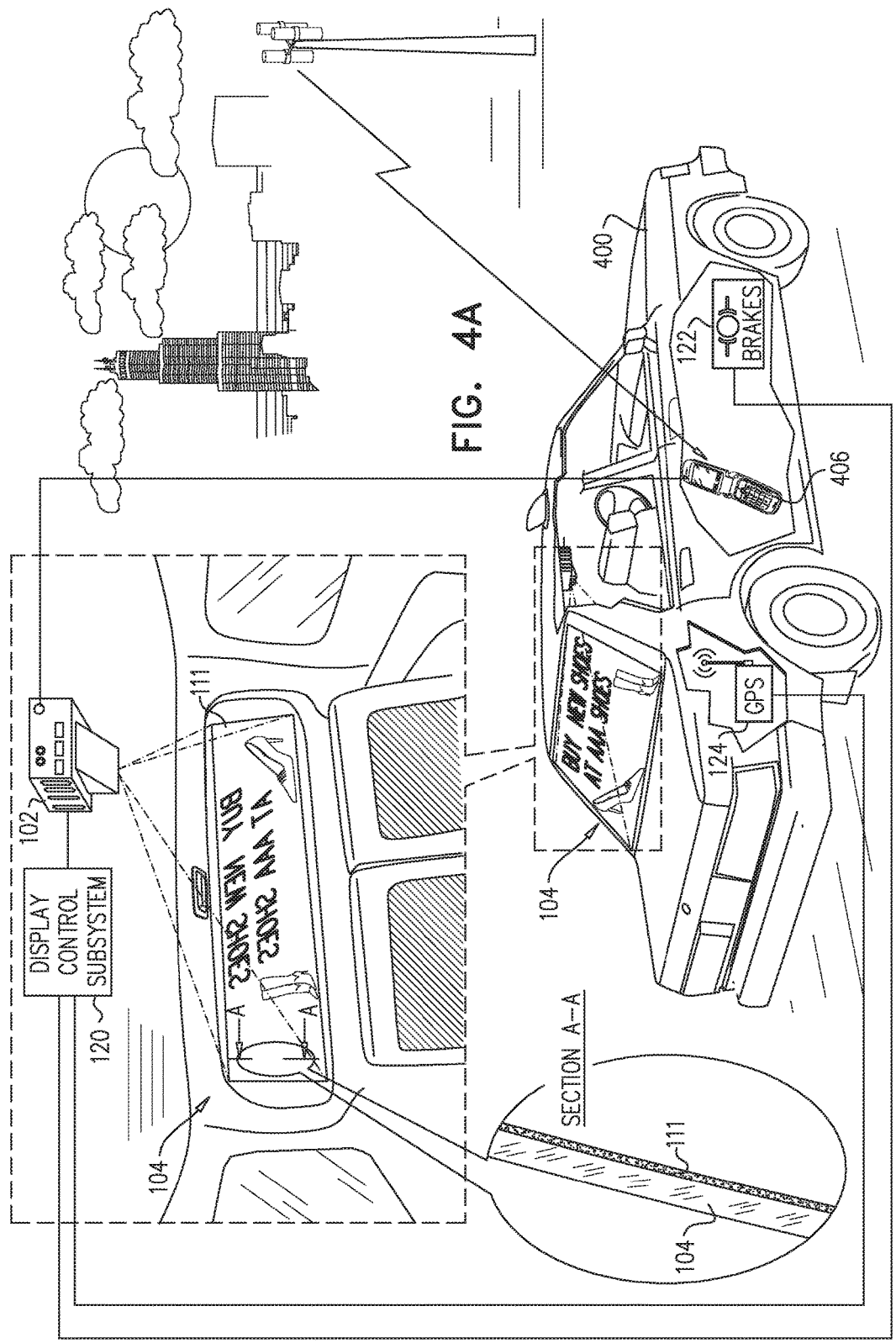

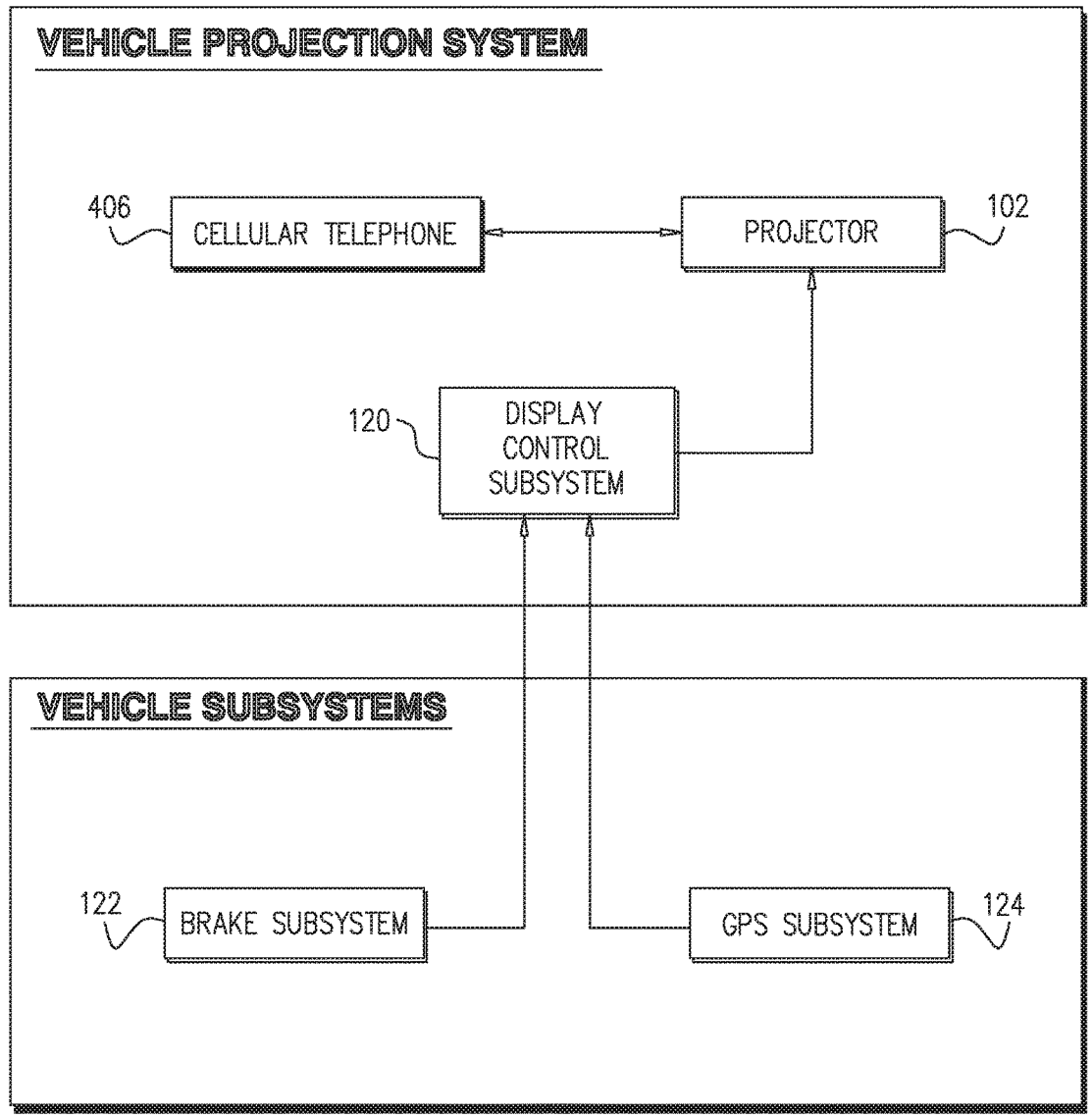

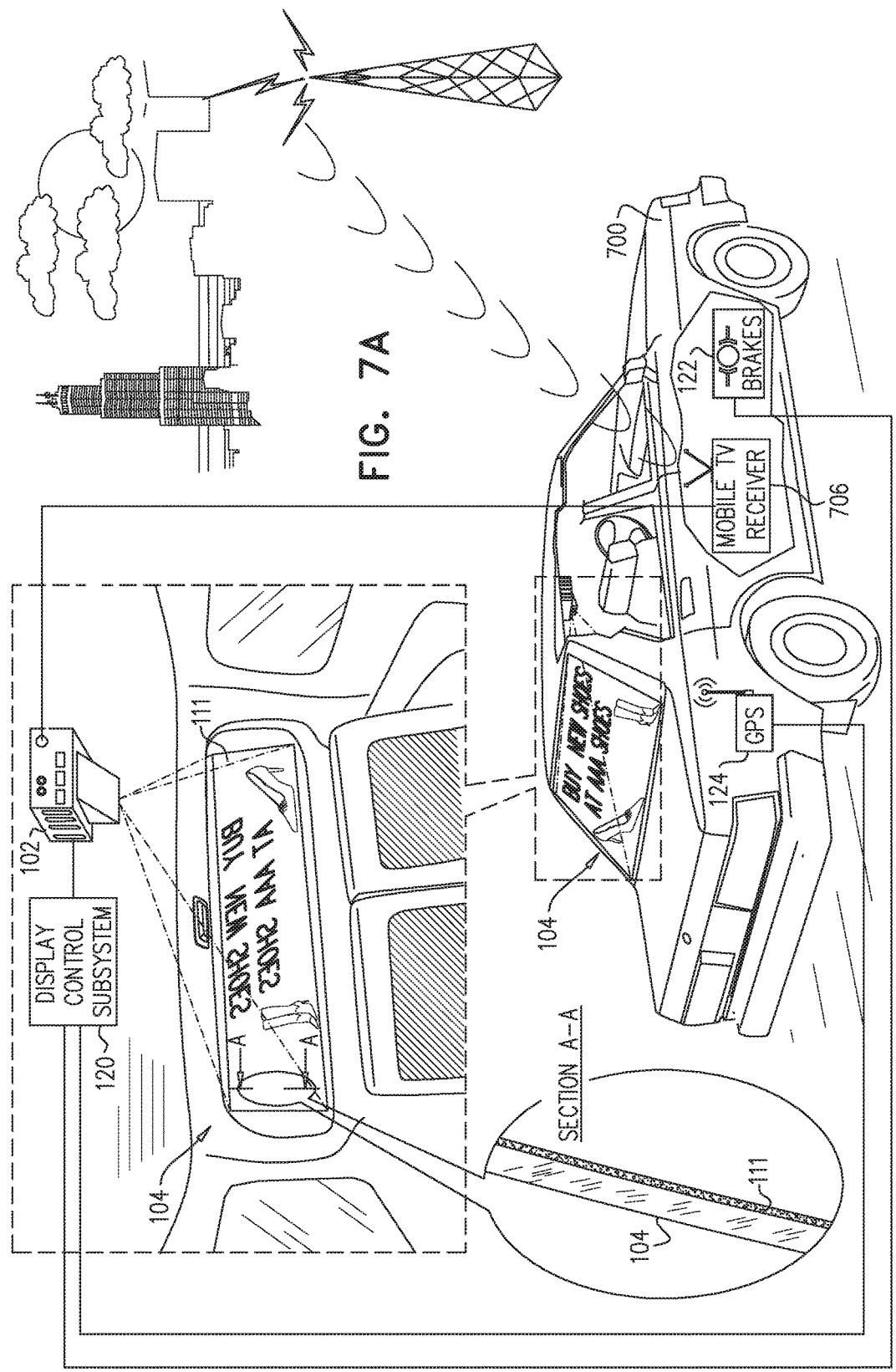

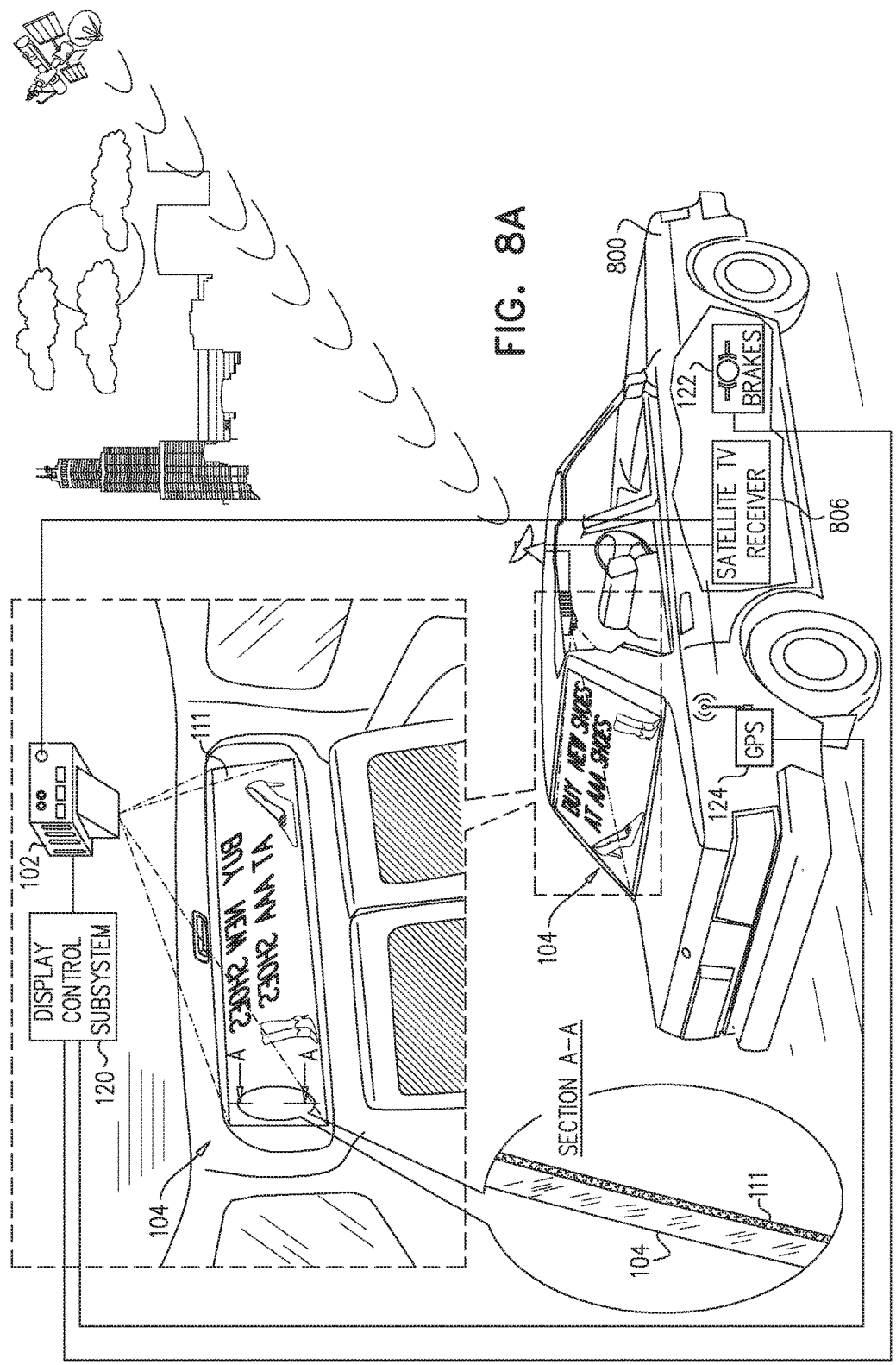

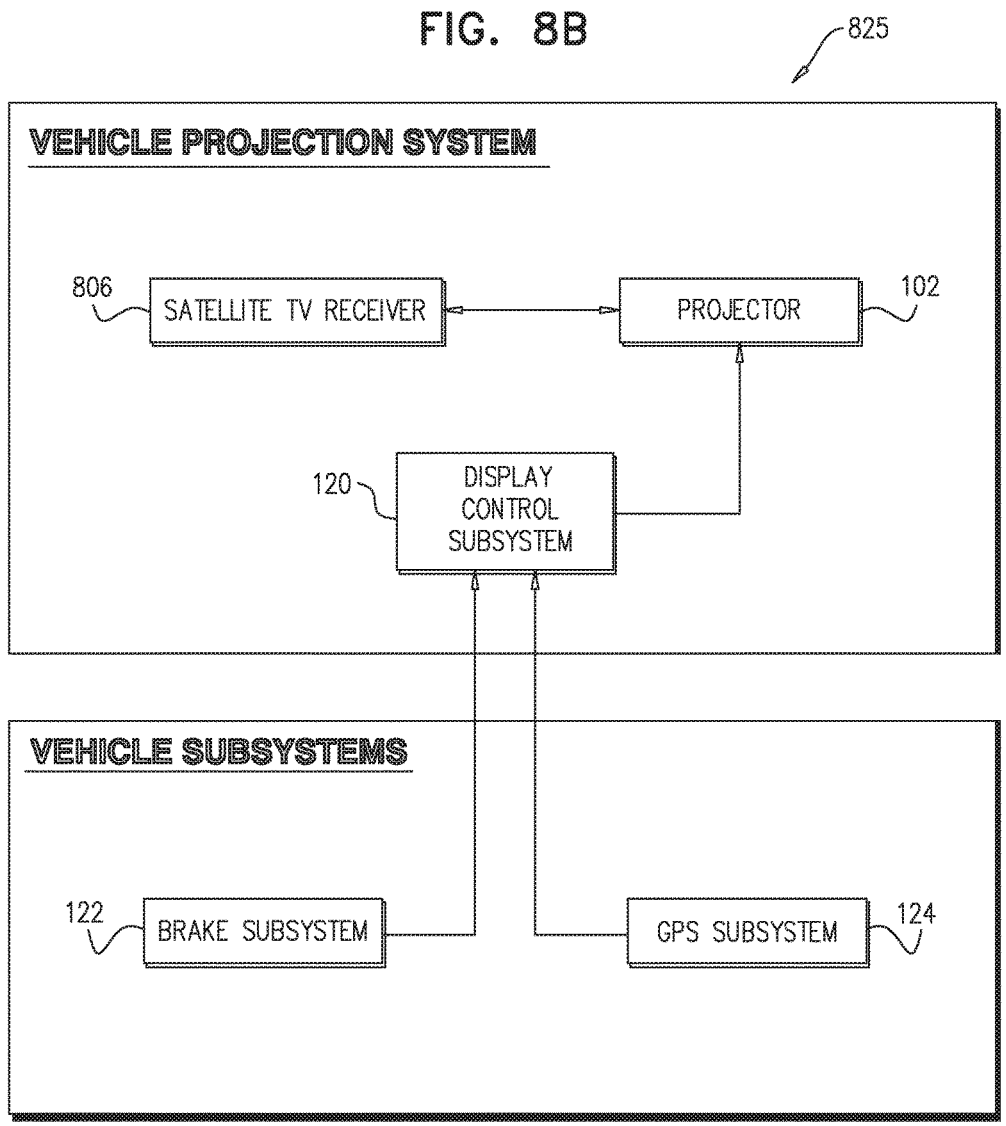

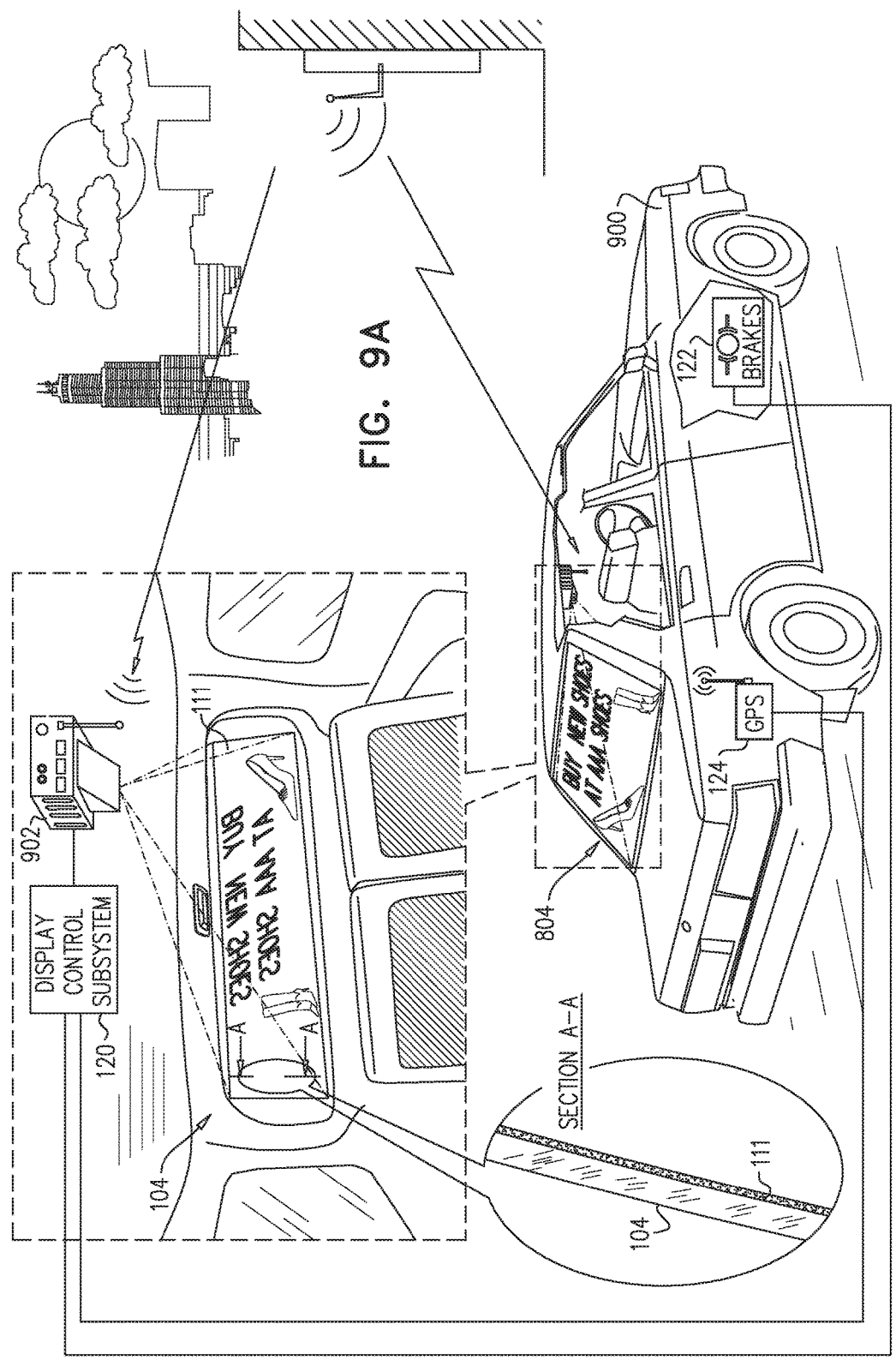

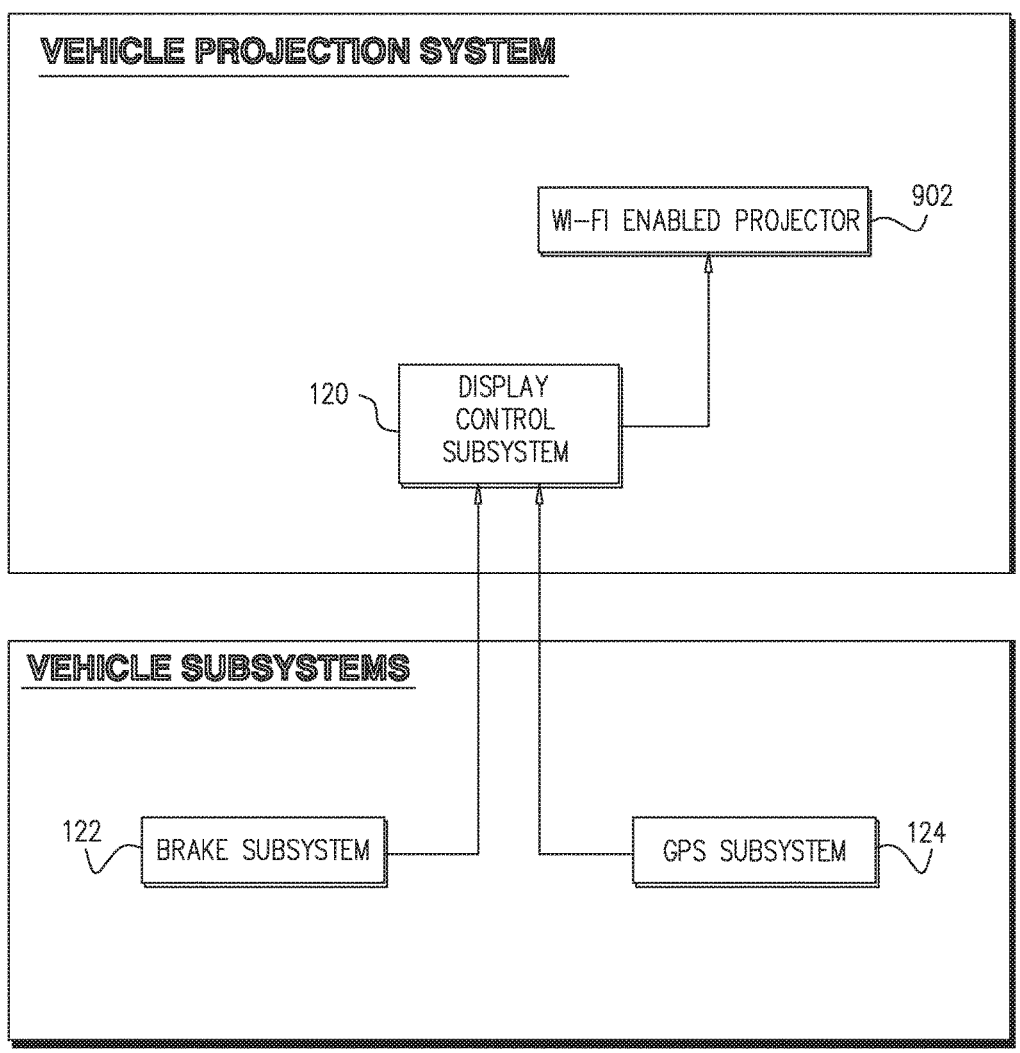

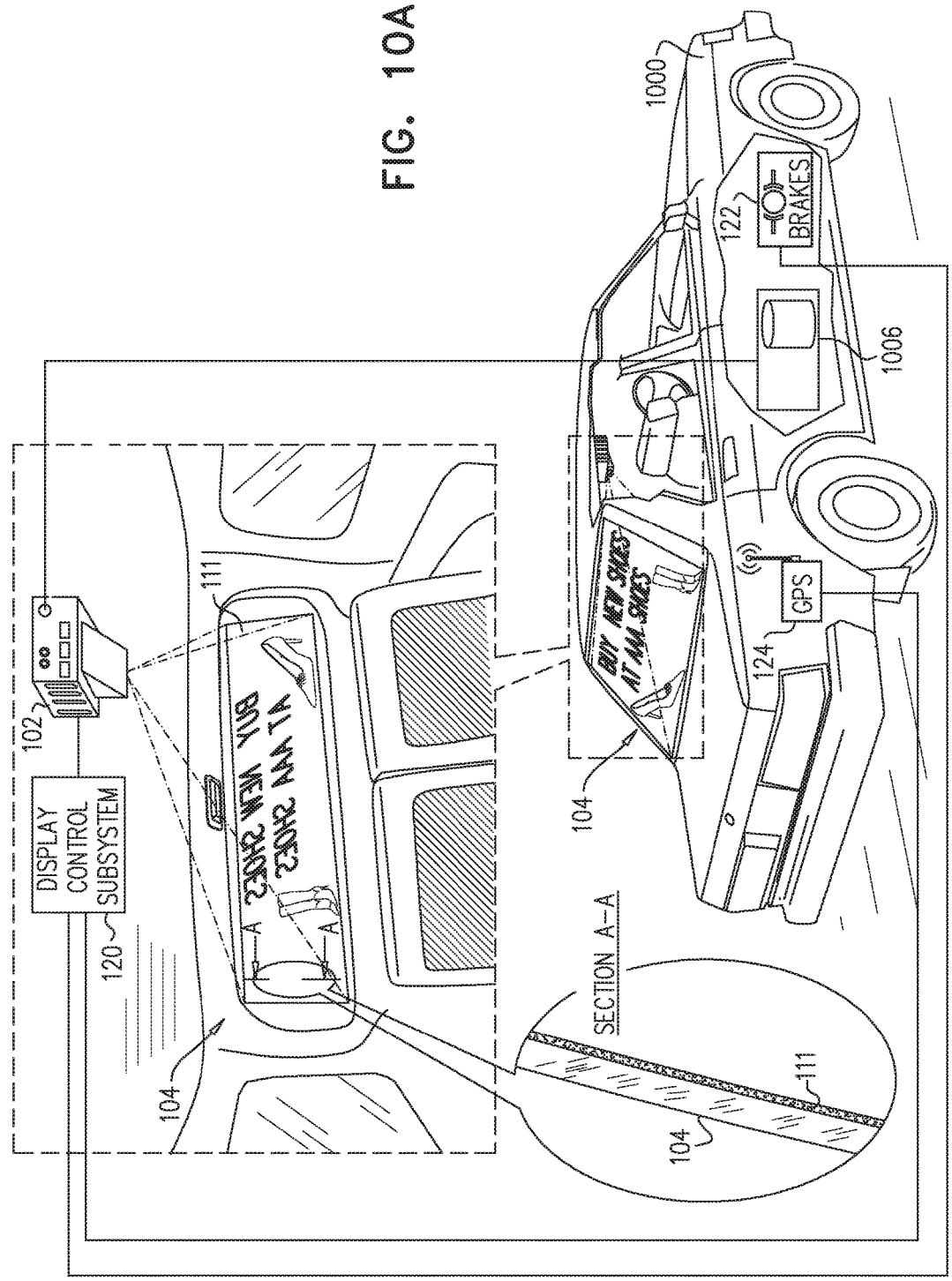

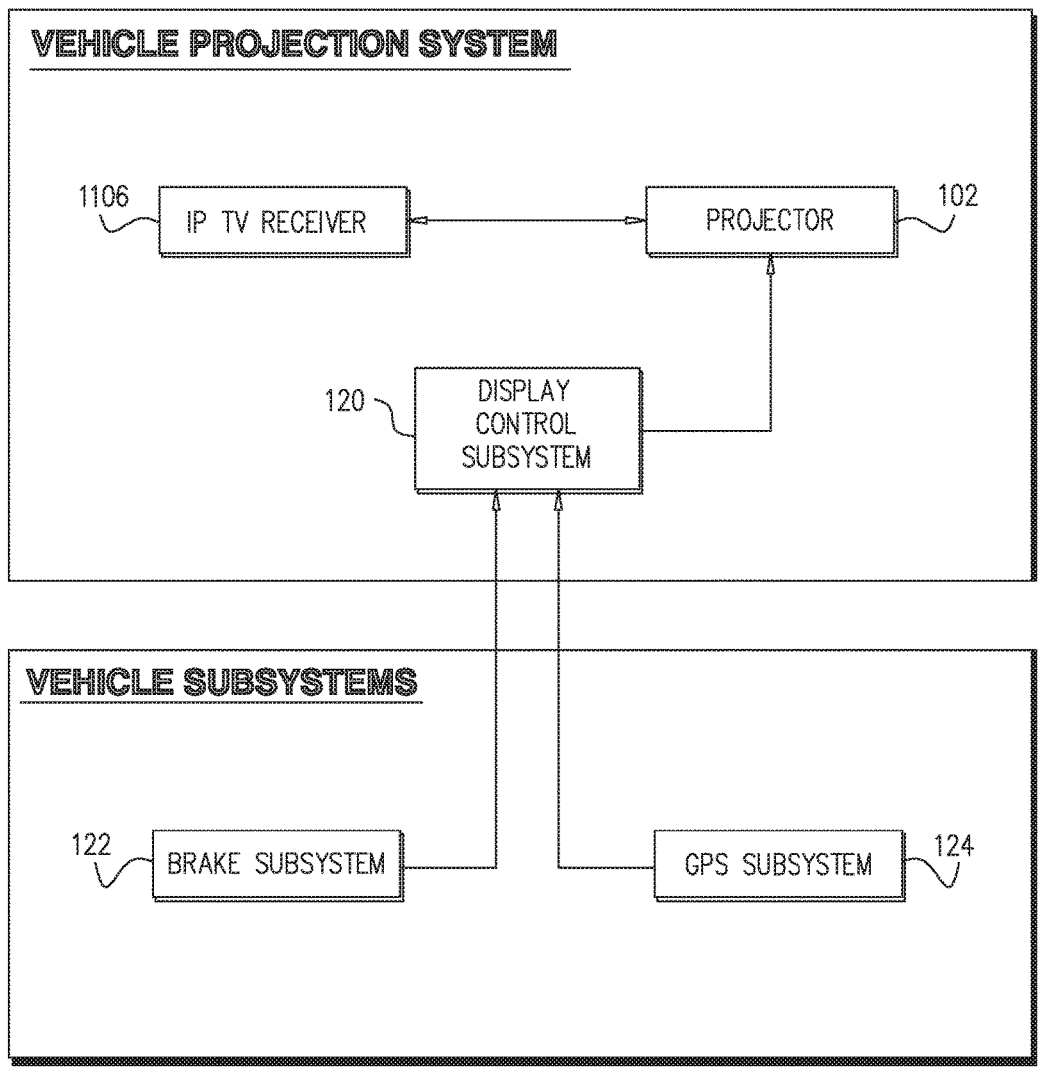

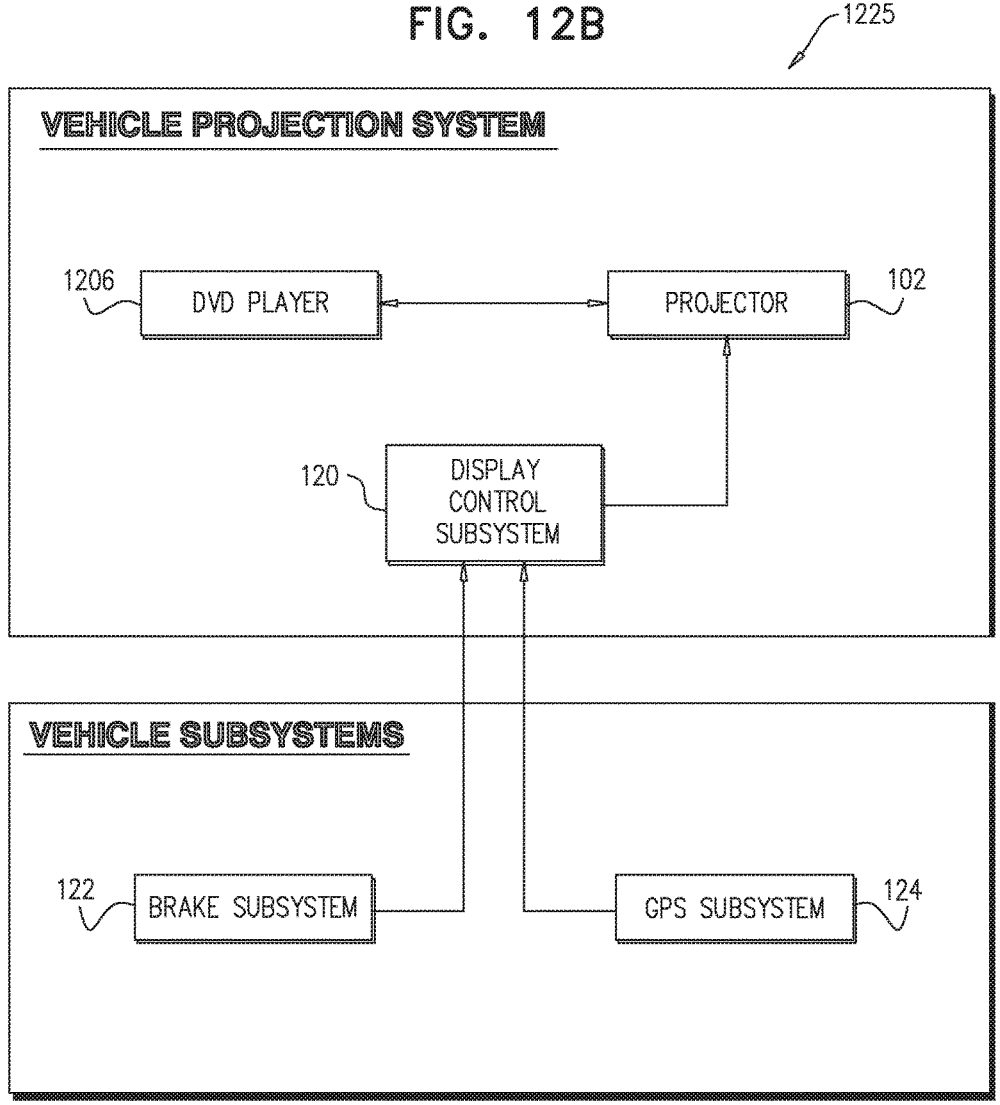

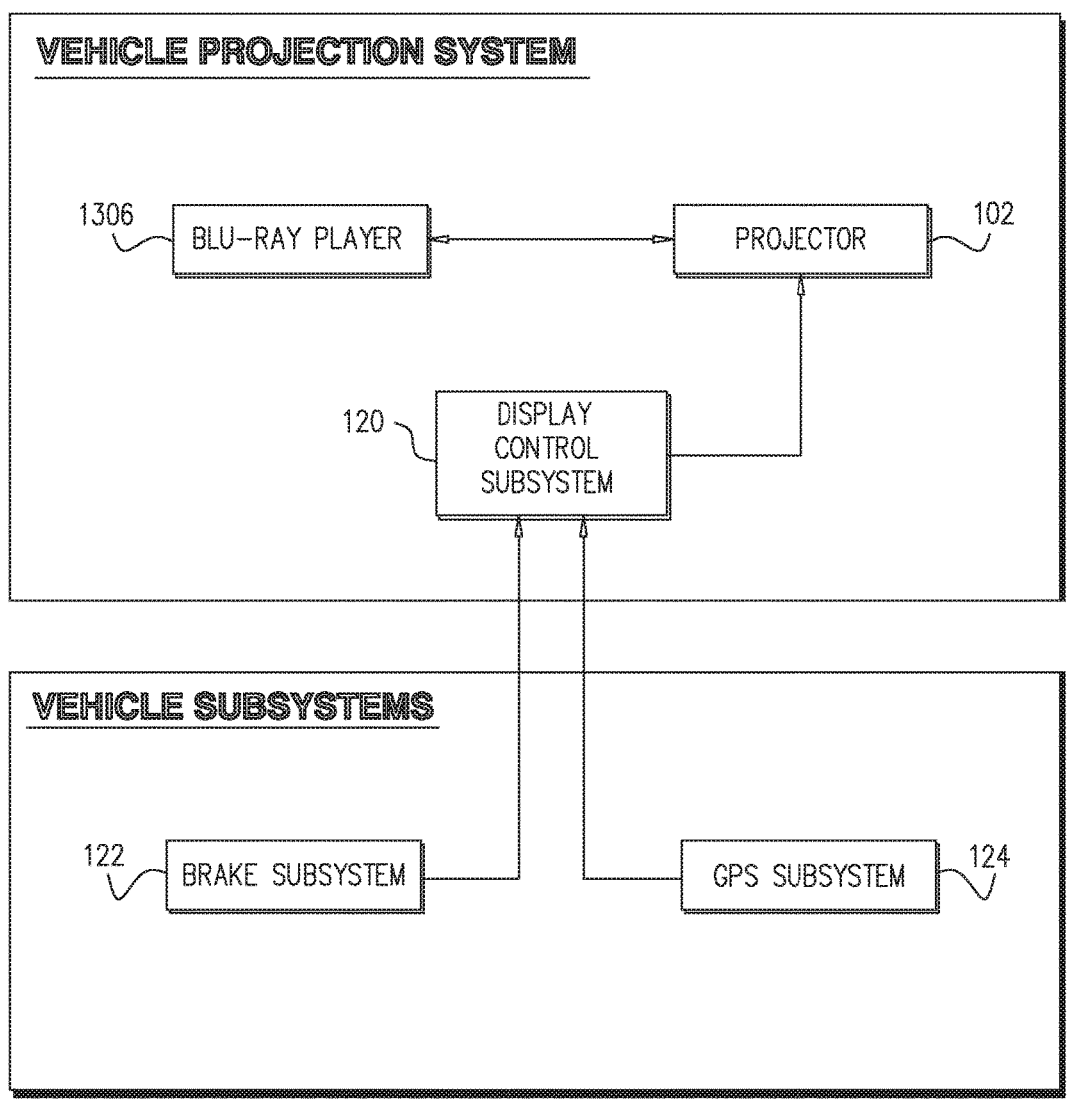

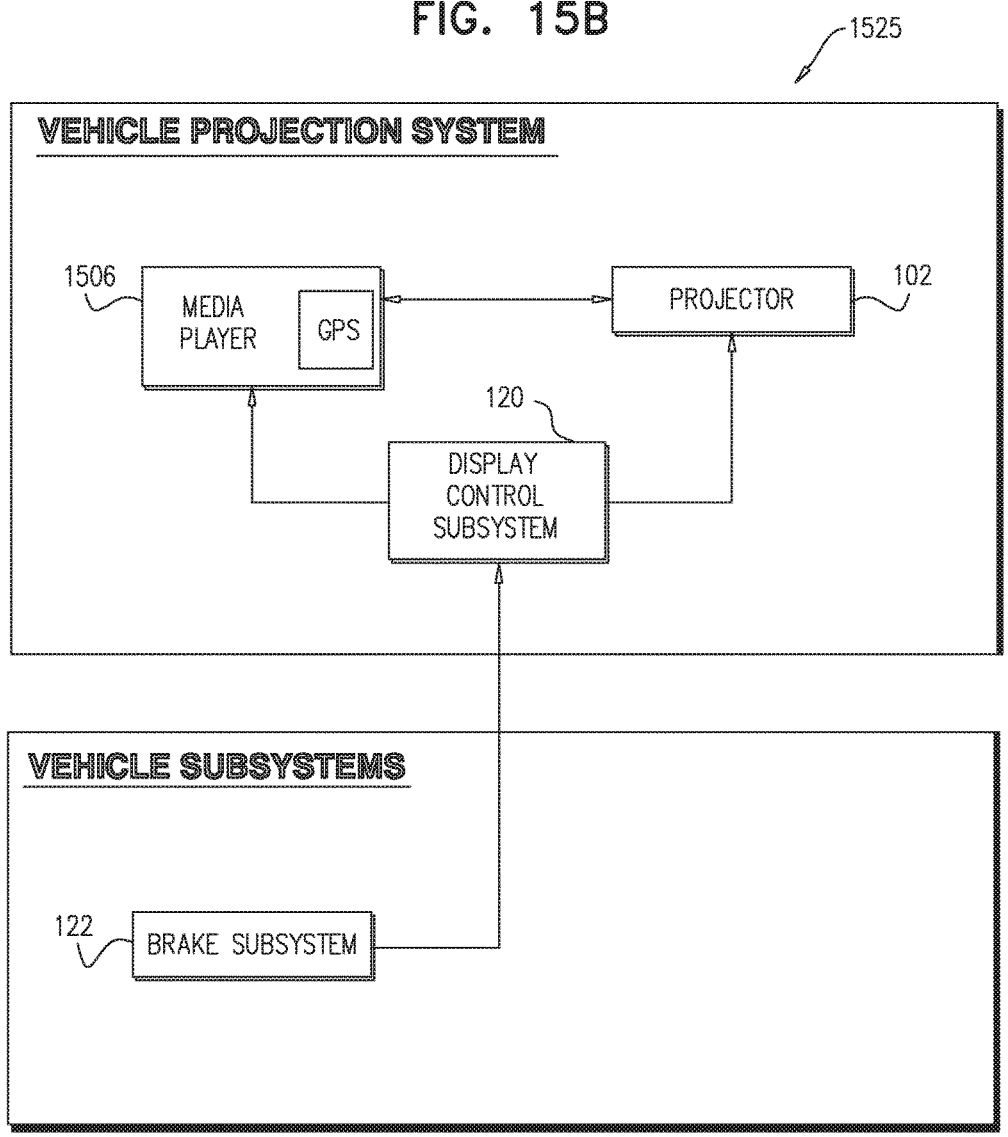

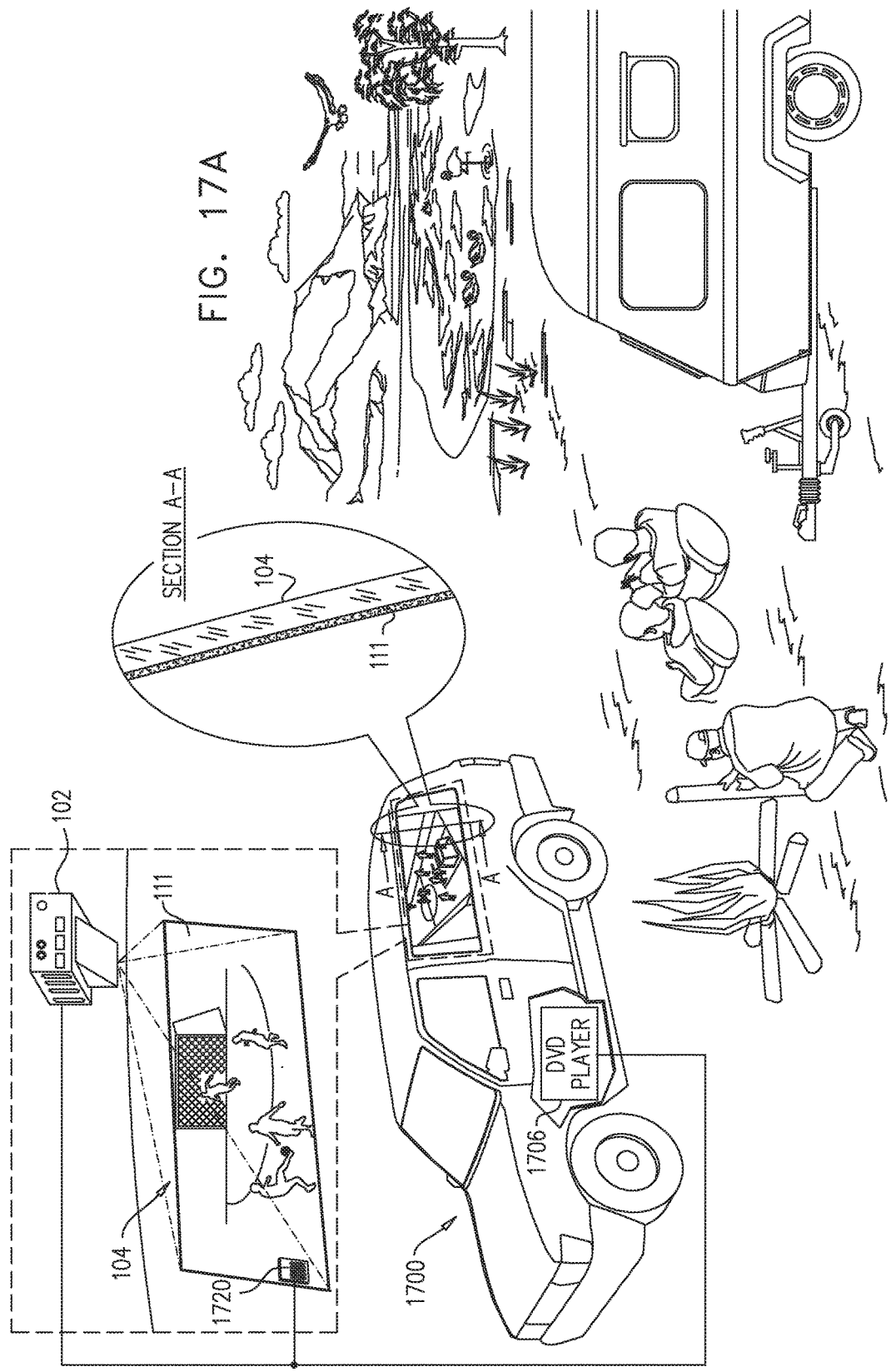

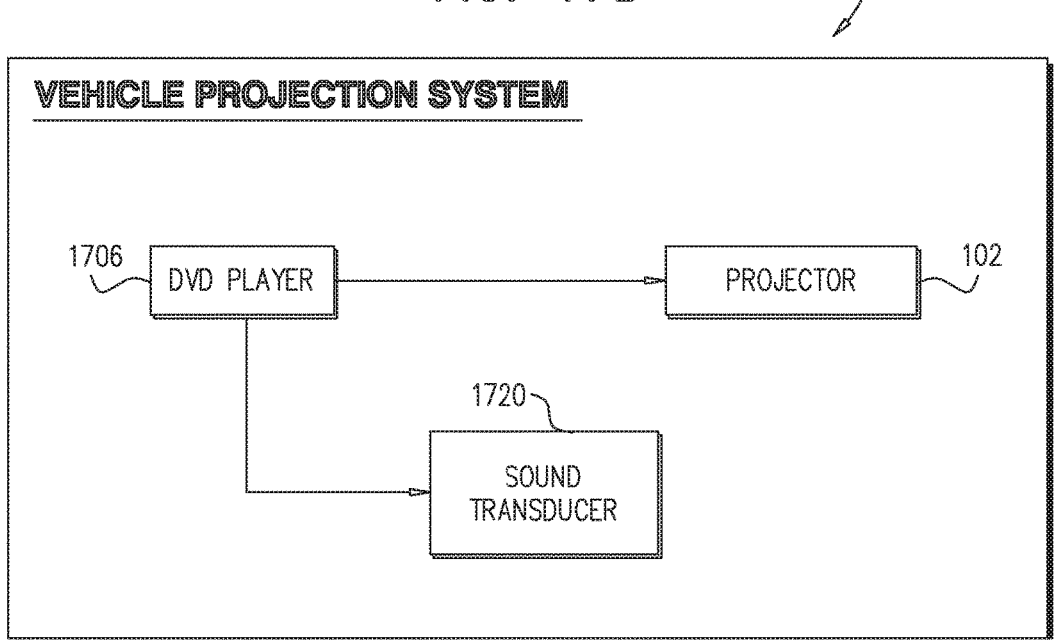

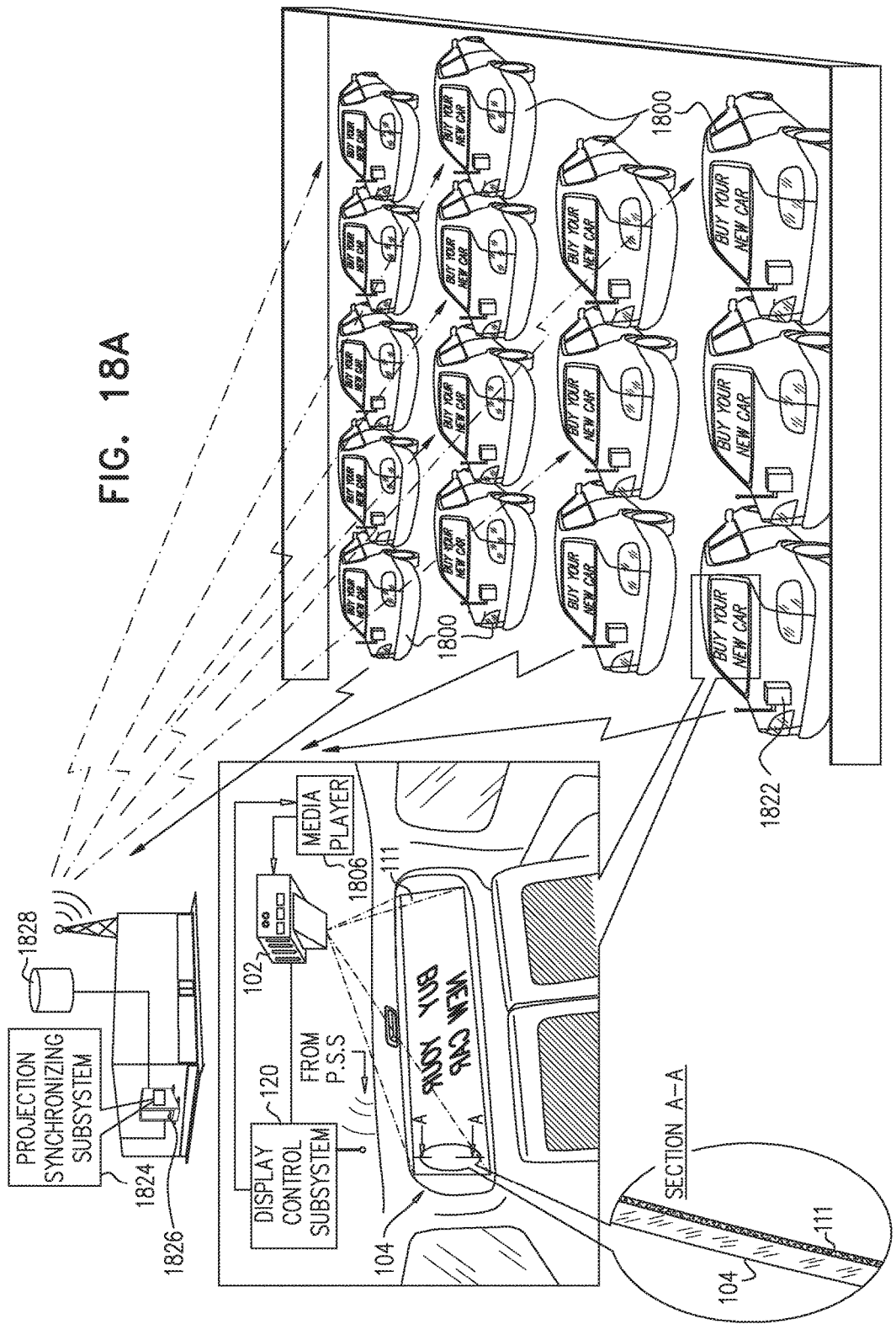

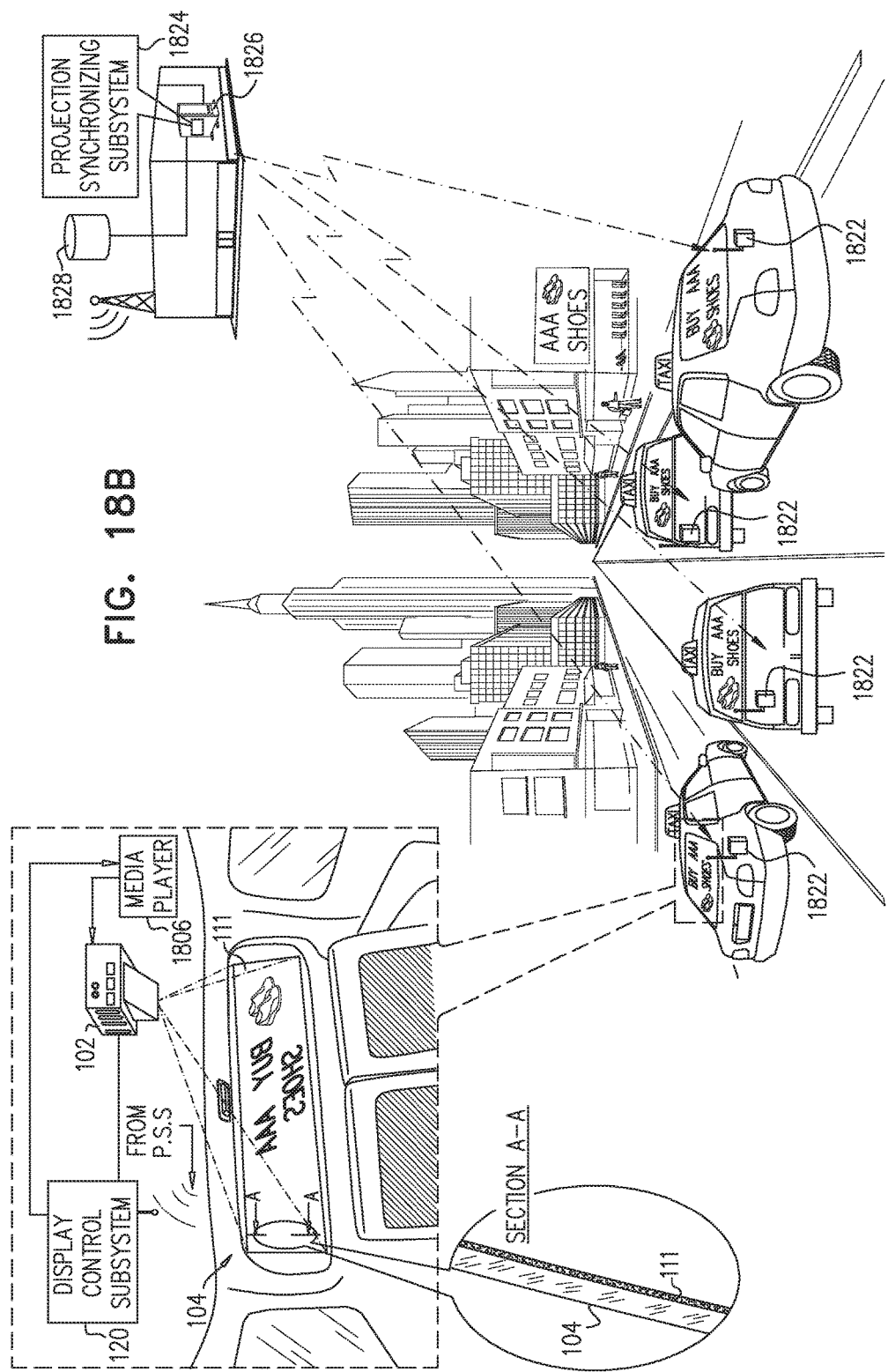

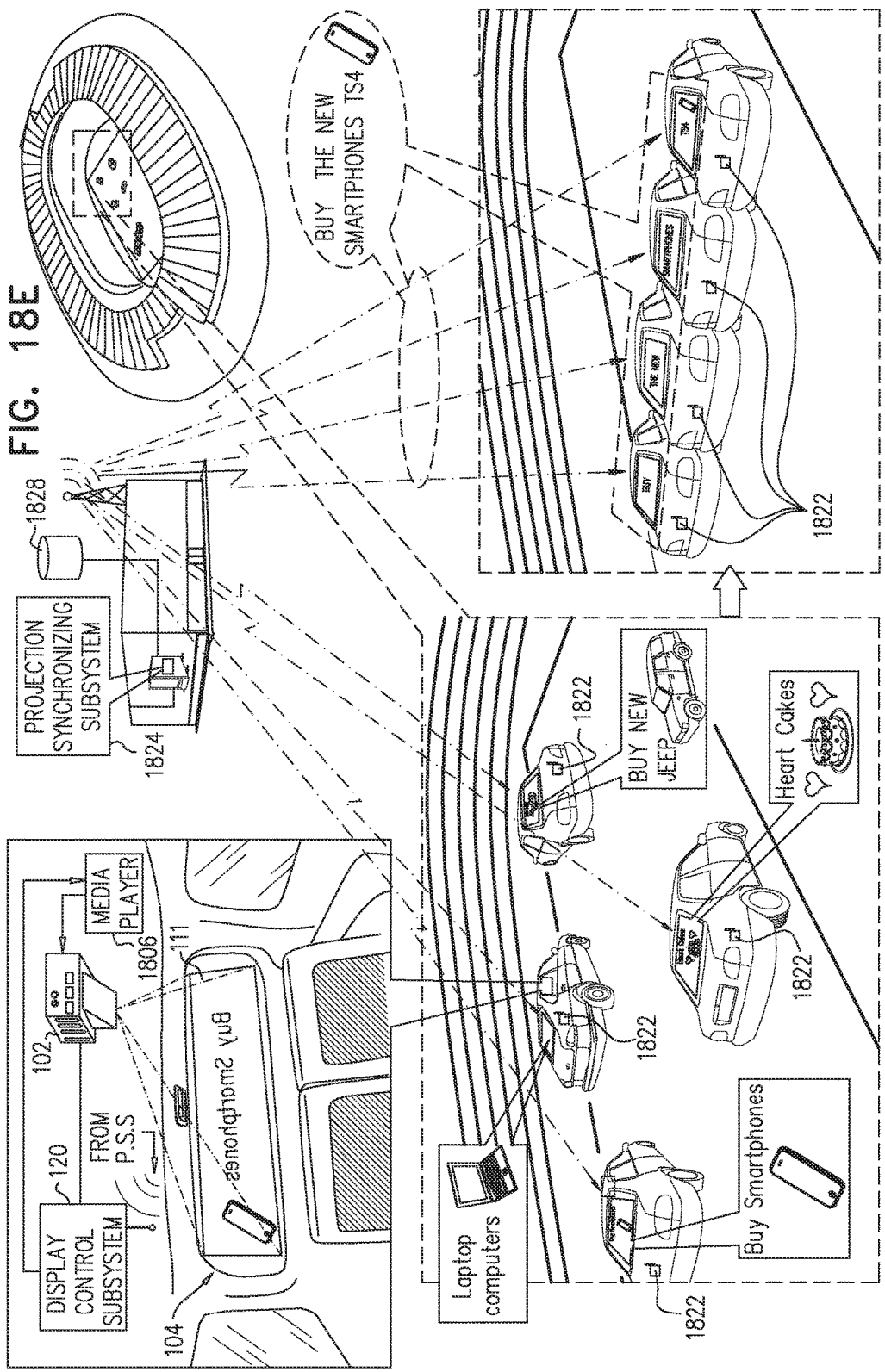

VEHICLE PROJECTION SYSTEMS AND METHOD

REFERENCE TO RELATED APPLICATIONS

The present application is a divisional application of U.S. patent application Ser. No. 13/476,263, filed May 21, 2012, entitled VEHICLE PROJECTION SYSTEMS AND METHOD, the disclosure of which is hereby incorporated by reference.

FIELD OF THE INVENTION

The present invention relates to vehicle projection systems and methods.

BACKGROUND OF THE INVENTION

The following patent publications are believed to represent the current state of the art:
U.S. Pat. No. 7,791,785; and
U.S. Published Patent Application No.: 2003/0162312.

SUMMARY OF THE INVENTION

The present invention provides systems and methodologies for displaying visually sensible patterns on surfaces of vehicles.

There is thus provided in accordance with a preferred embodiment of the present invention a system for displaying visually sensible patterns onto a surface of a vehicle including a display control subsystem responsive to an operational state of the vehicle, and a display device, operative in response to an input from the display control subsystem, to display a visually sensible pattern onto the surface. Preferably, the visually sensible pattern is visible from the exterior of the vehicle.

Preferably, the display device is a projector is mounted inside the vehicle. Preferably, communication between the display control subsystem and the projector is at least one of wired and wireless communication. Preferably, the surface of a vehicle is one of an interior surface and an exterior surface of one of a rear windshield and a side window of the vehicle.

Preferably, the surface is coated with a semi-opaque rear projection film. Alternatively, the surface is formed with a semi-opaque rear projection material embedded therewithin. Alternatively, the surface is a frame housing an activatable rear projection film which is mounted in close proximity to one of a rear windshield and a side window of the vehicle.

Alternatively, the surface is a deployable semi-opaque projection film which is mounted in close proximity to one of a rear windshield and a side window of the vehicle. Preferably, the deployable semi-opaque projection film is one of a popup, movable and rollable semi-opaque projection film. Preferably, the display control subsystem is operative, responsive to said operational state of said vehicle, to deploy and retract the deployable semi-opaque projection film.

Alternatively, the surface is coated with an activatable rear projection film. Alternatively, the surface is formed with an activatable rear projection material embedded therewithin.

Alternatively, the display device is a deployable emissive display which is mounted in close proximity to one of a rear windshield and a side window of the vehicle. Preferably, the deployable emissive display is one of a popup, movable and rollable emissive display. Preferably, the display control subsystem is operative, responsive to said operational state of said vehicle, to deploy and retract the deployable emissive display.

Preferably, the visually sensible pattern includes at least one of graphic images, video images and text. Preferably, the operational state of the vehicle corresponds to the operational state of a braking system of the vehicle. Preferably, the operational state of the vehicle is ascertained by utilizing location data of the vehicle. Preferably, the location data is received from a GPS location system of the vehicle. Alternatively, the location data is received from a GPS location system embedded in a media player.

Preferably, the visually sensible pattern includes data pertaining to an operational state of the vehicle obtained by the display control subsystem from the vehicle.

Preferably, the display device comprises internal viewer capabilities and the visually sensible pattern is stored and provided by one of a USB flash drive and a solid state memory device which communicates with the display device. Additionally or alternatively, the visually sensible pattern is stored and provided by a computer. Additionally or alternatively, the system also includes cellular telephone communication functionality operative to wirelessly obtain the visually sensible pattern via a cellular telephone network. Preferably, the display device is a projector phone having cellular telephone communication functionality operative to wirelessly obtain the visually sensible pattern via a cellular telephone network.

Additionally or alternatively, the system also includes wireless television reception functionality operative to wirelessly obtain the visually sensible pattern via a wireless television broadcasting network. Additionally or alternatively, the system also includes terrestrial television reception functionality operative to wirelessly obtain the visually sensible pattern via a terrestrial television broadcasting network. Additionally or alternatively, the system also includes satellite television reception functionality operative to wirelessly obtain the visually sensible pattern via a satellite television broadcasting network. Additionally or alternatively, the system also includes cable television reception functionality operative to wirelessly obtain the visually sensible pattern via a cable television broadcasting network.

Additionally or alternatively, at least one of the display control subsystem and the display device includes wireless internet functionality operative to wirelessly obtain the visually sensible pattern via a wireless internet network. Additionally or alternatively, the visually sensible pattern is stored and provided by a digital media streaming device. Additionally or alternatively, the system also includes IP television reception functionality operative to wirelessly obtain the visually sensible pattern via at least one of a wireless IP network and a wired IP network.

Additionally or alternatively, the visually sensible pattern is stored and provided by a DVD player. Additionally or alternatively, the visually sensible pattern is stored and provided by a Blu-ray player. Additionally or alternatively, the visually sensible pattern is stored and provided by a media player.

There is also provided in accordance with another preferred embodiment of the present invention a method for displaying visually sensible patterns onto a surface of a vehicle including displaying a visually sensible pattern onto the surface responsively to an operational state of the vehicle, the visually sensible pattern being visible from the exterior of the vehicle.

There is further provided in accordance with yet another preferred embodiment of the present invention a system for synchronizing display of visually sensible patterns onto surfaces of a plurality of vehicles including a plurality of vehicle display control subsystems, each of the vehicle display control subsystems being associated with at least one of the plurality of vehicles, each of the vehicle display control subsystems being operative to collect data pertaining to an operational state of a corresponding one of the plurality of vehicles, a plurality of display devices, each of the display devices being operative, in response to an input from a corresponding one of the display control subsystems, to display a visually sensible pattern onto at least one of the surfaces, and a display synchronizing subsystem operative in response to the data received from the plurality of vehicle display control subsystems to employ at least one of the plurality of vehicle display control subsystems to instruct at least one display device associated therewith to display a visually sensible pattern onto at least one of the surfaces. Preferably, the visually sensible patterns are visible from the exterior of at least some of the plurality of vehicles.

Preferably, at least one of the plurality of display devices is a projector mounted inside one of the plurality of vehicles. Preferably, communication between each of the display control subsystems and a corresponding one of the projectors is at least one of wired and wireless communication. Preferably, at least one of the surfaces is one of an interior surface and an exterior surface of one of a rear windshield and a side window of one of the plurality of vehicles.

Preferably, at least one of the surfaces is coated with a semi-opaque rear projection film. Additionally or alternatively, at least one of the surfaces is formed with a semi-opaque rear projection material embedded therewithin.

Additionally or alternatively, at least one of the surfaces is a deployable semi-opaque projection film which is mounted in close proximity to one of a rear windshield and a side window of a corresponding one of the vehicles. Preferably, the deployable semi-opaque projection film is one of a popup, movable and rollable semi-opaque projection film. Preferably, the display control subsystems are operative to deploy and retract the deployable semi-opaque projection film of corresponding ones of the at least some of the vehicles, responsive to the operational state of the corresponding vehicle.

Additionally or alternatively, at least one of the surfaces is coated with an activatable rear projection film. Additionally or alternatively, at least one of the surfaces is formed with an activatable rear projection material embedded therewithin. Additionally or alternatively, at least one of the surfaces is a frame housing an activatable rear projection film which is mounted in close proximity to one of a rear windshield and a side window of a corresponding one of the vehicles.

Additionally or alternatively, at least one of the plurality of display devices is a deployable emissive display which is mounted in close proximity to one of a rear windshield and a side window of the vehicle. Preferably, the deployable emissive display is one of a popup, movable and rollable emissive display. Preferably, the display control subsystem is operative to deploy and retract the deployable emissive display.

Preferably, the visually sensible pattern includes at least one of graphic images, video images and text. Preferably, the visually sensible pattern is stored on a digital storage device associated with the display synchronizing subsystem. Additionally or alternatively, the visually sensible pattern is stored on a digital storage device associated with at least one of the vehicle display control subsystems.

Preferably, the operational state of a vehicle corresponds to the operational state of a braking system of the vehicle. Preferably, the operational state of a vehicle is ascertained by utilizing location data of at least one of the plurality of vehicles. Preferably, the location data is received from a GPS location system of a corresponding one of the plurality of vehicles. Additionally or alternatively, the location data is received from a GPS location system embedded in a media player having a multi-display synchronization mode located in a corresponding one of the plurality of vehicles.

Preferably, the visually sensible pattern includes data pertaining to an operational state of at least one of the plurality of vehicles.

Preferably, the visually sensible pattern is stored and provided by one of a USB flash drive and a solid state memory device located in one of the vehicles and is displayed by one of said display devices which comprises internal viewer capabilities which communicates with the one of a USB flash drive and a solid state memory device. Additionally or alternatively, the visually sensible pattern is stored and provided by a computer located in one of the vehicles. Additionally or alternatively, the system also includes cellular telephone communication functionality operative to wirelessly obtain the visually sensible pattern via a cellular telephone network. Preferably, at least one of the display devices is a projector phone having cellular telephone communication functionality operative to wirelessly obtain the visually sensible pattern via a cellular telephone network.

Additionally or alternatively, the system also includes wireless television reception functionality operative to wirelessly obtain the visually sensible pattern via a wireless television broadcasting network. Additionally or alternatively, the system also includes terrestrial television reception functionality operative to wirelessly obtain the visually sensible pattern via a terrestrial television broadcasting network.

Additionally or alternatively, the system also includes satellite television reception functionality operative to wirelessly obtain the visually sensible pattern via a satellite television broadcasting network. Additionally or alternatively, the system also includes cable television reception functionality operative to wirelessly obtain said visually sensible pattern via a cable television broadcasting network. Additionally or alternatively, the system also includes wireless internet functionality operative to wirelessly obtain the visually sensible pattern via a wireless internet network. Additionally or alternatively, the visually sensible pattern is stored and provided by a digital media streaming device located in one of the vehicles. Additionally or alternatively, the system also includes IP television reception functionality operative to wirelessly obtain the visually sensible pattern via at least one of a wireless IP network and a wired IP network.

Additionally or alternatively, the visually sensible pattern is stored and provided by a DVD player located in one of the vehicles. Additionally or alternatively, the visually sensible pattern is stored and provided by a Blu-ray player located in one of the vehicles. Additionally or alternatively, the visually sensible pattern is stored and provided by a media player located in one of the vehicles.

Preferably, the display synchronizing subsystem is also operative in response to the data received from the plurality of vehicle display control subsystems to employ at least some of the plurality of vehicle display control subsystems to instruct at least one display device associated therewith to synchronizably display mutually different segments of a visually sensible pattern onto at least one of the surfaces, whereby the mutually different segments together are the visually sensible pattern.

There is yet further provided in accordance with still another preferred embodiment of the present invention a method for synchronizing display of visually sensible patterns onto surfaces of a plurality of vehicles including collecting data pertaining to an operational state of the plurality of vehicles and in response to the data, instructing at least one display device associated with one of the plurality of vehicles to display a visually sensible pattern onto at least one of the surfaces, the visually sensible pattern being visible from the exterior of at least one of the one of the plurality of vehicles.

BRIEF DESCRIPTION OF THE DRAWINGS

The present invention will be understood and appreciated more fully from the following detailed description, taken in conjunction with the drawings in which:

FIGS. 1A, 1B, 1C, 1D and 1E are simplified pictorial illustrations of examples of the use of vehicle projection systems, each of which being constructed and operative in accordance with a preferred embodiment of the present invention;

FIGS. 2A, 2B, 2C, 2D and 2E are simplified block diagram illustrations of the respective vehicle projection systems of FIGS. 1A-1E;

FIG. 3A is a simplified pictorial illustration of an example of the use of a vehicle projection system, constructed and operative in accordance with another preferred embodiment of the present invention;

FIG. 4A is a simplified pictorial illustration of an example of the use of a vehicle projection system, constructed and operative in accordance with still another preferred embodiment of the present invention;

FIG. 4B is a simplified block diagram illustration of the vehicle projection system of FIG. 4A;

FIG. 7A is a simplified pictorial illustration of an example of the use of a vehicle projection system, constructed and operative in accordance with still another preferred embodiment of the present invention;

FIG. 8A is a simplified pictorial illustration of an example of the use of a vehicle projection system, constructed and operative in accordance with still another preferred embodiment of the present invention;

FIG. 8B is a simplified block diagram illustration of the vehicle projection system of FIG. 8A;

FIG. 9A is a simplified pictorial illustration of an example of the use of a vehicle projection system, constructed and operative in accordance with still another preferred embodiment of the present invention;

FIG. 9B is a simplified block diagram illustration of the vehicle projection system of FIG. 9A;

FIG. 10A is a simplified pictorial illustration of an example of the use of a vehicle projection system, constructed and operative in accordance with still another preferred embodiment of the present invention;

FIG. 11B is a simplified block diagram illustration of the vehicle projection system of FIG. 11A;

FIG. 12B is a simplified block diagram illustration of the vehicle projection system of FIG. 12A;

FIG. 13B is a simplified block diagram illustration of the vehicle projection system of FIG. 13A;

FIG. 15B is a simplified block diagram illustration of the vehicle projection system of FIG. 15A;

FIG. 17A is a simplified pictorial illustration of an example of the use of a vehicle projection system, constructed and operative in accordance with still another preferred embodiment of the present invention;

FIG. 17B is a simplified block diagram illustration of the vehicle projection system of FIG. 17A;

FIGS. 18A, 18B, 18C, 18D and 18E are simplified pictorial illustrations of the use of a system for synchronizing projection of visually sensible patterns onto surfaces of a plurality of vehicles, constructed and operative in accordance with a preferred embodiment of the present invention;

DETAILED DESCRIPTION OF PREFERRED EMBODIMENTS

Reference is now made to FIGS. 1A, 1B, 1C, 1D and 1E, which are simplified pictorial illustrations of examples of the use of vehicle projection systems, each of which being constructed and operative in accordance with a preferred embodiment of the present invention, and to FIGS. 2A, 2B, 2C, 2D and 2E, which are simplified block diagram illustrations of the respective vehicle projection systems of FIGS. 1A-1E. The systems of FIGS. 1A-2E preferably each include a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

As shown in FIGS. 1A-1E, a motor vehicle 100 is equipped with a mounted projector 102 which is trained on a rear windshield 104 of vehicle 100. Alternatively, projector 102 may be trained on any other surface of vehicle 100. Projector 102 may be any suitable multimedia projector with internal viewer capabilities, such as an Epson Powerlite 1775W Multimedia Projector, commercially available from Seiko Epson Corporation of Suwa, Nagano, Japan.

A media memory device 106 communicating with projector 102 is provided for storing visually sensible patterns suitable for display by projector 102. Device 106 may be, for example, a SanDisk® Ultra® Backup USB Flash Drive commercially available from SanDisk of Milpitas, Calif. The visually sensible patterns suitable for display on projector 102 and stored on memory device 106 may be, for example, any of text, graphic images or video images such as advertisements, pictures, video clips or movies.

Figure 1A:
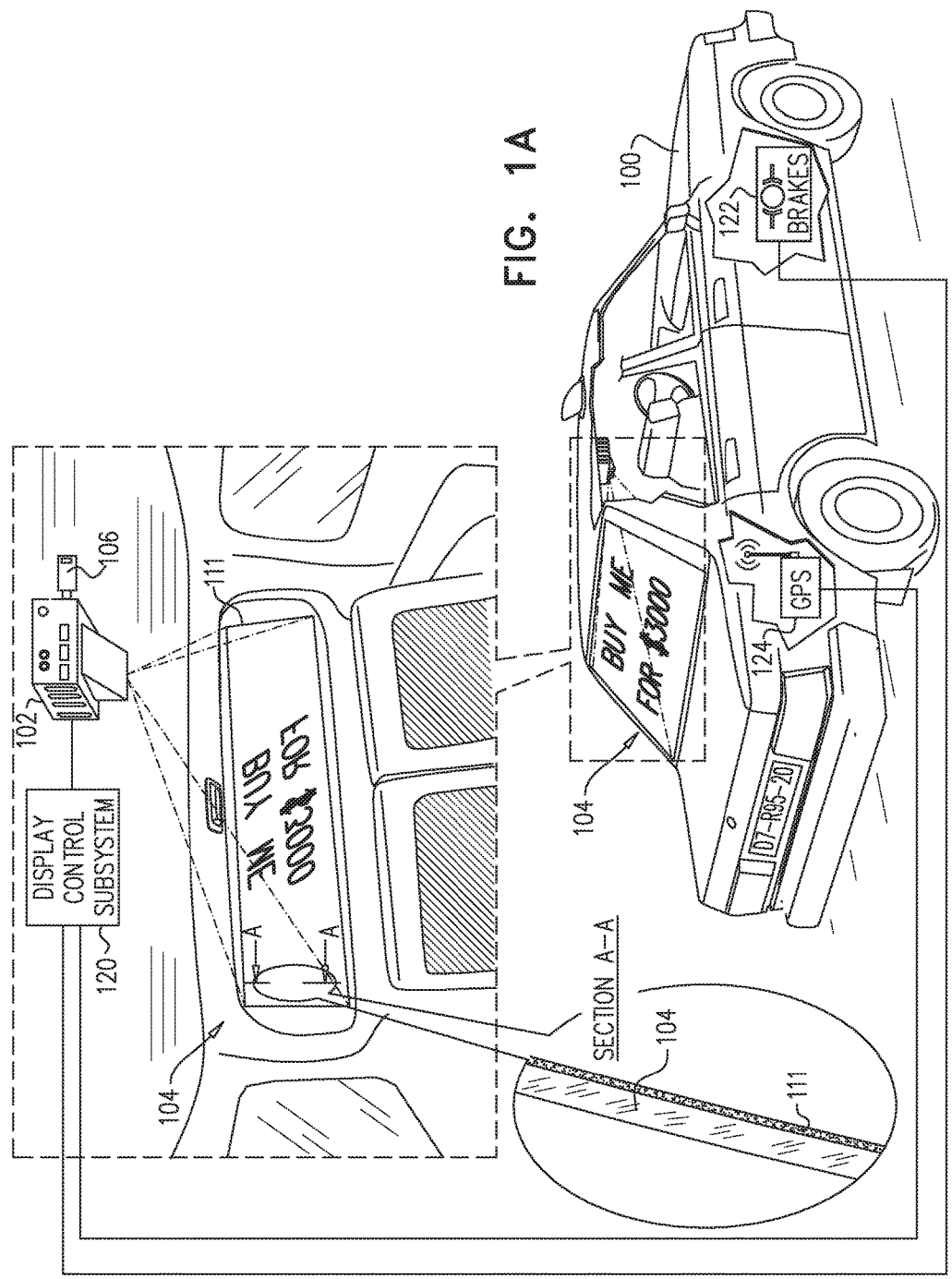

The projection systems of FIGS. 1A-1E each preferably employ one of the following projection configurations:

1. A fixed semi-opaque configuration as illustrated in FIG. 1A, wherein rear windshield 104 is preferably coated with a suitable rear projection film 111 such as 3M™ Vikuiti™ Rear Projection Film, commercially available from 3M of St. Paul, Minn. It is appreciated that the coating of rear windshield 104 with rear projection film is operative to transform windshield 104 into a semi-opaque projection screen for projector 102, whereby visually sensible patterns projected by projector 102 onto rear windshield 104 are visible from the exterior of windshield 104. Alternatively, rear windshield 104 may be formed with a suitable rear projection material embedded therewithin, such as LC Smartglass™ commercially available from SmartGlass International Ltd. of Dublin, Ireland, thereby transforming windshield 104 into a semi-opaque projection screen for projector 102, whereby visually sensible patterns projected by projector 102 onto rear windshield 104 are visible from the exterior of windshield 104.

2. A deployable semi-opaque configuration as illustrated in FIG. 1B, wherein a deployable semi-opaque projection film 112 is preferably rollably mounted in close proximity to windshield 104, whereby deployment of deployable semi-opaque projection film 112 is achieved by unrolling thereof prior to projection. When unrolled, deployable semi-opaque projection film 112 can have patterns projected thereupon, which patterns are visible from the exterior of windshield 104.

Figure 1C:
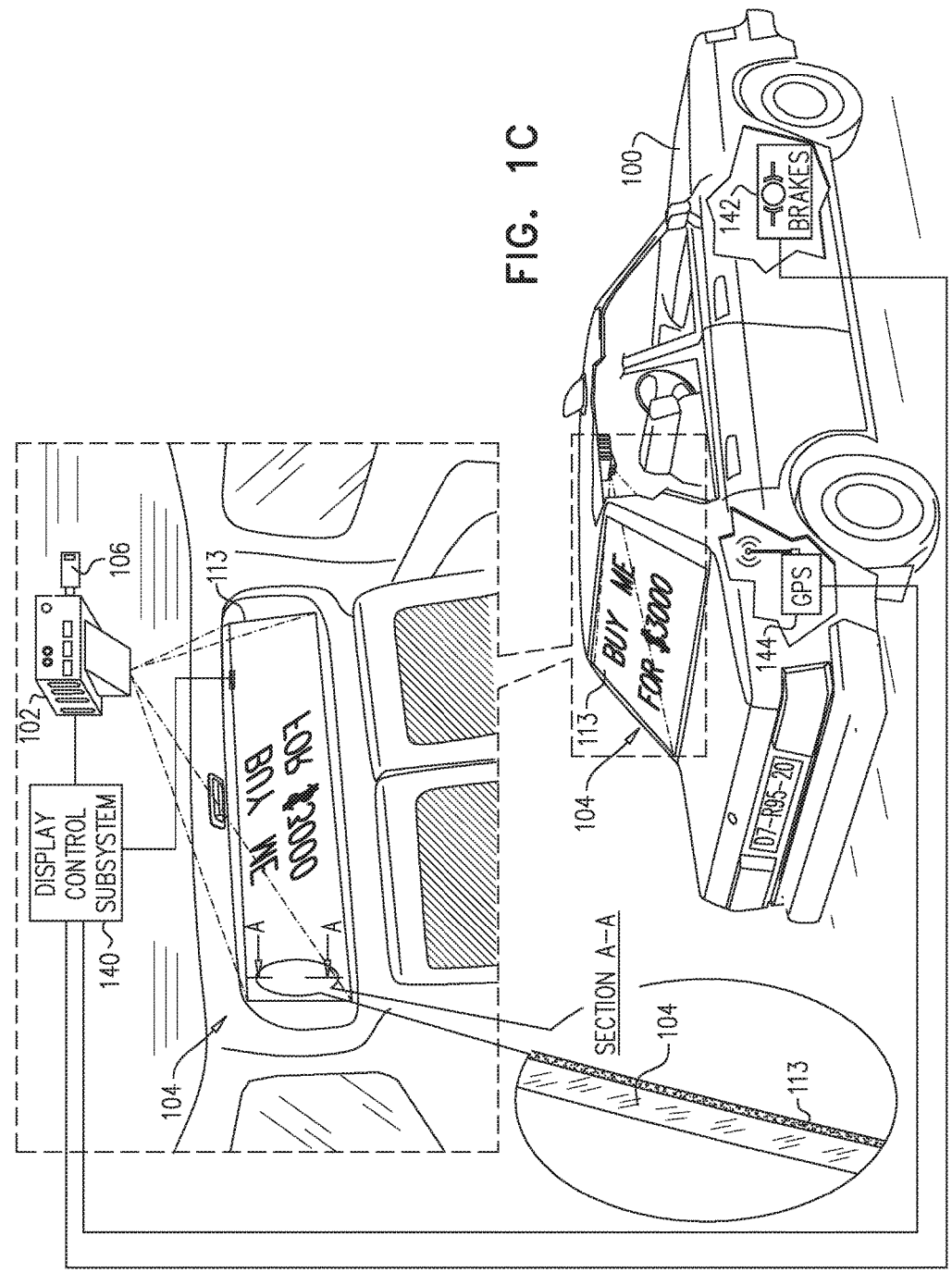

3. An activatable semi-opaque configuration as illustrated in FIG. 1C, wherein rear windshield 104 is preferably coated with a suitable activatable rear projection film 113 such as DMD Magic SF, commercially available from DMDisplay of Seoul, Korea. It is appreciated that the coating of rear windshield 104 with activatable rear projection film 113 is operative to transform windshield 104 into a projection screen for projector 102, whereby visually sensible patterns projected by projector 102 onto rear windshield 104 are visible from the exterior of windshield 104. Alternatively, rear windshield 104 may be formed with a suitable activatable rear projection material embedded therewithin, such as DMD Magic Glass commercially available from DMDisplay of Seoul, Korea.

Figure 1D:
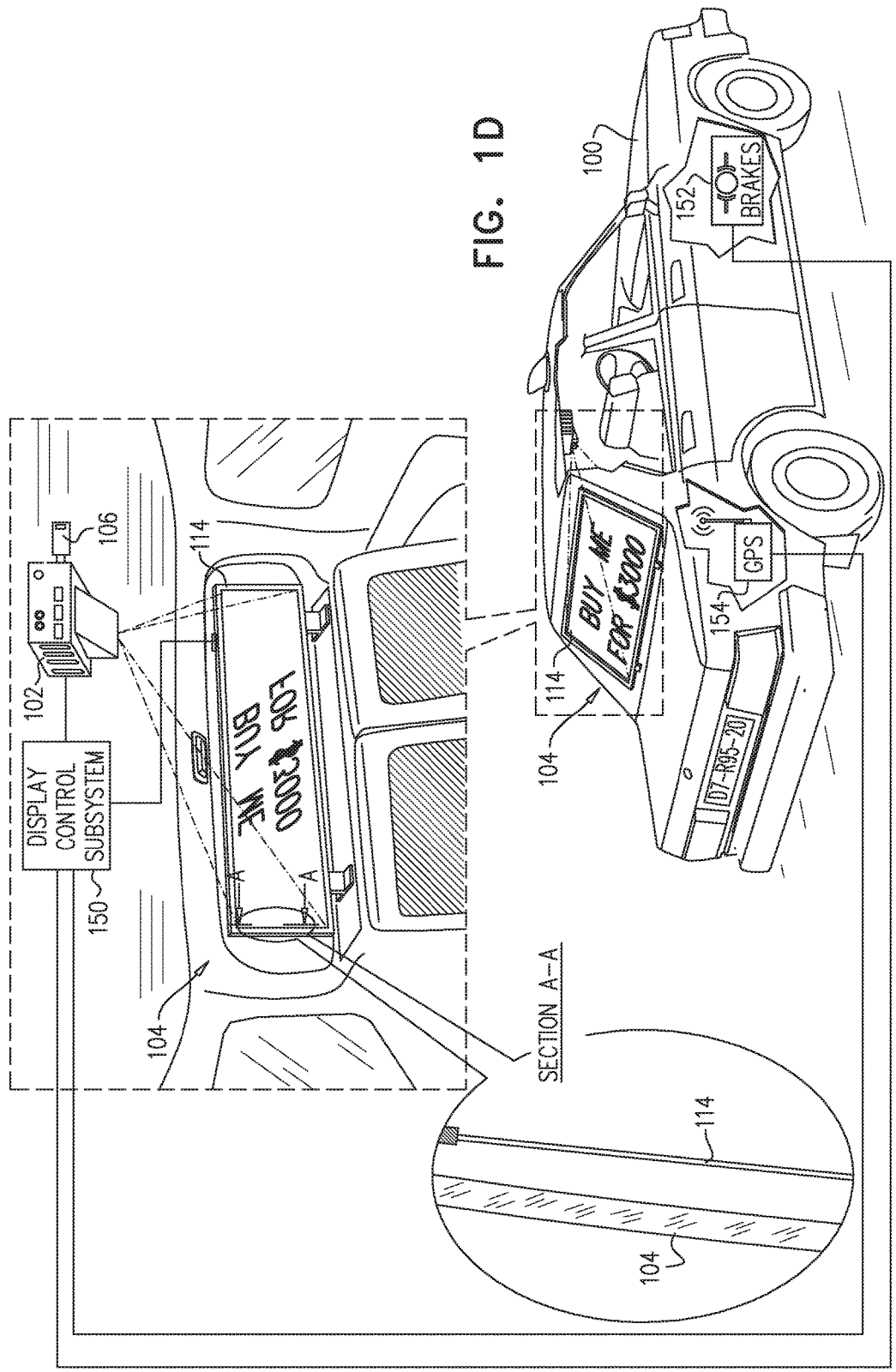

4. An activatable semi-opaque configuration as illustrated in FIG. 1D, wherein a rear projection screen 114 comprising a frame housing a suitable activatable rear projection film is mounted in close proximity to rear windshield 104. A suitable activatable rear projection film may be, for example, DMD Magic SF, commercially available from DMDisplay of Seoul, Korea. It is appreciated that visually sensible patterns projected by projector 102 onto screen 114 are visible from the exterior of windshield 104.

5. A deployable emissive configuration as illustrated in FIG. 1E, wherein a suitable rollable emissive display 115 is mounted in close proximity to rear windshield 104 of vehicle 100. Emissive display 115 may be, for example, a rollable OTFT-driven OLED display, commercially available from Sony Corporation, of Tokyo, Japan.

As shown in particular in the fixed semi-opaque configuration of FIG. 1A, a display control subsystem 120 is preferably provided for controlling projector 102. Preferably, control subsystem 120 is triggered by at least one subsystem of the vehicle such as, for example, a braking subsystem 122 or a GPS location subsystem 124. Display control subsystem 120 may be any suitable control subsystem such as a Pixie™, commercially available from SP Controls, Inc. of South San Francisco, Calif. It is appreciated that responsive to signals from a subsystem of the vehicle, display control subsystem 120 is operative to instruct projector 102 to continuously display suitable visually sensible patterns retrieved from media memory device 106 onto rear projection film 111 of rear windshield 104 or to cease displaying visually sensible patterns onto rear projection film 111. It is appreciated that display control subsystem 120 may also be operative to retrieve, for example, data relating to the current position and speed of the vehicle and to instruct projector 102 to display the data. This data may be retrieved, for example, from GPS location subsystem 124.

Alternatively, as shown in the deployable semi-opaque configuration of FIG. 1B, a display control subsystem 130 is preferably provided for controlling projector 102 and the deployment and retraction of deployable semi-opaque projection film 112. Preferably, control subsystem 130 is triggered by at least one subsystem of the vehicle such as, for example, a braking subsystem 132 or a GPS location subsystem 134. Display control subsystem 130 may be any suitable control subsystem such as a Pixie™, commercially available from SP Controls, Inc. of South San Francisco, Calif. It is appreciated that responsive to signals from a subsystem of the vehicle, display control subsystem 130 is operative to deploy deployable semi-opaque projection film 112 and to instruct projector 102 to continuously display suitable visually sensible patterns retrieved from media memory device 106 onto deployable semi-opaque projection film 112 or to cease displaying visually sensible patterns onto deployable semi-opaque projection film 112. It is appreciated that display control subsystem 130 may also be operative to retrieve, for example, data relating to the current position and speed of the vehicle and to instruct projector 102 to project the data. This data may be retrieved, for example, from GPS location subsystem 134.

It is appreciated that deployment and retraction of deployable semi-opaque projection film 112 by control subsystem 130 is achieved by controlling a display deploying mechanism 136 which is mounted in close proximity to rear windshield 104 and which is operative to unroll and to roll deployable semi-opaque projection film 112.

Alternatively, as shown in the activatable semi-opaque configuration of FIG. 1C, a display control subsystem 140 is preferably provided for controlling projector 102 and the activation and deactivation of activatable rear projection film 113. Preferably, control subsystem 140 is triggered by at least one subsystem of the vehicle such as, for example, a braking subsystem 142 or a GPS location subsystem 144. Display control subsystem 140 may be any suitable control subsystem such as a Pixie™, commercially available from SP Controls, Inc. of South San Francisco, Calif. It is appreciated that responsive to signals from a subsystem of the vehicle, display control subsystem 140 is operative to activate activatable rear projection film 113 and to instruct projector 102 to continuously display suitable visually sensible patterns retrieved from media memory device 106 onto rear windshield 104 or to cease displaying visually sensible patterns onto activatable rear projection film 113. It is appreciated that display control subsystem 140 may also be operative to retrieve, for example, data relating to the current position and speed of the vehicle and to instruct projector 102 to display the data. This data may be retrieved, for example, from GPS location subsystem 144.

Alternatively, as shown in the activatable semi-opaque configuration of FIG. 1D, a display control subsystem 150 is preferably provided for controlling projector 102 and the activation and deactivation of activatable rear projection screen 114. Preferably, control subsystem 150 is triggered by at least one subsystem of the vehicle such as, for example, a braking subsystem 152 or a GPS location subsystem 154. Display control subsystem 150 may be any suitable control subsystem such as a Pixie™, commercially available from SP Controls, Inc. of South San Francisco, Calif. It is appreciated that responsive to signals from a subsystem of the vehicle, display control subsystem 150 is operative to activate activatable rear projection screen 114 and to instruct projector 102 to continuously display suitable visually sensible patterns retrieved from media memory device 106 onto rear projection screen 114 or to cease displaying visually sensible patterns onto activatable rear projection screen 114. It is appreciated that display control subsystem 150 may also be operative to retrieve, for example, data relating to the current position and speed of the vehicle and to instruct projector 102 to display the data. This data may be retrieved, for example, from GPS location subsystem 154.

Alternatively, as shown in the deployable emissive configuration FIG. 1E, a display control subsystem 160 is preferably provided for controlling emissive display 115. Preferably, display control subsystem 160 is triggered by at least one subsystem of the vehicle such as, for example, a braking subsystem 162 or a GPS location subsystem 164. Display control subsystem 160 may be any suitable control subsystem such as a Pixie™, commercially available from SP Controls, Inc. of South San Francisco, Calif. It is appreciated that responsive to signals from a subsystem of the vehicle, display control subsystem 160 is operative to deploy rollable emissive display 115 and to instruct emissive display 115 to continuously display suitable visually sensible patterns retrieved from media memory device 106 via emissive display 115 or to retract rollable emissive display 115 and to cease displaying visually sensible patterns via emissive display 115. It is appreciated that display control subsystem 160 may also be operative to retrieve, for example, data relating to the current position and speed of the vehicle and to instruct emissive display 115 to display the data. This data may be retrieved, for example, from GPS location subsystem 164.

It is appreciated that deployment and retraction of emissive display 115 by display control subsystem 160 is achieved by controlling a display deploying mechanism 166 which is mounted in close proximity to rear windshield 104 and which is operative to unroll and to roll emissive display 115.

Figure 2A:
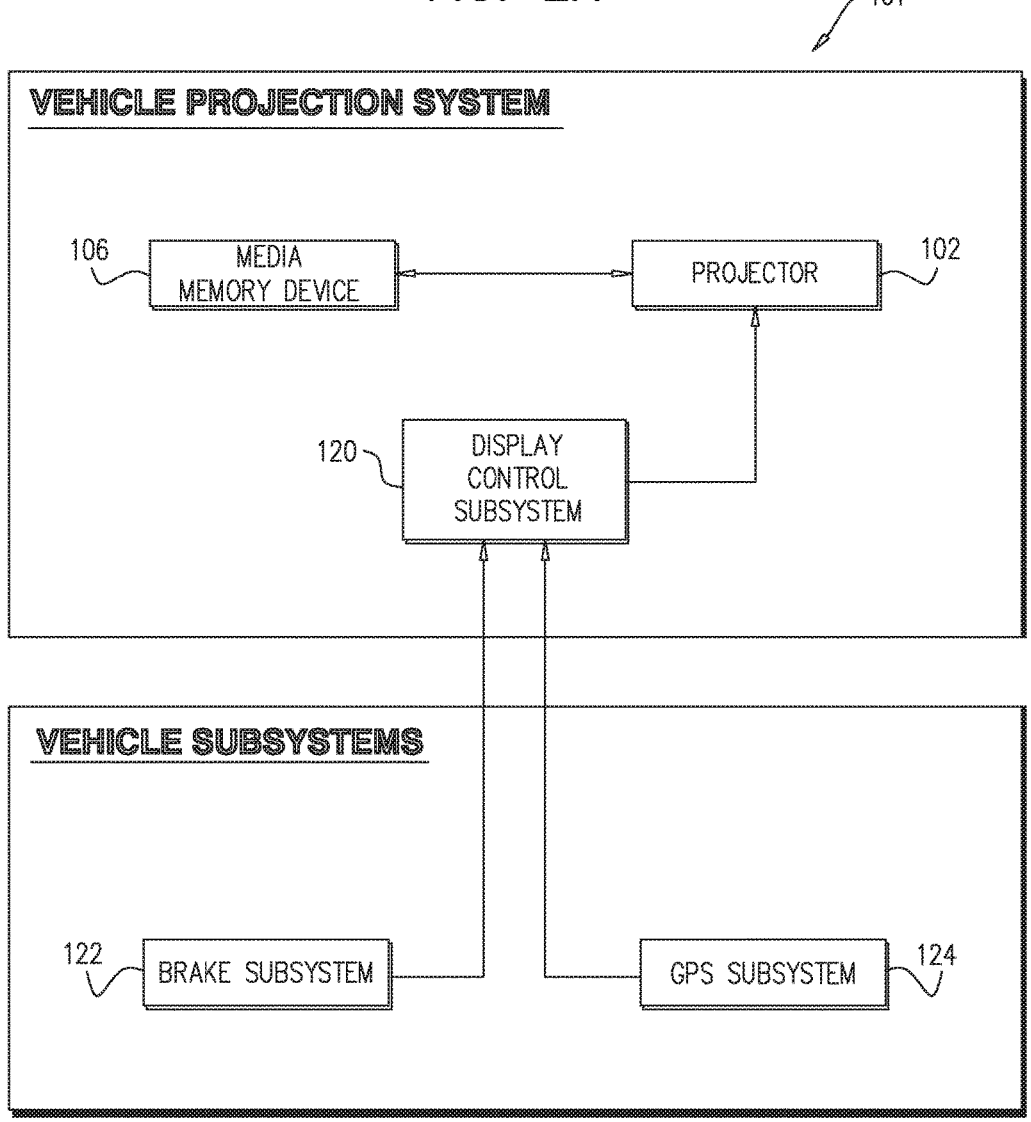

Reference is now made to FIG. 2A which is a simplified block diagram illustration of the vehicle projection system of FIG. 1A. As shown in FIG. 2A, the vehicle projection system 161 includes projector 102, media memory device 106 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved from media memory device 106 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Reference is now made to FIG. 2B which is a simplified block diagram illustration of the vehicle projection system of FIG. 1B. As shown in FIG. 2B, the vehicle projection system 162 includes projector 102, media memory device 106 and display control subsystem 130. Display control subsystem 130 preferably communicates with vehicle braking subsystem 132 and with vehicle GPS location subsystem 134. Responsive to triggering signals received from at least one of subsystems 132 and 134, display control subsystem 130 is operative to employ display deploying mechanism 136 to deploy deployable semi-opaque projection film 112 and to instruct projector 102 to display suitable visually sensible patterns retrieved from media memory device 106 onto film 112, and to employ display deploying mechanism 136 to retract projection film 112 and to cease displaying visually sensible patterns onto film 112. Triggering signals from braking subsystem 132 may include, for example, an indication that the vehicle's brakes have been engaged or disengaged, or that the speed of the vehicle has exceeded above a predefined threshold or has decreased below a predefined threshold. Triggering signals from GPS location subsystem 134 may include, for example, the current location of the vehicle or the current distance of the vehicle from a predefined location or starting-point.

Figure 2C:
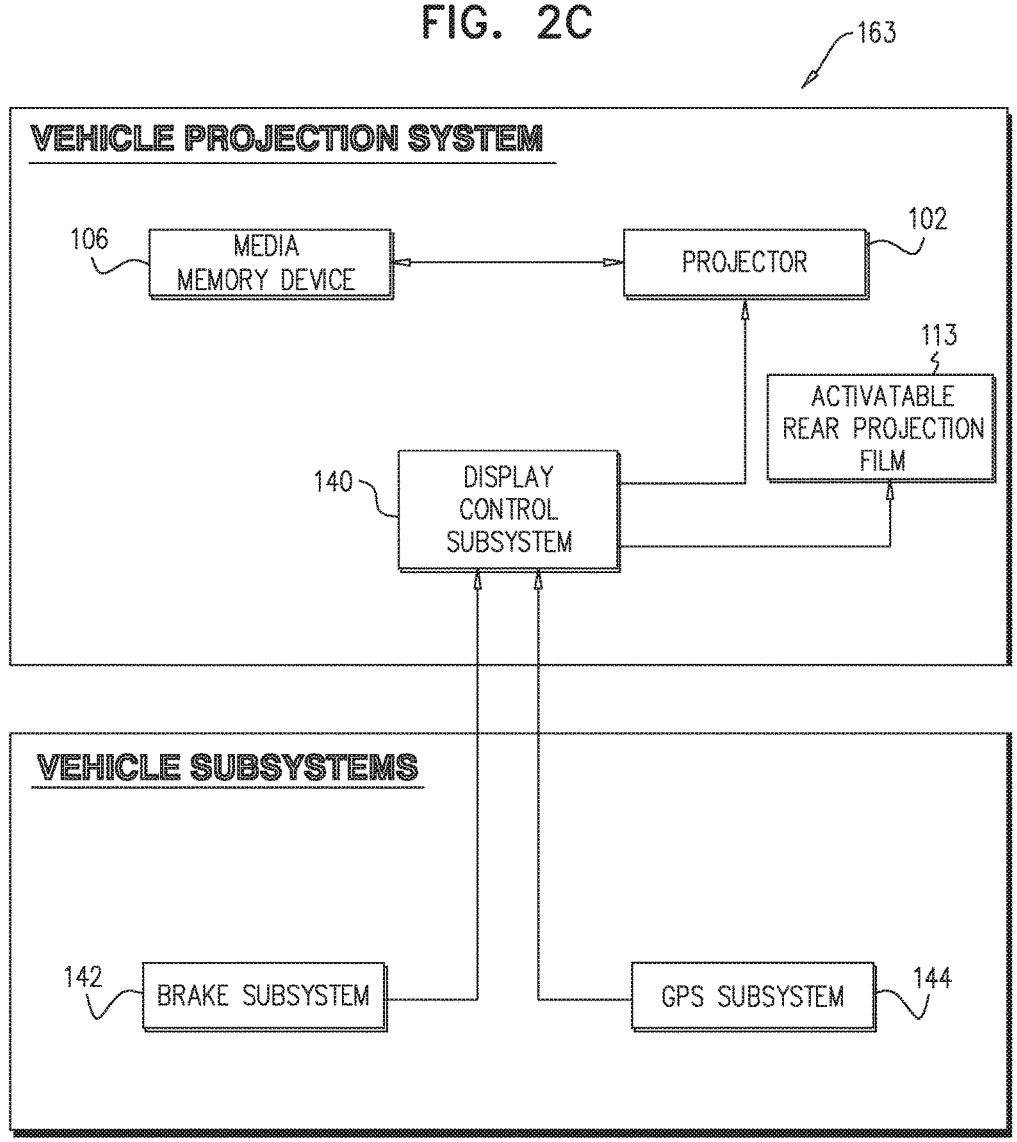

Reference is now made to FIG. 2C which is a simplified block diagram illustration of the vehicle projection system of FIG. 1C. As shown in FIG. 2C, the vehicle projection system 163 includes projector 102, media memory device 106 and display control subsystem 140. Display control subsystem 140 preferably communicates with vehicle braking subsystem 142 and with vehicle GPS location subsystem 144. Responsive to triggering signals received from at least one of subsystems 142 and 144, display control subsystem 140 is operative to activate activatable rear projection film 113, which coats rear windshield 104, and to instruct projector 102 to continuously display suitable visually sensible patterns retrieved from media memory device 106 onto rear windshield 104 or to cease displaying visually sensible patterns onto rear windshield 104. Triggering signals from braking subsystem 142 may include, for example, an indication that the vehicle's brakes have been engaged or disengaged, or that the speed of the vehicle has exceeded above a predefined threshold or has decreased below a predefined threshold. Triggering signals from GPS location subsystem 144 may include, for example, the current location of the vehicle or the current distance of the vehicle from a predefined location or starting-point.

Reference is now made to FIG. 2D which is a simplified block diagram illustration of the vehicle projection system of FIG. 1D. As shown in FIG. 2D, the vehicle projection system 164 includes projector 102, media memory device 106 and display control subsystem 150. Display control subsystem 150 preferably communicates with vehicle braking subsystem 152 and with vehicle GPS location subsystem 154. Responsive to triggering signals received from at least one of subsystems 152 and 154, display control subsystem 150 is operative to activate activatable rear projection screen 114 and to instruct projector 102 to continuously display suitable visually sensible patterns retrieved from media memory device 106 onto rear windshield 104 or to cease displaying visually sensible patterns onto rear windshield 104. Triggering signals from braking subsystem 152 may include, for example, an indication that the vehicle's brakes have been engaged or disengaged, or that the speed of the vehicle has exceeded above a predefined threshold or has decreased below a predefined threshold. Triggering signals from GPS location subsystem 154 may include, for example, the current location of the vehicle or the current distance of the vehicle from a predefined location or starting-point.

Reference is now made to FIG. 2E which is a simplified block diagram illustration of the vehicle projection system of FIG. 1E. As shown in FIG. 2E, the vehicle projection system 165 includes rollable emissive display 115, media memory device 106 and display control subsystem 160. Display control subsystem 160 preferably communicates with vehicle braking subsystem 162 and with vehicle GPS location subsystem 164. Responsive to triggering signals received from at least one of subsystems 162 and 164, display control subsystem 160 is operative to employ display deploying mechanism 166 to deploy rollable emissive display 115 and to instruct emissive display 115 to continuously display suitable visually sensible patterns retrieved from media memory device 106 via emissive display 115, and to employ display deploying mechanism 166 to retract rollable emissive display 115 and to cease displaying visually sensible patterns via emissive display 115. Triggering signals from braking subsystem 162 may include, for example, an indication that the vehicle's brakes have been engaged or disengaged, or that the speed of the vehicle has exceeded above a predefined threshold or has decreased below a predefined threshold. Triggering signals from GPS location subsystem 164 may include, for example, the current location of the vehicle or the current distance of the vehicle from a predefined location or starting-point.

It is appreciated that deployment and retraction of emissive display 115 by display control subsystem 160 is achieved by controlling a display deploying mechanism 166 which is mounted in close proximity to rear windshield 104 and which is operative to unroll and to roll emissive display 115.

Figure 3B:
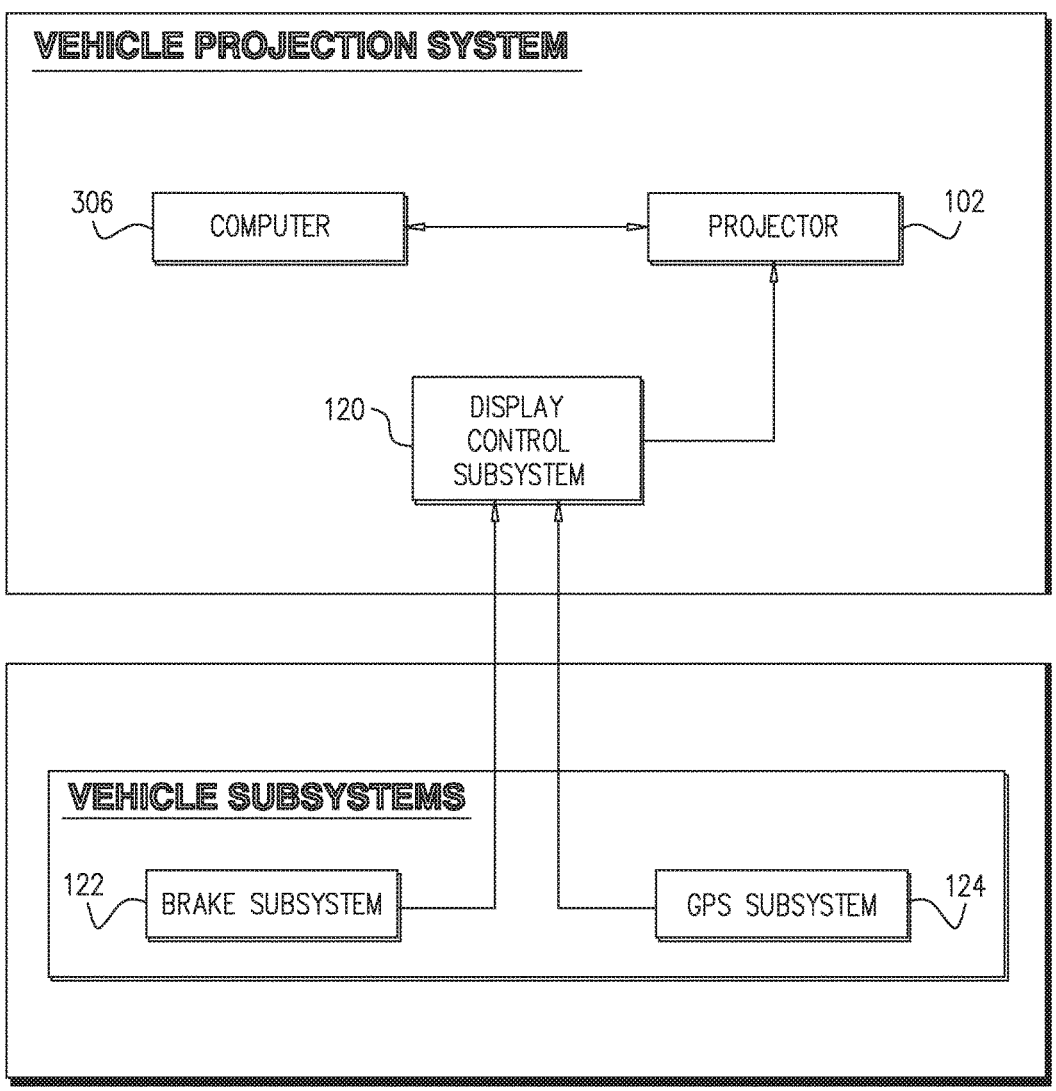
FIG. 3B is a simplified block diagram illustration of the vehicle projection system of FIG. 3A.

Reference is now made to FIG. 3A, which is a simplified pictorial illustration of an example of the use of a vehicle projection system, constructed and operative in accordance with another preferred embodiment of the present invention, and to FIG. 3B, which is a simplified block diagram illustration of the vehicle projection system of FIG. 3A. The system of FIGS. 3A & 3B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 3A & 3B preferably employs the fixed semi-opaque configuration of FIG. 1A mounted in vehicle 300. Alternatively, the system of FIGS. 3A & 3B may employ any of the alternate projection configurations illustrated in FIGS. 1B-1E.

As shown in FIG. 3A, a computer 306 communicating with projector 102 is provided for storing and\or generating visually sensible patterns suitable for display by projector 102. Computer 306 may be, for example, any suitable commercially available computer system. The visually sensible patterns suitable for display on projector 102 and stored and\or generated by computer 306 may be, for example any of text, graphic images or video images such as advertisements, pictures, video clips or movies. It is appreciated that the communication between computer 306 and projector 102 may be either wired or wireless.

It is appreciated that responsive to signals from a subsystem of the vehicle, display control subsystem 120 is preferably operative to instruct projector 102 to continuously display suitable visually sensible patterns retrieved from computer 306 onto rear projection film 111 of rear windshield 104 or to cease displaying visually sensible patterns onto rear projection film 111 of rear windshield 104.

Turning now to FIG. 3B, it is shown that the vehicle projection system 325 includes projector 102, computer 306 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved from computer 306 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Reference is now made to FIG. 4A, which is a simplified pictorial illustration of an example of the use of a vehicle projection system, constructed and operative in accordance with yet another preferred embodiment of the present invention, and to FIG. 4B, which is a simplified block diagram illustration of the vehicle projection system of FIG. 4A. The system of FIGS. 4A & 4B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 4A & 4B preferably employs the fixed semi-opaque configuration of FIG. 1A mounted in vehicle 400. Alternatively, the system of FIGS. 4A & 4B may employ any of the alternate projection configurations illustrated in FIGS. 1B-1E.

As shown in FIG. 4A, a cellular telephone 406 communicating with projector 102 is provided for storing and\or downloading and\or streaming visually sensible patterns suitable for display by projector 102. Cellular telephone 406 may be, for example, any suitable commercially available cell phone having video storage and\or downloading and\or streaming capabilities and having video output capability such as, for example, a Nokia 6500 commercially available from Nokia of Helsinki, Finland. The visually sensible patterns suitable for display on projector 102 and stored and\or downloaded and\or streamed by cellular telephone 406 may be, for example, any of text, graphic images and video images such as advertisements, pictures, video clips or movies. It is appreciated that the communication between cellular telephone 406 and projector 102 may be either wired or wireless.

It is appreciated that responsive to signals from a subsystem of the vehicle, display control subsystem 120 is preferably operative to instruct projector 102 to continuously display suitable visually sensible patterns received by cellular telephone 406 onto rear projection film 111 of rear windshield 104 or to cease displaying visually sensible patterns onto rear projection film 111 of rear windshield 104.

Turning now to FIG. 4B, it is shown that the vehicle projection system 425 includes projector 102, cellular telephone 406 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved by cellular telephone 406 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 5A:
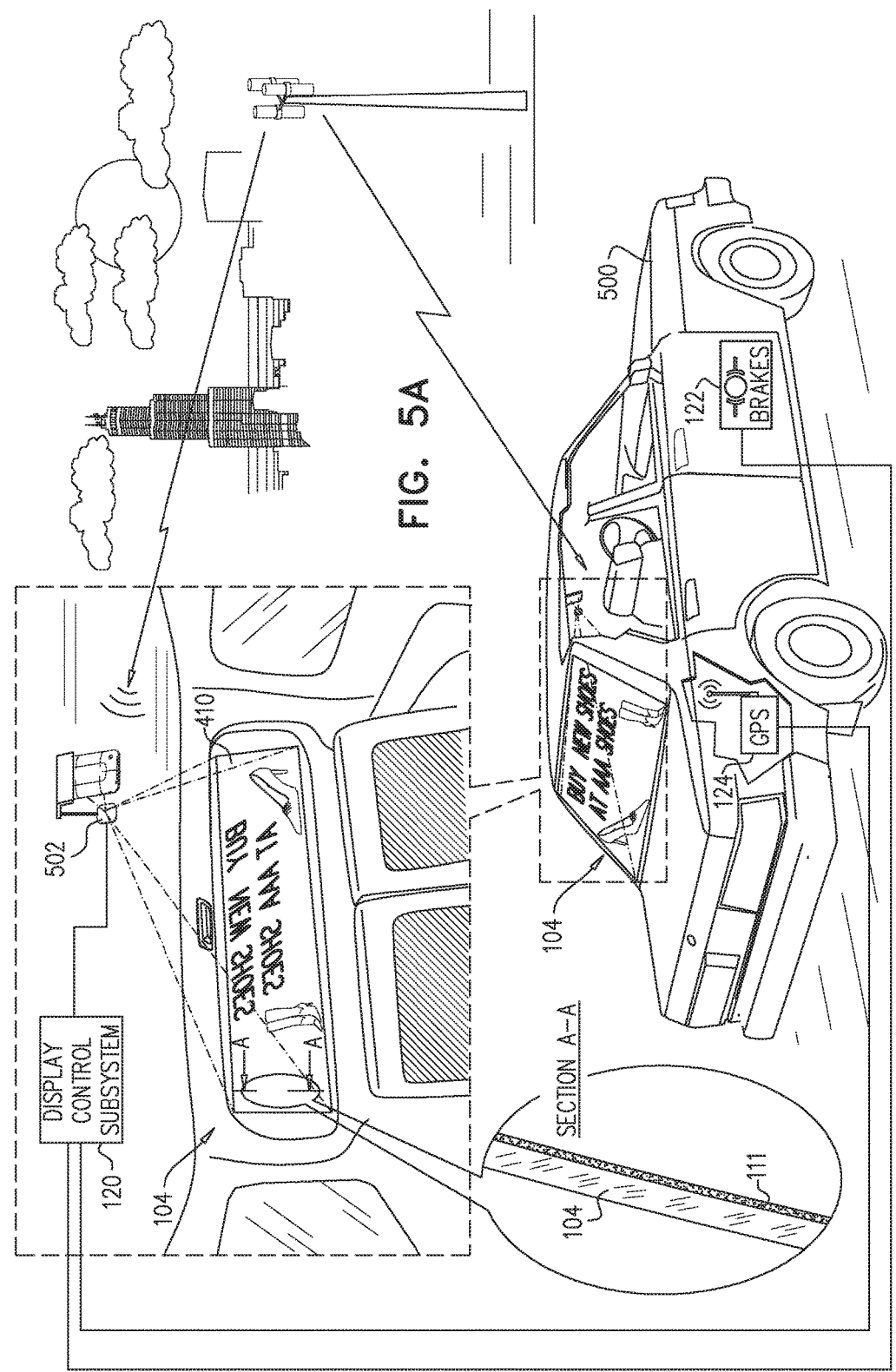
FIG. 5A is a simplified pictorial illustration of an example of the use of a vehicle projection system, constructed and operative in accordance with still another preferred embodiment of the present invention.
Figure 5B:
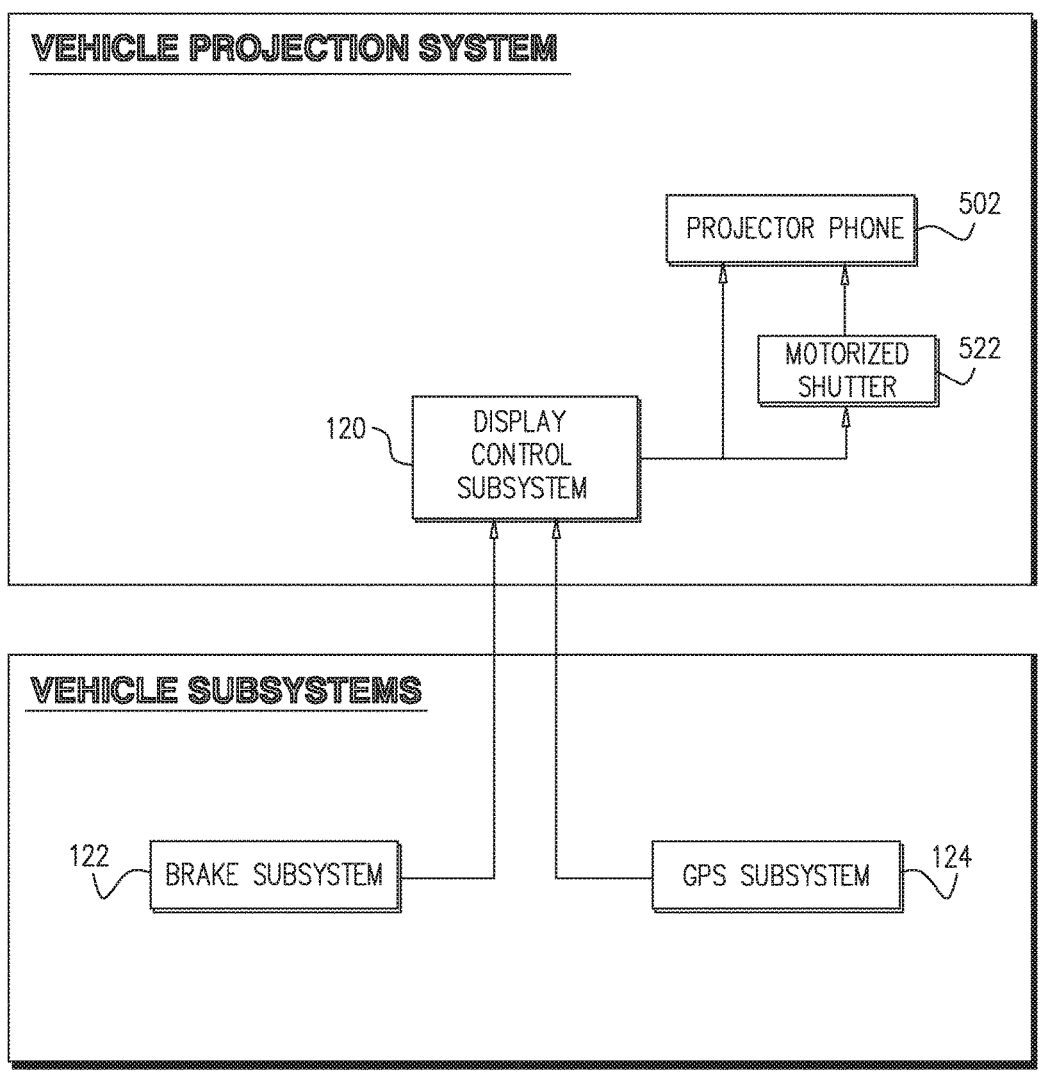
FIG. 5B is a simplified block diagram illustration of the vehicle projection system of FIG. 5A.

Reference is now made to FIG. 5A, which is a simplified pictorial illustration of an example of the use of a vehicle projection system, constructed and operative in accordance with yet another preferred embodiment of the present invention, and to FIG. 5B, which is a simplified block diagram illustration of the vehicle projection system of FIG. 5A. The system of FIGS. 5A & 5B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 5A & 5B preferably employs the fixed semi-opaque configuration of FIG. 1A mounted in vehicle 500. Alternatively, the system of FIGS. 5A & 5B may employ any of the alternate projection configurations illustrated in FIGS. 1B-1D.

As shown in FIG. 5A, projector 102 is obviated and motor vehicle 100 is instead equipped with a mounted projector phone 502 which is trained on a rear windshield 104 of vehicle 100. Alternatively, projector phone 502 may be trained on any other surface of vehicle 100. Projector phone 502 may be any suitable cellular telephone having an embedded projector, such as, for example, a Samsung Beam Projector Phone commercially available from Samsung of Seoul, South Korea. Alternatively, a standard cellular telephone integrated with a mobile projector may be employed, such as, for example, an LG eXpo telephone integrated with an LG Mobile Projector, both commercially available from LG Electronics of Seoul, South Korea.

Projector phone 502 is also preferably operable for storing and\or downloading and\or streaming visually sensible patterns suitable for display on rear windshield 104. The visually sensible patterns suitable for display on rear windshield 104 and stored and\or downloaded and\or streamed by projector phone 502 may be, for example, any of text, graphic images or video images such as advertisements, pictures, video clips or movies.

It is appreciated that responsive to signals from the vehicle's subsystem, control subsystem 120 is preferably operative to instruct a motorized shutter 522 to continuously enable display by projector phone 502 of suitable visually sensible patterns received by projector phone 502 onto rear projection film 111 of rear windshield 104 or to disable display by projector phone 102 onto rear projection film 111 of rear windshield 104.

Turning now to FIG. 5B, it is shown that the vehicle projection system 525 includes projector phone 502, and display control subsystem 120 which preferably controls motorized shutter 522. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector phone 502 to continuously display suitable visually sensible patterns received thereby onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 6A:
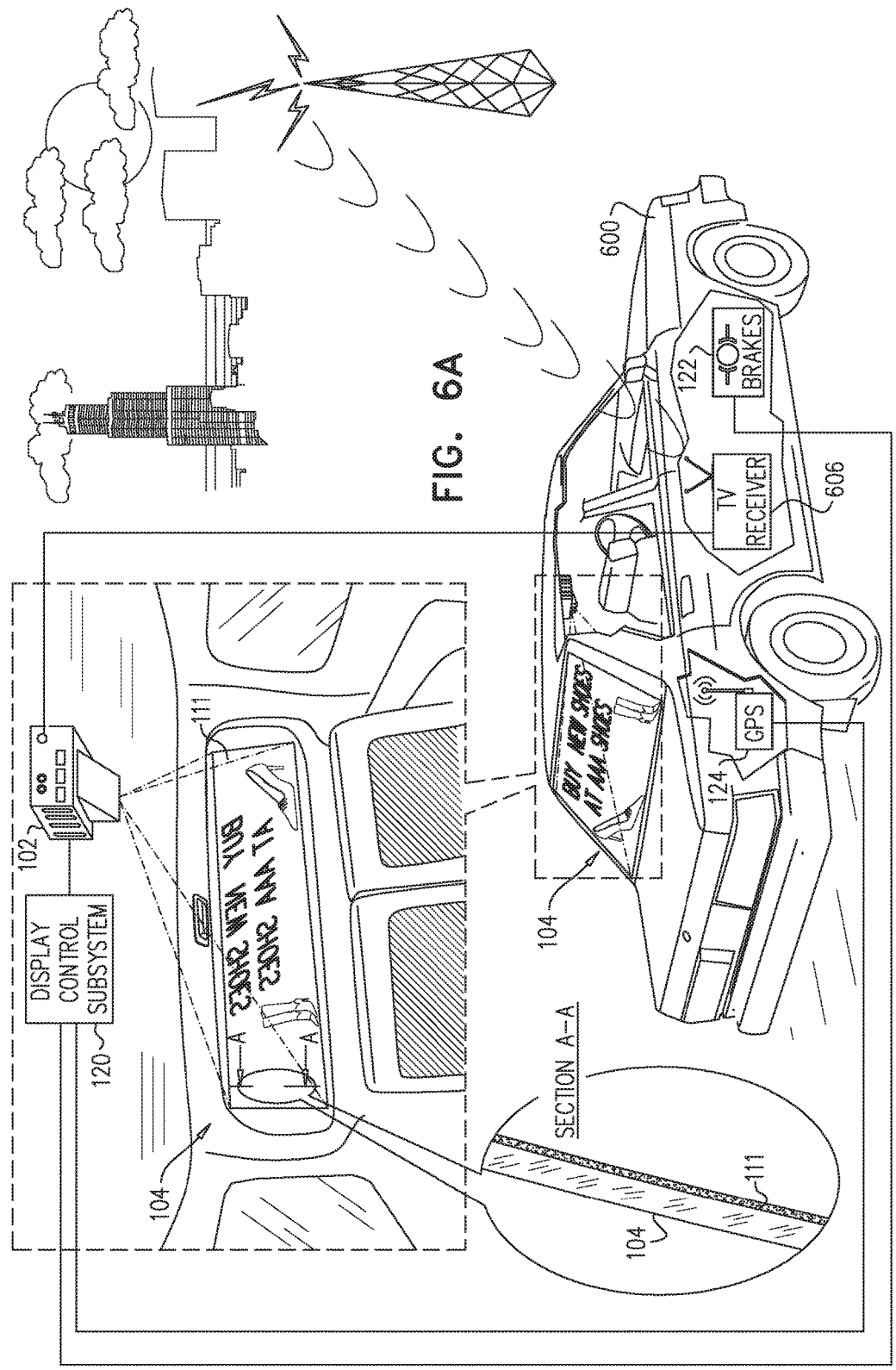
FIG. 6A is a simplified pictorial illustration of an example of the use of a vehicle projection system, constructed and operative in accordance with still another preferred embodiment of the present invention.
Figure 6B:
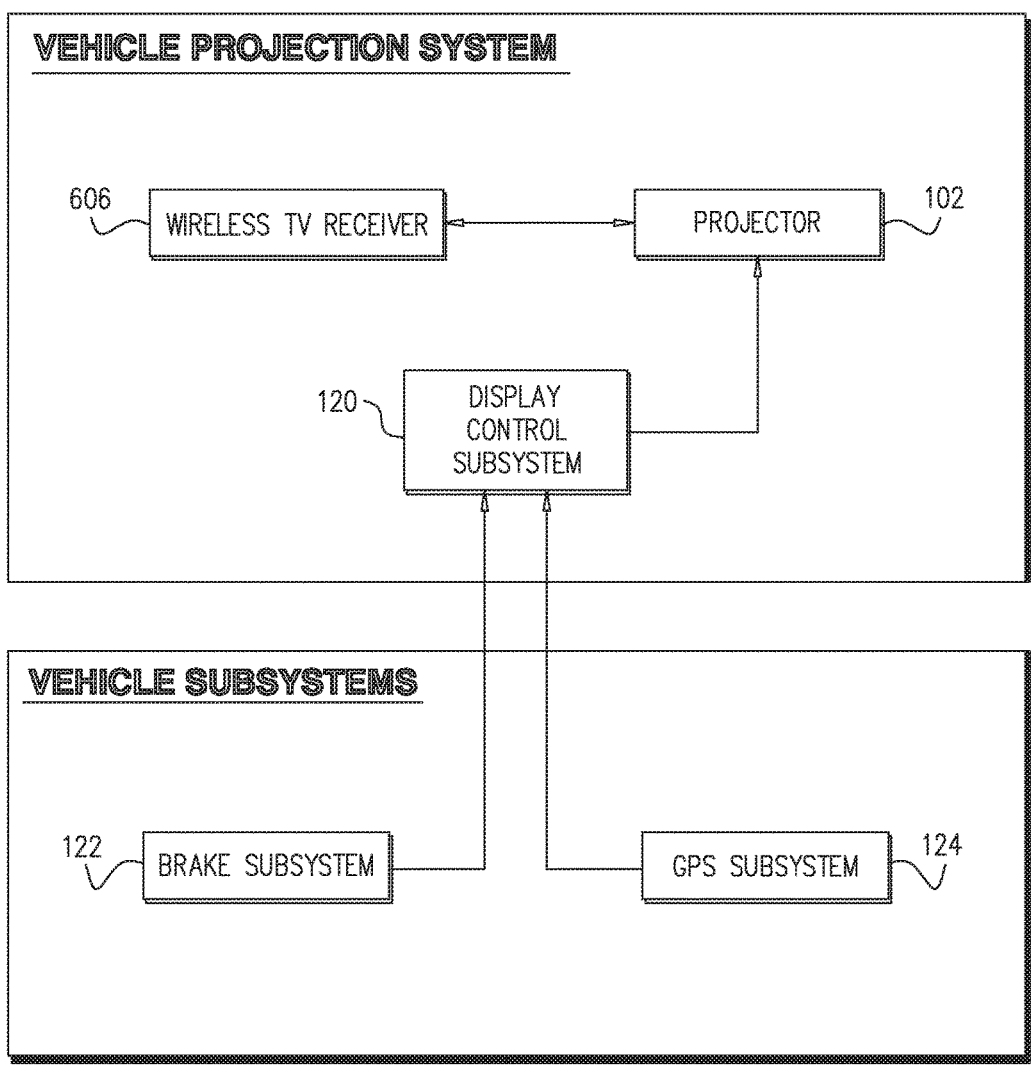
FIG. 6B is a simplified block diagram illustration of the vehicle projection system of FIG. 6A.

Reference is now made to FIG. 6A, which is a simplified pictorial illustration of an example of the use of a vehicle projection system, constructed and operative in accordance with yet another preferred embodiment of the present invention, and to FIG. 6B, which is a simplified block diagram illustration of the vehicle projection system of FIG. 6A. The system of FIGS. 6A & 6B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 6A & 6B preferably employs the fixed semi-opaque configuration of FIG. 1A mounted in vehicle 600. Alternatively, the system of FIGS. 6A & 6B may employ any of the alternate projection configurations illustrated in FIGS. 1B-1E.

As shown in FIG. 6A, A wireless TV receiver 606 communicating with projector 102 is provided for receiving visually sensible patterns suitable for display by projector 102. Wireless TV receiver 606 may be, for example, any suitable commercially available wireless TV receiver having television receiving capabilities and video output capability such as, for example, a Samsung DTB-H260F commercially available from Samsung of Seoul, South Korea. The visually sensible patterns suitable for display on projector 102 and received by wireless TV receiver 606 may be, for example any of text, graphic images or video images such as advertisements, pictures, video clips or movies. It is appreciated that the communication between wireless TV receiver 606 and projector 102 may be either wired or wireless.

It is appreciated that responsive to signals from a subsystem of the vehicle, display control subsystem 120 is preferably operative to instruct projector 102 to continuously display suitable visually sensible patterns received by wireless TV receiver 606 onto rear projection film 111 of rear windshield 104 or to cease displaying visually sensible patterns onto rear projection film 111 of rear windshield 104.

Turning now to FIG. 6B, it is shown that the vehicle projection system 625 includes projector 102, wireless TV receiver 606 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved by wireless TV receiver 606 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 7B:
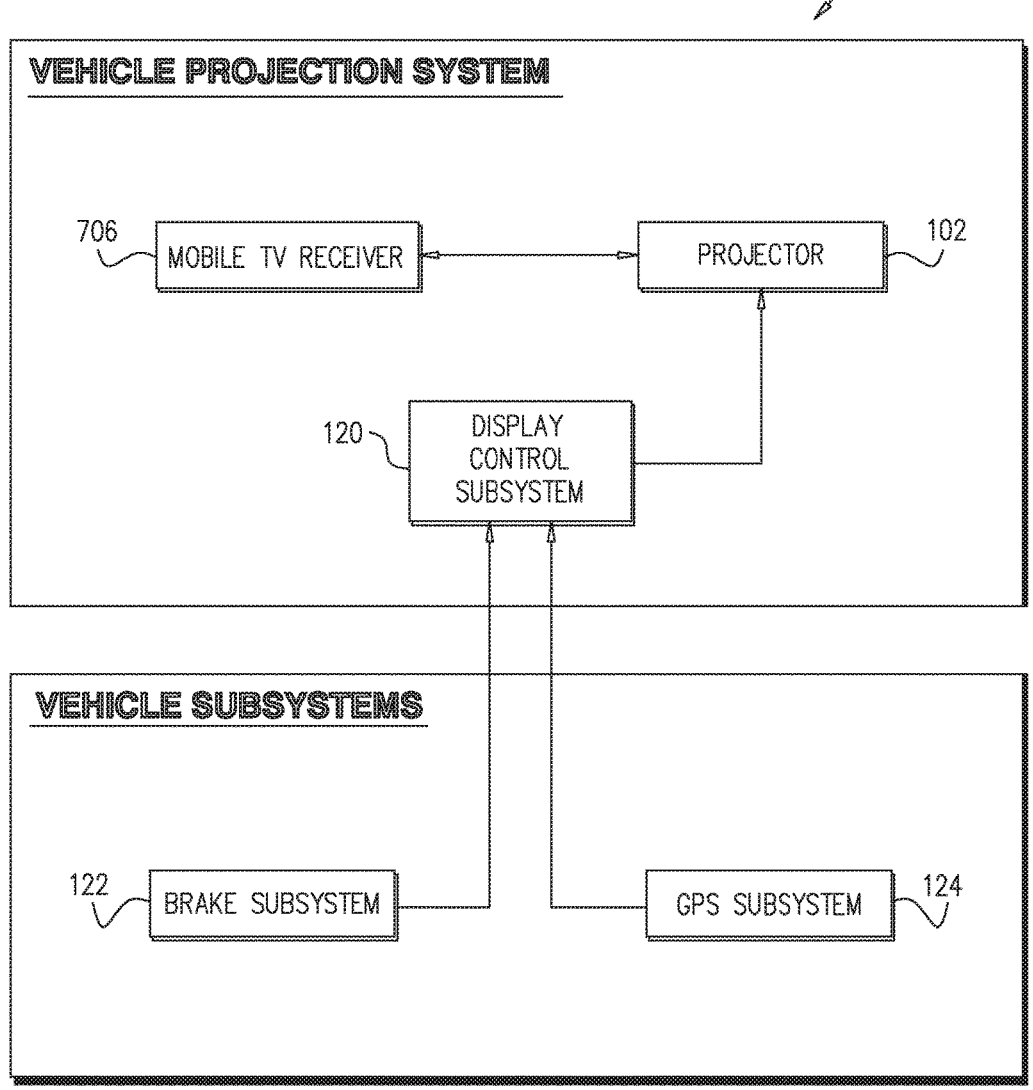
FIG. 7B is a simplified block diagram illustration of the vehicle projection system of FIG. 7A.

Reference is now made to FIG. 7A, which is a simplified pictorial illustration of an example of the use of a vehicle projection system, constructed and operative in accordance with yet another preferred embodiment of the present invention, and to FIG. 7B, which is a simplified block diagram illustration of the vehicle projection system of FIG. 7A. The system of FIGS. 7A & 7B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 7A & 7B preferably employs the fixed semi-opaque configuration of FIG. 1A mounted in vehicle 700. Alternatively, the system of FIGS. 7A & 7B may employ any of the alternate projection configurations illustrated in FIGS. 1B-1E.

As shown in FIG. 7A, a mobile TV receiver 706 communicating with projector 102 is provided for receiving visually sensible patterns suitable for display by projector 102. Mobile TV receiver 706 may be, for example, any suitable commercially available mobile TV receiver having television receiving capabilities and video output capability such as, for example, an MDVT 0701 TV receiver commercially available from E-TEK Digital Cooperation Ltd. of Xiao Lan, China. The visually sensible patterns suitable for display on projector 102 and received by mobile TV receiver 706 may be, for example any of text, graphic images or video images such as advertisements, pictures, video clips or movies. It is appreciated that the communication between mobile TV receiver 706 and projector 102 may be either wired or wireless.

It is appreciated that responsive to signals from a subsystem of the vehicle, display control subsystem 120 is preferably operative to instruct projector 102 to continuously display suitable visually sensible patterns received by mobile TV receiver 706 onto rear projection film 111 of rear windshield 104 or to cease displaying visually sensible patterns onto rear projection film 111 of rear windshield 104.

Turning now to FIG. 7B, it is shown that the vehicle projection system 725 includes projector 102, mobile TV receiver 706 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved by mobile TV receiver 706 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Reference is now made to FIG. 8A, which is a simplified pictorial illustration of an example of the use of a vehicle projection system, constructed and operative in accordance with yet another preferred embodiment of the present invention, and to FIG. 8B, which is a simplified block diagram illustration of the vehicle projection system of FIG. 8A. The system of FIGS. 8A & 8B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 8A & 8B preferably employs the fixed semi-opaque configuration of FIG. 1A mounted in vehicle 800. Alternatively, the system of FIGS. 8A & 8B may employ any of the alternate projection configurations illustrated in FIGS. 1B-1E.

As shown in FIG. 8A, a satellite TV receiver 806 communicating with projector 102 is provided for receiving visually sensible patterns suitable for display by projector 102. Satellite TV receiver 106 may be, for example, any suitable commercially available mobile or stationary satellite TV receiver having television receiving capabilities and video output capability such as, for example, an RayCast System commercially available from Raysat Inc. of Vienna, Va. The visually sensible patterns suitable for display on projector 102 and received by satellite TV receiver 806 may be, for example, any of text, graphic images or video images such as advertisements, pictures, video clips or movies. It is appreciated that the communication between satellite TV receiver 806 and projector 102 may be either wired or wireless.

It is appreciated that responsive to signals from a subsystem of the vehicle, display control subsystem 120 is preferably operative to instruct projector 102 to continuously display suitable visually sensible patterns received by satellite TV receiver 806 onto rear projection film 111 of rear windshield 104 or to cease displaying visually sensible patterns onto rear projection film 111 of rear windshield 104.

Turning now to FIG. 8B, it is shown that the vehicle projection system 825 includes projector 102, satellite TV receiver 806 and display control subsystem 120. Display control subsystem 120 preferably communicates with vehicle braking subsystem 122 and with vehicle GPS location subsystem 124. Responsive to triggering signals received from at least one of subsystems 132 and 134, display control subsystem 120 is operative to instruct projector 102 to continuously display suitable visually sensible patterns retrieved by satellite TV receiver 806 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Reference is now made to FIG. 9A, which is a simplified pictorial illustration of an example of the use of a vehicle projection system, constructed and operative in accordance with yet another preferred embodiment of the present invention, and to FIG. 9B, which is a simplified block diagram illustration of the vehicle projection system of FIG. 9A. The system of FIGS. 9A & 9B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 9A & 9B preferably employs the fixed semi-opaque configuration of FIG. 1A mounted in vehicle 900. Alternatively, the system of FIGS. 9A & 9B may employ any of the alternate projection configurations illustrated in FIGS. 1B-1E.

As shown in FIG. 9A, projector 102 is obviated and motor vehicle 100 is instead equipped with a Wi-Fi enabled projector 902 which is trained on a rear windshield 104 of vehicle 100. Alternatively, projector 902 may be trained on any other surface of vehicle 100. Projector 902 may be any suitable multimedia projector having wireless internet capabilities, such as an Epson Powerlite 1775W Multimedia Projector, commercially available from Seiko Epson Corporation of Suwa, Nagano, Japan. Alternatively, projector 902 may be any suitable wireless communication enabled projector.

Wi-Fi enabled projector 902 is also operable for storing and\or downloading and\or streaming visually sensible patterns suitable for display on rear windshield 104. The visually sensible patterns suitable for display on rear windshield 104 and stored and\or downloaded and\or streamed by Wi-Fi enabled projector 902 may be, for example any of text, graphic images or video images such as advertisements, pictures, video clips or movies.

It is appreciated that responsive to signals from a subsystem of the vehicle, display control subsystem 120 is preferably operative to instruct projector 902 to continuously display suitable visually sensible patterns received by Wi-Fi enabled projector 902 onto rear projection film 111 of rear windshield 104 or to cease displaying visually sensible patterns onto rear projection film 111 of rear windshield 104.

Turning now to FIG. 9B, it is shown that the vehicle projection system 925 includes Wi-Fi enabled projector 902, and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct Wi-Fi enabled projector 902 to continuously display suitable visually sensible patterns received thereby onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 10B:
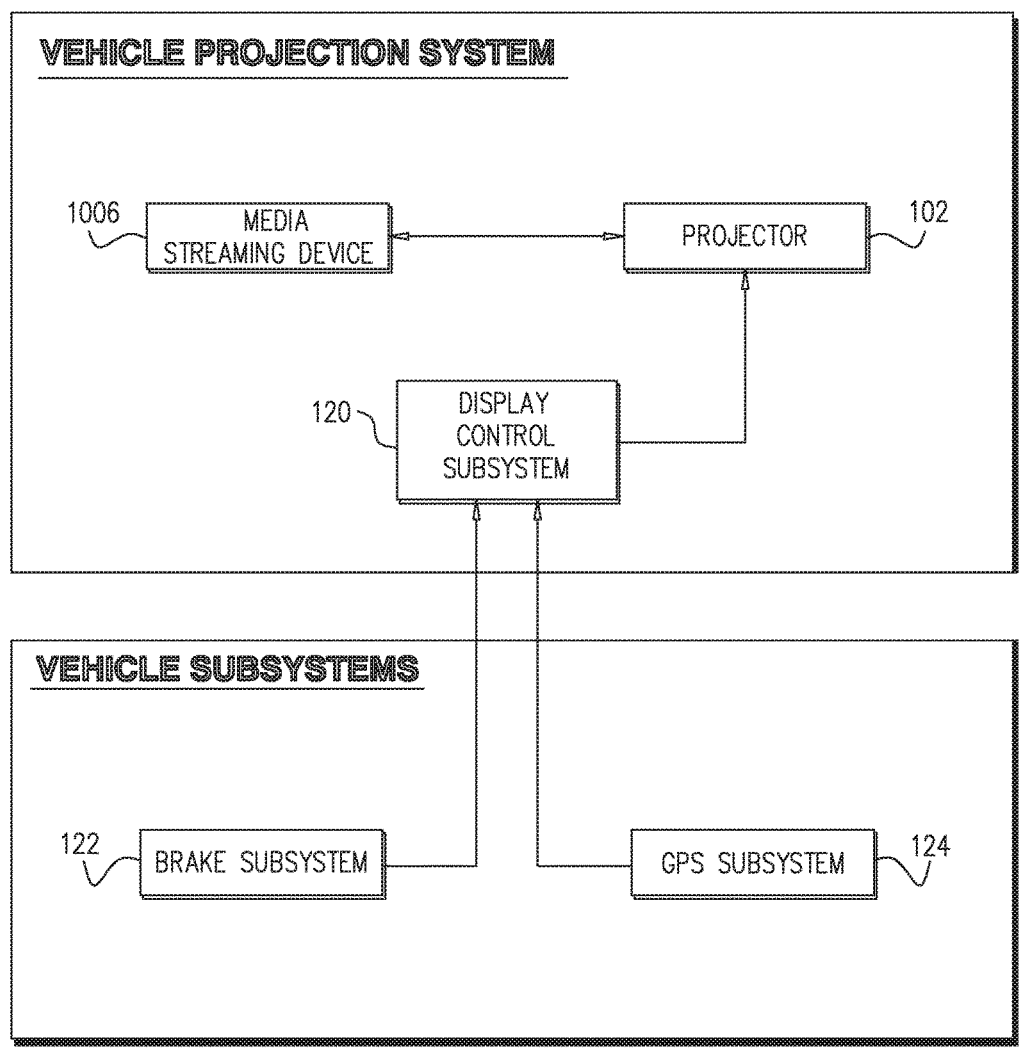
FIG. 10B is a simplified block diagram illustration of the vehicle projection system of FIG. 10A.

Reference is now made to FIG. 10A, which is a simplified pictorial illustration of an example of the use of a vehicle projection system, constructed and operative in accordance with another preferred embodiment of the present invention, and to FIG. 10B, which is a simplified block diagram illustration of the vehicle projection system of FIG. 10A. The system of FIGS. 10A & 10B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 10A & 10B preferably employs the fixed semi-opaque configuration of FIG. 1A mounted in vehicle 1000. Alternatively, the system of FIGS. 10A & 10B may employ any of the alternate projection configurations illustrated in FIGS. 1B-1E.

As shown in FIG. 10A, a digital media streaming device 1006 communicating with projector 102 is provided for streaming visually sensible patterns suitable for display by projector 102. Digital media streaming device 1006 may be, for example, any suitable device having digital media streaming capabilities such as, for example, a TVIX M-6600A/N PLUS commercially available from DVICO Inc. of Seoul, South Korea. The visually sensible patterns suitable for display on projector 102 and streamed by digital media streaming device 1006 may be, for example, any type of text, graphic images or video images such as advertisements, pictures, video clips or movies. It is appreciated that the communication between digital media streaming device 1006 and projector 102 may be either wired or wireless.

It is appreciated that responsive to signals from a subsystem of the vehicle, display control subsystem 120 is preferably operative to instruct projector 102 to continuously display suitable visually sensible patterns retrieved from digital media streaming device 1006 onto rear projection film 111 of rear windshield 104 or to cease displaying visually sensible patterns onto rear projection film 111 of rear windshield 104.

Turning now to FIG. 10B, it is shown that the vehicle projection system 1025 includes projector 102, digital media streaming device 1006 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved from digital media streaming device 1006 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 11A:
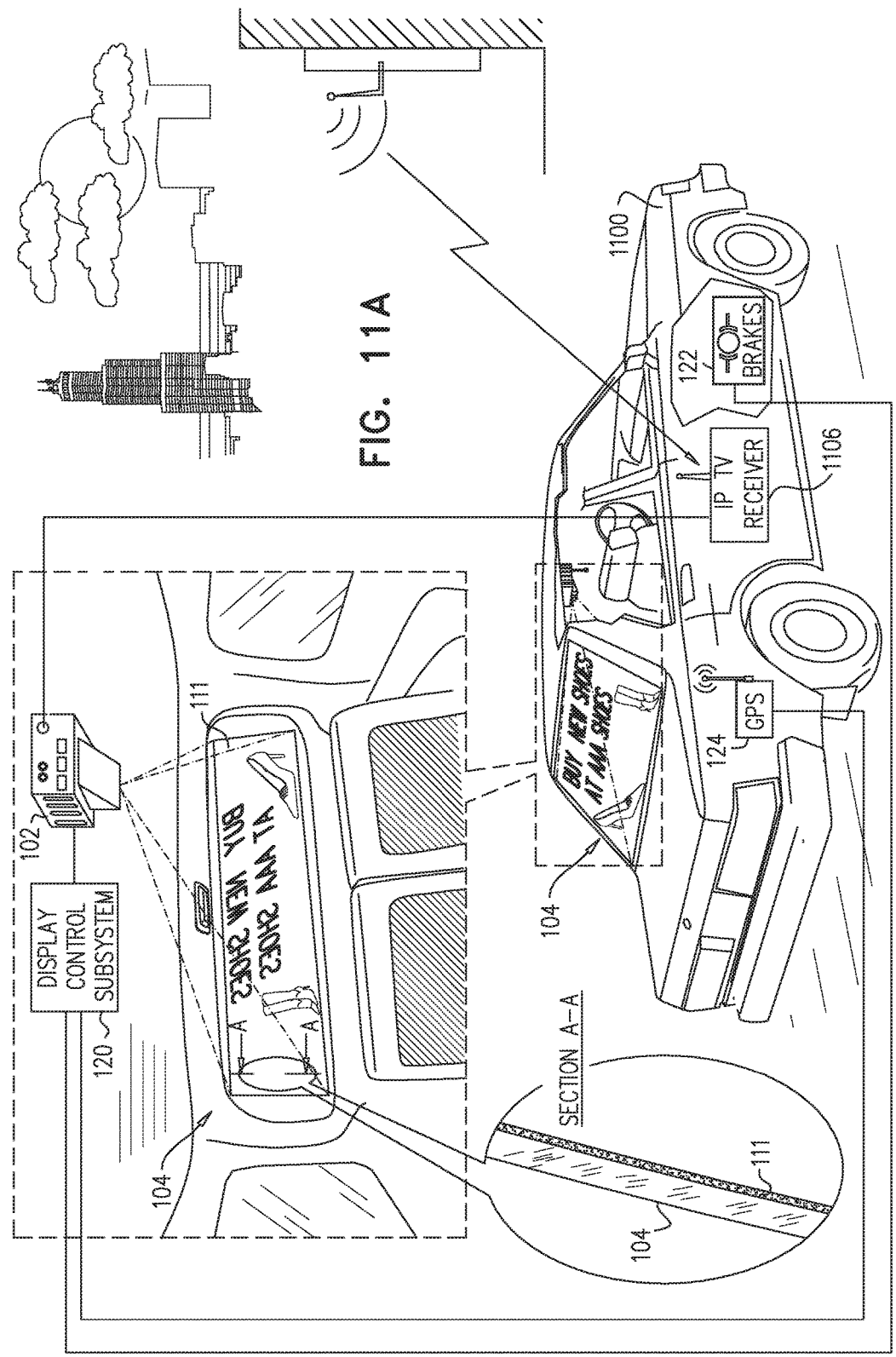
FIG. 11A is a simplified pictorial illustration of an example of the use of a vehicle projection system, constructed and operative in accordance with still another preferred embodiment of the present invention.

Reference is now made to FIG. 11A, which is a simplified pictorial illustration of an example of the use of a vehicle projection system, constructed and operative in accordance with another preferred embodiment of the present invention, and to FIG. 11B, which is a simplified block diagram illustration of the vehicle projection system of FIG. 11A. The system of FIGS. 11A & 11B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 11A & 11B preferably employs the fixed semi-opaque configuration of FIG. 1A mounted in vehicle 1100. Alternatively, the system of FIGS. 11A & 11B may employ any of the alternate projection configurations illustrated in FIGS. 1B-1E.

As shown in FIG. 11A, an IP TV receiver 1106 communicating with projector 102 is provided for receiving visually sensible patterns suitable for display by projector 102. IP TV receiver 1106 may be, for example, any suitable commercially available IP TV receiver having IP TV receiving capabilities and video output capability such as, for example, a Tornado M10 Digital Media Center commercially available from SysMaster Cooperation of Walnut Creek, Calif. The visually sensible patterns suitable for display on projector 1002 and received by IP TV receiver 1106 may be, for example, any of text, graphic images or video images such as advertisements, pictures, video clips or movies. It is appreciated that IP TV receiver 1106 may have wired or wireless reception capabilities. It is also appreciated that the communication between IP TV receiver 1106 and projector 102 may be either wired or wireless.

It is appreciated that responsive to signals from a subsystem of the vehicle, display control subsystem 120 is preferably operative to instruct projector 102 to continuously display suitable visually sensible patterns retrieved from IP TV receiver 1106 onto rear projection film 111 of rear windshield 104 or to cease displaying visually sensible patterns onto rear projection film 111 of rear windshield 104.

Turning now to FIG. 11B, it is shown that the vehicle projection system 1125 includes projector 102, IP TV receiver 1106 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved from IP TV receiver 1106 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 12A:
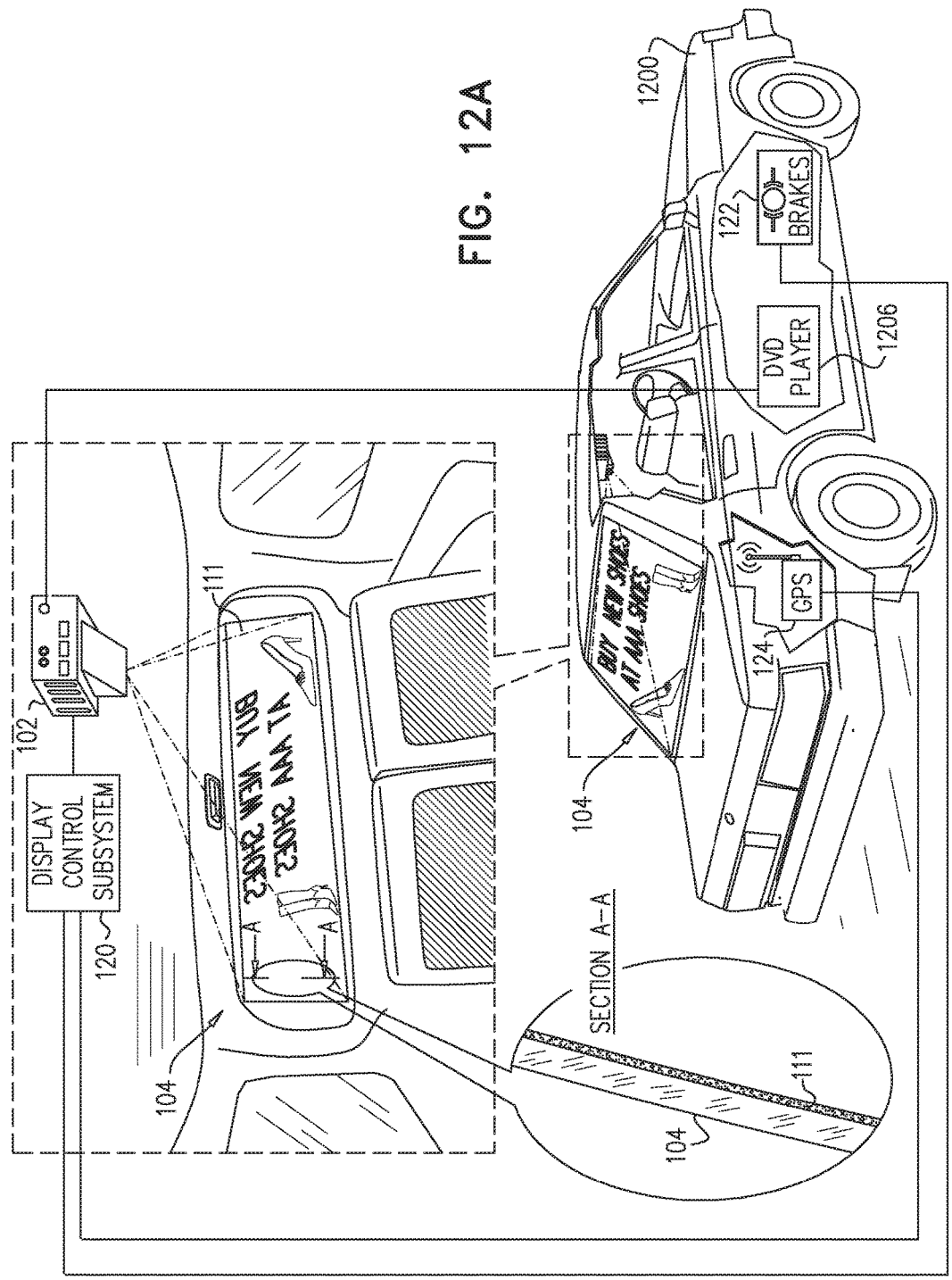
FIG. 12A is a simplified pictorial illustration of an example of the use of a vehicle projection system, constructed and operative in accordance with still another preferred embodiment of the present invention.

Reference is now made to FIG. 12A, which is a simplified pictorial illustration of an example of the use of a vehicle projection system, constructed and operative in accordance with another preferred embodiment of the present invention, and to FIG. 12B, which is a simplified block diagram illustration of the vehicle projection system of FIG. 12A. The system of FIGS. 12A & 12B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 12A & 12B preferably employs the fixed semi-opaque configuration of FIG. 1A mounted in vehicle 1200. Alternatively, the system of FIGS. 12A & 12B may employ any of the alternate projection configurations illustrated in FIGS. 1B-1E.

As shown in FIG. 12A, a DVD player 1206 communicating with projector 102 is provided for providing visually sensible patterns suitable for display by projector 102. DVD player 1206 may be, for example, any suitable commercially available DVD player having DVD media reading capability and video output capability such as, for example, a Sony DVP DVD-5380 commercially available from Sony Cooperation of Tokyo, Japan. The visually sensible patterns suitable for display on projector 102 and provided by DVD player 1206 may be, for example any of text, graphic images or video images such as advertisements, pictures, video clips or movies. It is appreciated that the communication between DVD player 1206 and projector 102 may be either wired or wireless.

It is appreciated that responsive to signals from a subsystem of the vehicle, display control subsystem 120 is preferably operative to instruct projector 102 to continuously display suitable visually sensible patterns retrieved from DVD player 1206 onto rear projection film 111 of rear windshield 104 or to cease displaying visually sensible patterns onto rear projection film 111 of rear windshield 104.

Turning now to FIG. 12B, it is shown that the vehicle projection system 1225 includes projector 102, DVD player 1206 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved from DVD player 1206 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 13A:
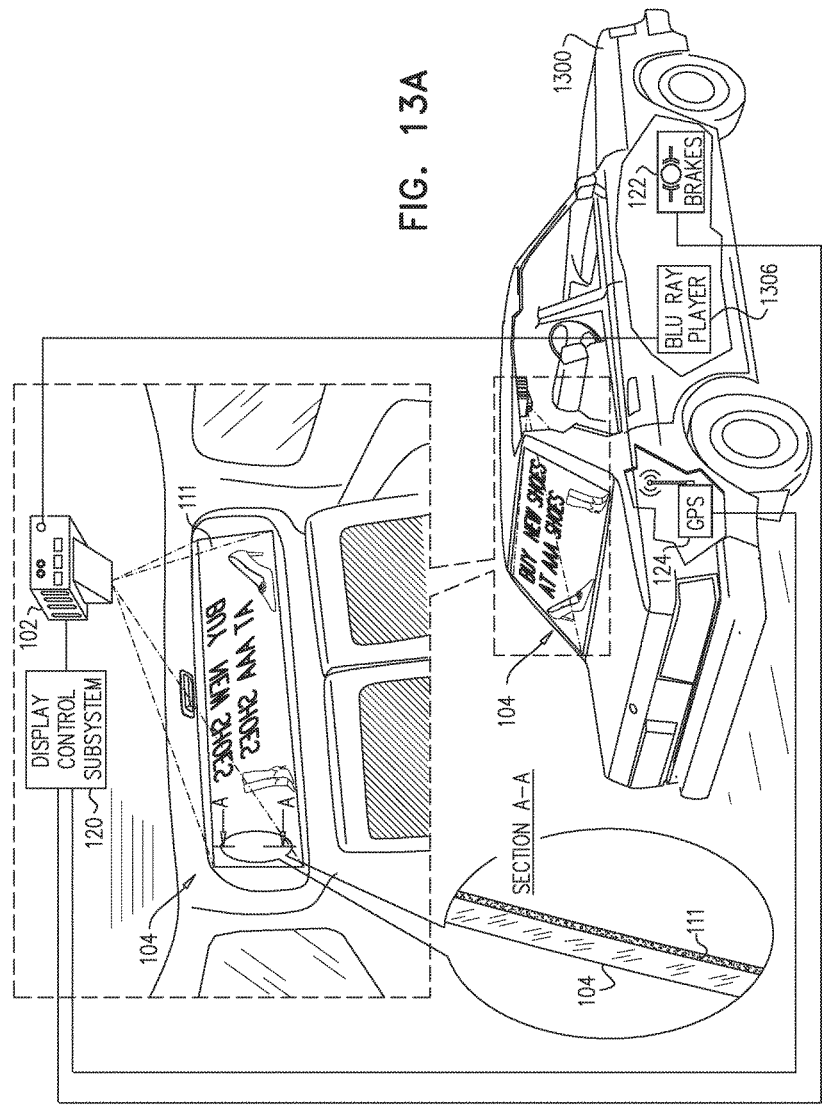
FIG. 13A is a simplified pictorial illustration of an example of the use of a vehicle projection system, constructed and operative in accordance with still another preferred embodiment of the present invention.

Reference is now made to FIG. 13A, which is a simplified pictorial illustration of an example of the use of a vehicle projection system, constructed and operative in accordance with another preferred embodiment of the present invention, and to FIG. 13B, which is a simplified block diagram illustration of the vehicle projection system of FIG. 13A. The system of FIGS. 13A & 13B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 13A & 13B preferably employs the fixed semi-opaque configuration of FIG. 1A mounted in vehicle 1300. Alternatively, the system of FIGS. 13A & 13B may employ any of the alternate projection configurations illustrated in FIGS. 1B-1E.

As shown in FIG. 13A, a Blu-ray player 1306 communicating with projector 102 is provided for providing visually sensible patterns suitable for display by projector 102. Blu-ray player 1306 may be, for example, any suitable commercially available Blu-ray player having Blu-ray media reading capability and video output capability such as, for example, a Sony BDP-5550 commercially available from Sony Cooperation of Tokyo, Japan. The visually sensible patterns suitable for display on projector 102 and provided by Blu-ray player 1306 may be, for example, any of text, graphic images or video images such as advertisements, pictures, video clips or movies. It is appreciated that the communication between Blu-ray player 1306 and projector 102 may be either wired or wireless.

It is appreciated that responsive to signals from a subsystem of the vehicle, display control subsystem 120 is preferably operative to instruct projector 102 to continuously display suitable visually sensible patterns retrieved from Blu-ray player 1306 onto rear projection film 111 of rear windshield 104 or to cease displaying visually sensible patterns onto rear projection film 111 of rear windshield 104.

Turning now to FIG. 13B, it is shown that the vehicle projection system 1325 includes projector 102, Blu-ray player 1306 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved from Blu-ray player 1306 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 14A:
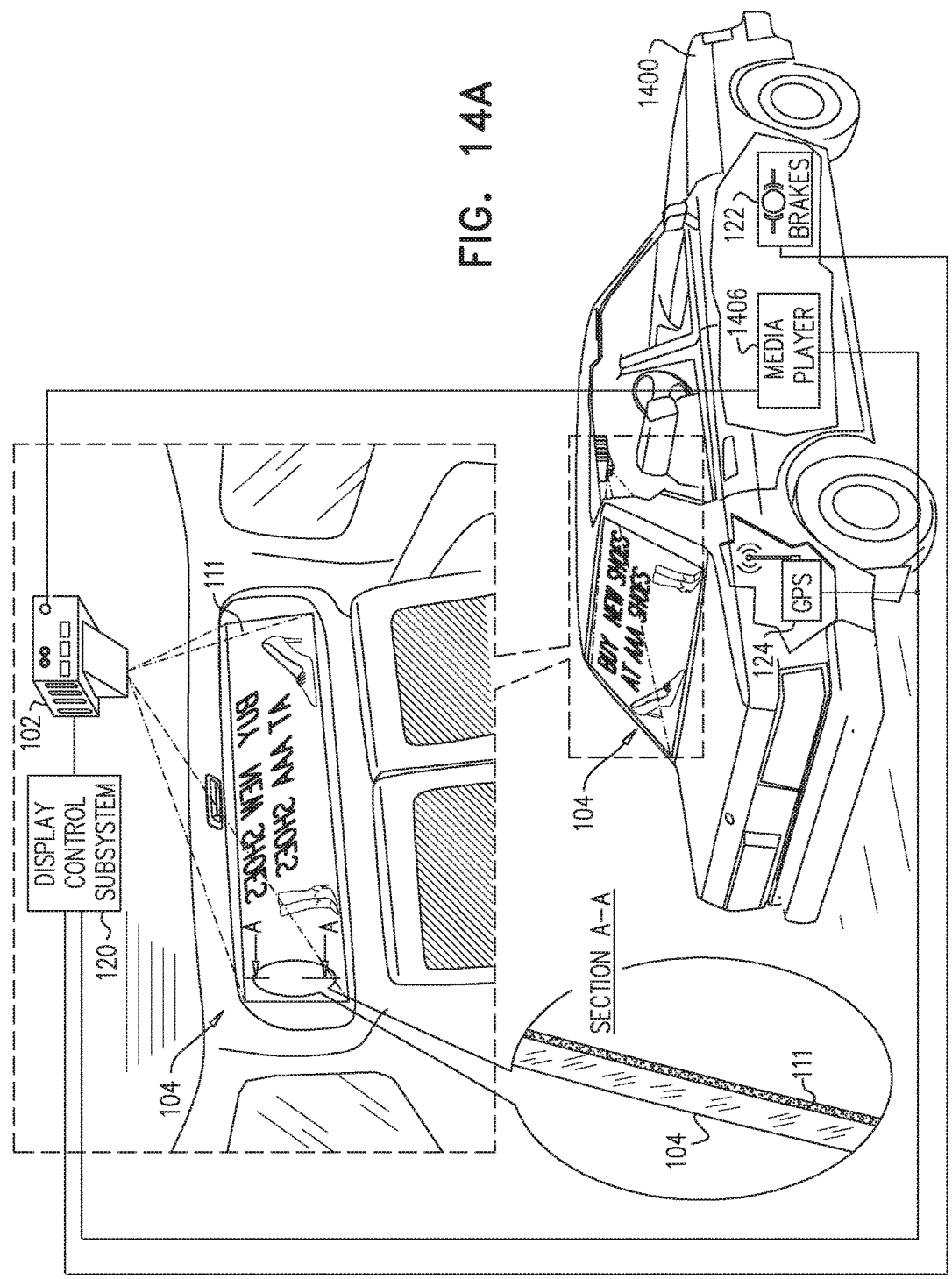
FIG. 14A is a simplified pictorial illustration of an example of the use of a vehicle projection system, constructed and operative in accordance with still another preferred embodiment of the present invention.
Figure 14B:
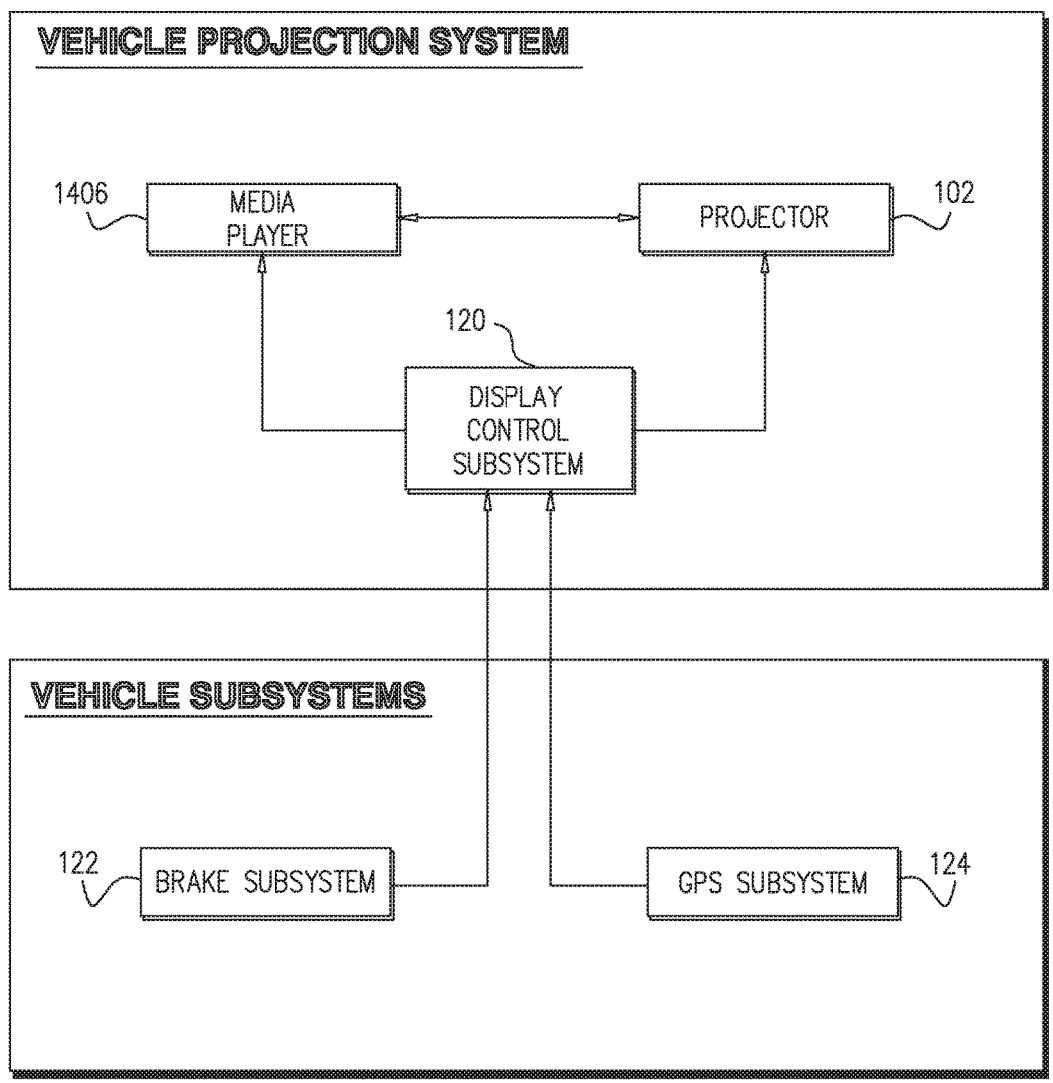
FIG. 14B is a simplified block diagram illustration of the vehicle projection system of FIG. 14A.

Reference is now made to FIG. 14A, which is a simplified pictorial illustration of an example of the use of a vehicle projection system, constructed and operative in accordance with another preferred embodiment of the present invention, and to FIG. 14B, which is a simplified block diagram illustration of the vehicle projection system of FIG. 14A. The system of FIGS. 14A & 14B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 14A & 14B preferably employs the fixed semi-opaque configuration of FIG. 1A mounted in vehicle 1400. Alternatively, the system of FIGS. 14A & 14B may employ any of the alternate projection configurations illustrated in FIGS. 1B-1E.

As shown in FIG. 14A, a media player 1406 having a multi-display synchronization mode and communicating with projector 102 is provided for providing visually sensible patterns suitable for display by projector 102. Media player 1406 may be, for example, any suitable commercially available video and media player preferably having a multi-display synchronization mode and video output capability such as, for example, a Medialon MIP HD Media Player commercially available from Medialon of Chatillon Cedex, France. The visually sensible patterns suitable for display on projector 102 and provided by media player 1406 may be, for example, any of text, graphic images or video images such as advertisements, pictures, video clips or movies. It is appreciated that the communication between media player 1406 and projector 102 may be either wired or wireless.

It is appreciated that responsive to signals from a subsystem of the vehicle, display control subsystem 120 is preferably operative to instruct projector 102 to continuously display suitable visually sensible patterns retrieved from media player 1406 onto rear projection film 111 of rear windshield 104 or to cease displaying visually sensible patterns onto rear projection film 111 of rear windshield 104. It is also appreciated that display control subsystem 120 is also preferably operative to instruct media player 1406 to play a particular track which corresponds to the current position of the vehicle as provided by GPS location subsystem 124. For example, display control subsystem 120 may instruct media player 1406 to play a particular advertisement which corresponds to an establishment in proximity to the current location of the vehicle and \ or to continuously play alternative tracks which correspond to the changing position of the vehicle as the vehicle is in motion.

Turning now to FIG. 14B, it is shown that the vehicle projection system 1425 includes projector 102, media player 1406 and display control subsystem 120. Display control subsystem 120 preferably communicates with vehicle braking subsystem 122 and with vehicle GPS location subsystem 124. Responsive to triggering signals received from at least one of subsystems 122 and 124, display control subsystem 120 is operative to instruct projector 102 to continuously display suitable visually sensible patterns retrieved from media player 1406 onto rear windshield 104 or to cease displaying visually sensible patterns onto rear windshield 104. Triggering signals from braking subsystem 122 may include, for example, an indication that the vehicle's brakes have been engaged or disengaged, or that the speed of the vehicle has exceeded above a predefined threshold or has decreased below a predefined threshold. Triggering signals from GPS location subsystem 124 may include, for example, the current location of the vehicle or the current distance of the vehicle from a predefined location or starting-point.

Figure 15A:
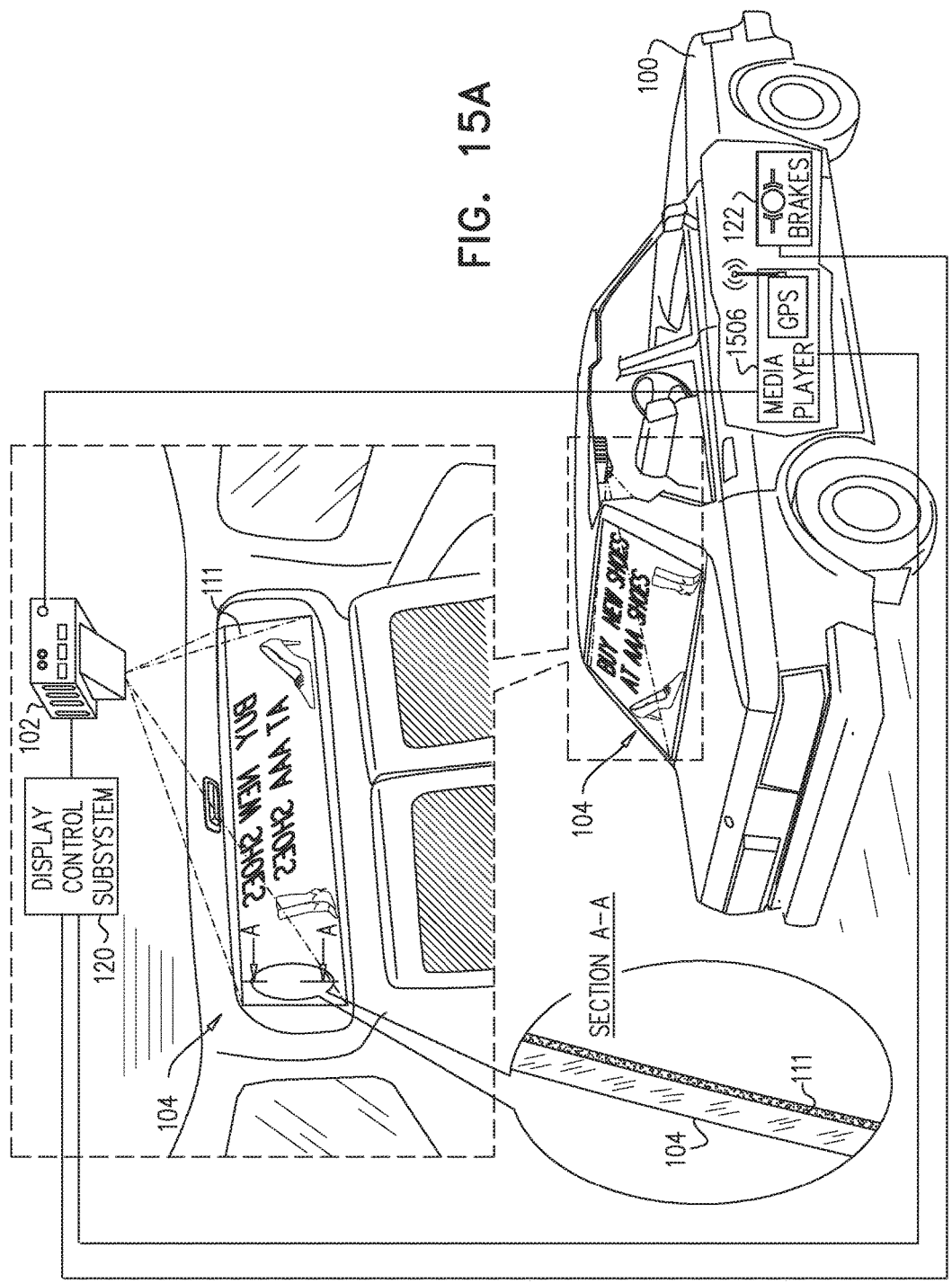
FIG. 15A is a simplified pictorial illustration of an example of the use of a vehicle projection system, constructed and operative in accordance with still another preferred embodiment of the present invention.

Reference is now made to FIG. 15A, which is a simplified pictorial illustration of an example of the use of a vehicle projection system, constructed and operative in accordance with another preferred embodiment of the present invention, and to FIG. 15B, which is a simplified block diagram illustration of the vehicle projection system of FIG. 15A. The system of FIGS. 15A & 15B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 15A & 15B preferably employs the fixed semi-opaque configuration of FIG. 1A mounted in vehicle 1500. Alternatively, the system of FIGS. 15A & 15B may employ any of the alternate projection configurations illustrated in FIGS. 1B-1E.

As shown in FIG. 15A, a GPS enabled media player 1506 communicating with projector 102 is provided for providing visually sensible patterns suitable for display by projector 102. GPS enabled media player 1506 is preferably equipped with an integral GPS locator element. A suitable GPS enabled media player may be, for example, a Digital Video Machine commercially available from Alcorn McBride Inc. of Orlando, Fla. The visually sensible patterns suitable for display on projector 102 and provided by GPS media player 1506 may be, for example, any of text, graphic images or video images such as advertisements, pictures, video clips or movies. It is appreciated that the communication between GPS media player 1506 and projector 102 may be either wired or wireless.

It is appreciated that responsive to signals from a subsystem of the vehicle, display control subsystem 120 is preferably operative to instruct projector 102 to continuously display suitable visually sensible patterns retrieved from GPS media player 1506 onto rear projection film 111 of rear windshield 104 or to cease displaying visually sensible patterns onto rear projection film 111 of rear windshield 104. It is also appreciated that display control subsystem 120 is also preferably operative to instruct GPS media player 1506 to play a particular track which corresponds to the current position of the vehicle as provided by GPS enabled media player 1506. For example, display control subsystem 120 may instruct GPS enabled media player 1506 to play a particular advertisement which corresponds to an establishment in proximity to the current location of the vehicle and \ or to continuously play alternative tracks which correspond to the changing position of the vehicle as the vehicle is in motion.

Alternatively, it is appreciated that a suitable GPS media player 1506, having suitable location based display selection software embedded therewithin, may be operative to play a particular track which corresponds to the current position of the vehicle as provided by an integral GPS locator element of GPS enabled media player 1506. For example, GPS enabled media player 1506 may play a particular advertisement which corresponds to an establishment in proximity to the current location of the vehicle and \ or to continuously play alternative tracks which correspond to the changing position of the vehicle as the vehicle is in motion. Such a suitable GPS media player may be, for example, an iPhone® cellular telephone equipped with an integral GPS locator element, commercially available from Apple® Inc. of Cupertino, Calif., and loaded with suitable location based display selection software such as GoExplore™ Smartphone App commercially available from BarZ Adventures Inc. of Austin, Tex.

Turning now to FIG. 15B, it is shown that the vehicle projection system 1525 includes projector 102, GPS enabled media player 1506 and display control subsystem 120. Responsive to information received from at least one of GPS enabled media player 1506 and vehicle braking subsystem 122, display control subsystem 120 is operative to instruct projector 102 to continuously display suitable visually sensible patterns received from media player 1506 onto rear windshield 104 or to cease displaying visually sensible patterns onto rear windshield 104. Information from braking subsystem 122 may include, for example, an indication that the vehicle's brakes have been engaged or disengaged, or that the speed of the vehicle has exceeded above a pre-defined threshold or has decreased below a predefined threshold. GPS location information may include, for example, the current location of the vehicle or the current distance of the vehicle from a predefined location or starting-point. It is appreciated that the visually sensible patterns may include, for example, an advertisement corresponding to an establishment in proximity to the current location of the vehicle.

Figure 16:
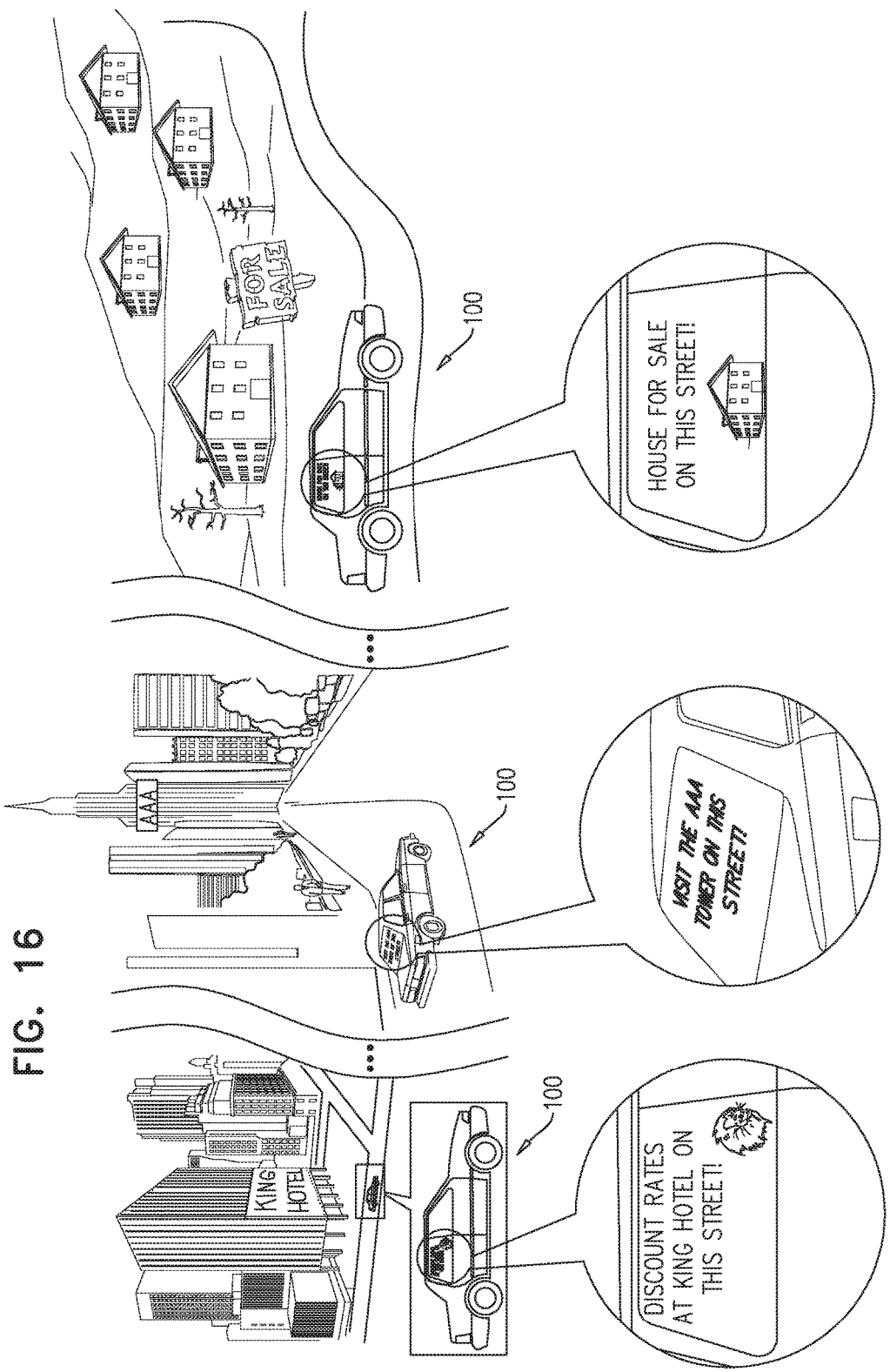
FIG. 16 is a simplified pictorial illustration of one aspect of the use of the vehicle projection systems of FIGS. 14A-15B.

Reference is now made to FIG. 16, which is a simplified pictorial illustration of one aspect of the use of the vehicle projection systems of FIGS. 14A-15B. As shown in FIG. 16, display control subsystem 120 may instruct projector 102 to continuously display alternative patterns which correspond to the changing position of vehicle 100 as vehicle 100 is in motion.

Reference is now made to FIG. 17A, which is a simplified pictorial illustration of an example of the use of a vehicle projection system, constructed and operative in accordance with another preferred embodiment of the present invention, and to FIG. 17B, which is a simplified block diagram illustration of the vehicle projection system of FIG. 17A. The system of FIGS. 17A & 17B preferably includes a display control subsystem responsive to an operational state of the vehicle, and a display device, in response to an input from the display control subsystem, operative to display a visually sensible pattern onto the surface. Preferably, the visually sensible pattern is visible from the exterior of the vehicle.

The system of FIGS. 17A & 17B preferably employs the fixed semi-opaque configuration of FIG. 1A mounted in vehicle 1700. Alternatively, the system of FIGS. 17A & 17B may employ any of the alternate projection configurations illustrated in FIGS. 1B-1E.

As shown in FIG. 17A, A car DVD player 1706 communicating with projector 102 is provided for providing visually sensible patterns suitable for display by projector 102. Car DVD player 1706 may be, for example, a Clarion MAX676VD multimedia station commercially available from Clarion® of Cleveland, Ohio. The visually sensible patterns suitable for display on projector 102 and provided by car DVD player 1706 may be, for example, any of text, graphic images or video images such as advertisements, pictures, video clips or movies. It is appreciated that the communication between car DVD player 1706 and projector 102 may be either wired or wireless.

Additionally, a sound transducer 1720 mounted on window 104 may be provided for transducing sound corresponding to the visually sensible patterns projected by projector 102 onto side window 104, thereby providing the corresponding sound to viewers located external to vehicle 100.

Turning now to FIG. 17B, it is shown that the vehicle projection system 1725 includes projector 102 and car DVD player 1706 connected thereto. Vehicle projection system 1725 may also include a sound transducer 1720 which receives audio input from car DVD player 1706.

Figure 18C:
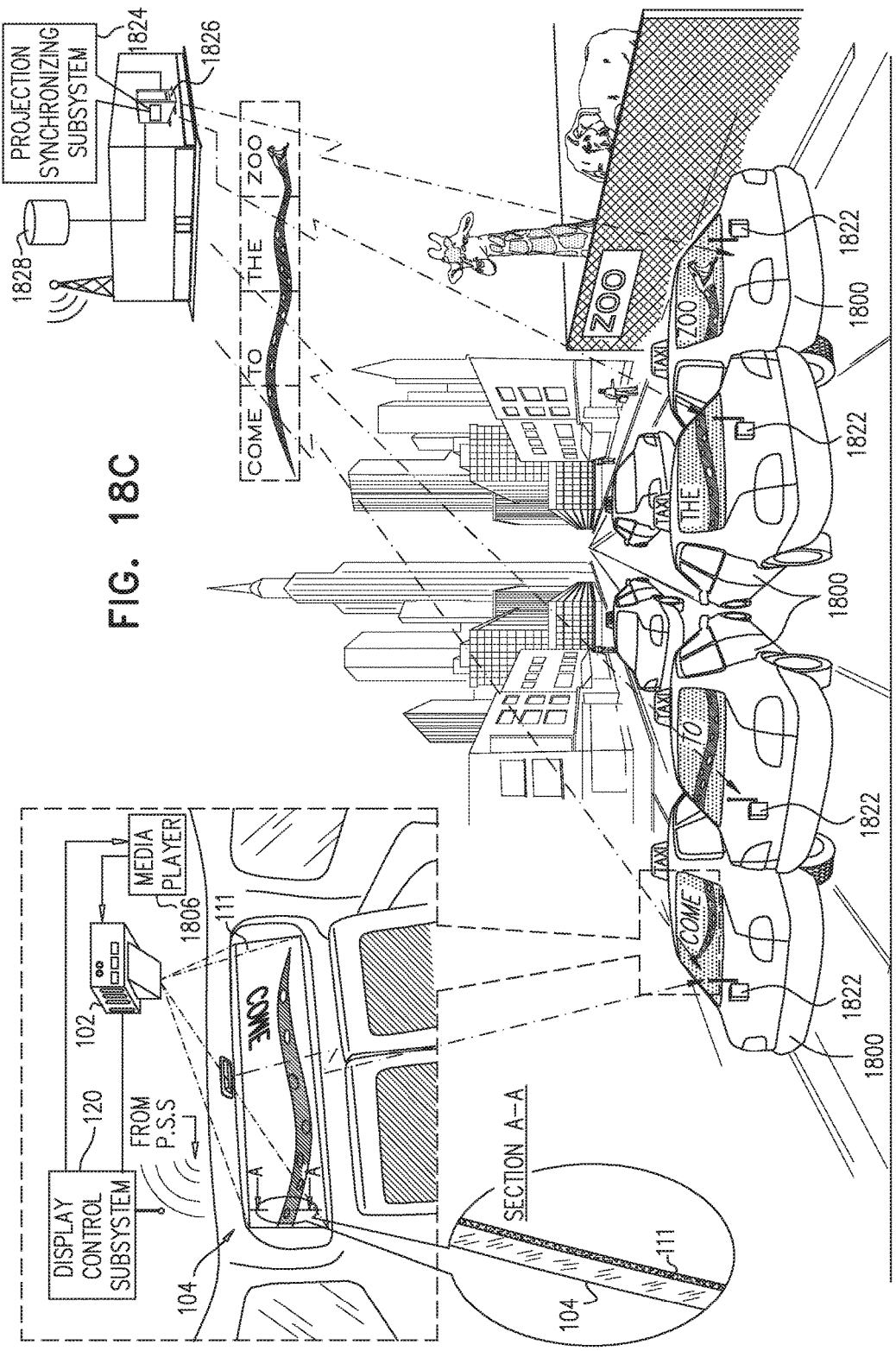
Figure 18D:
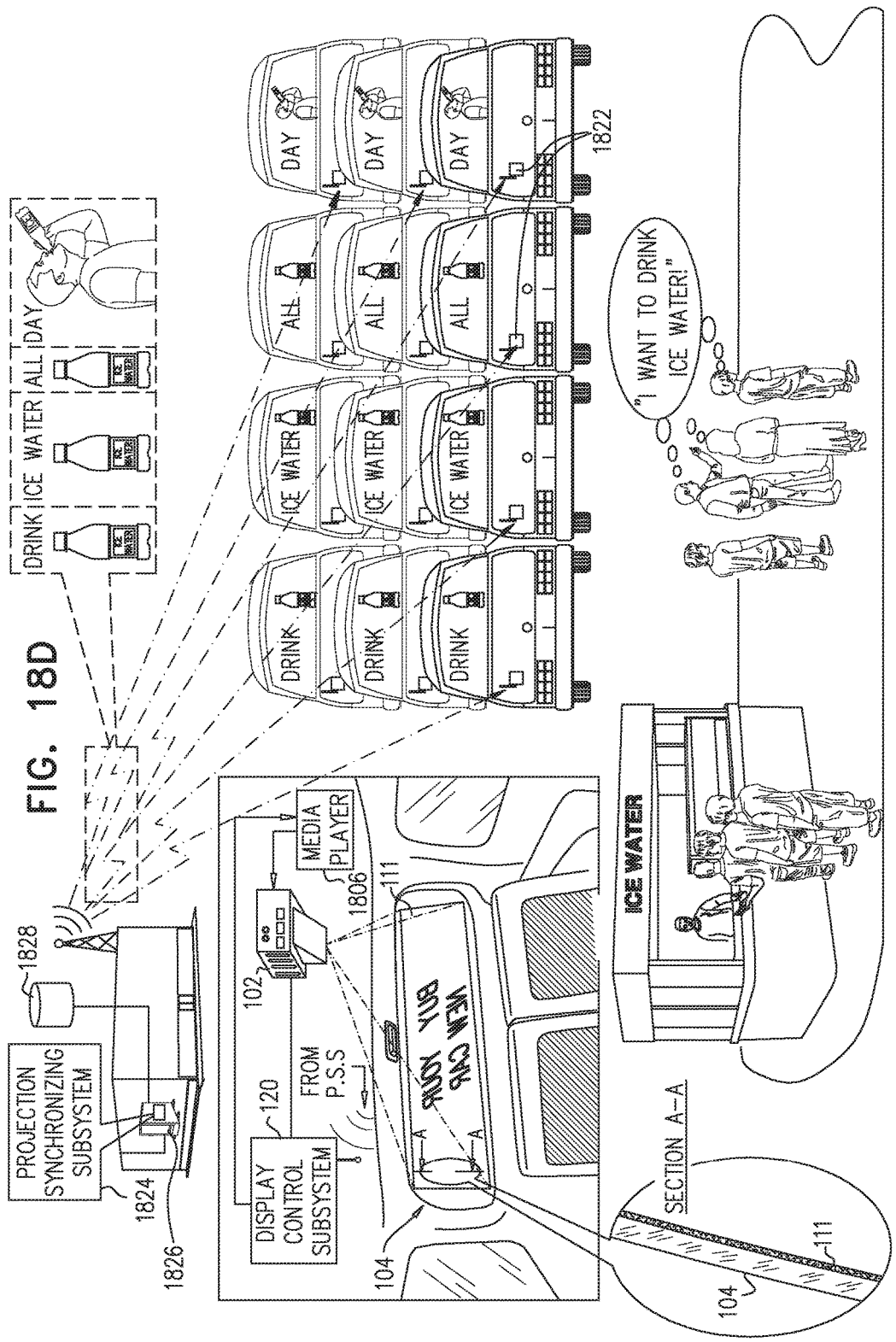
Figure 18F:
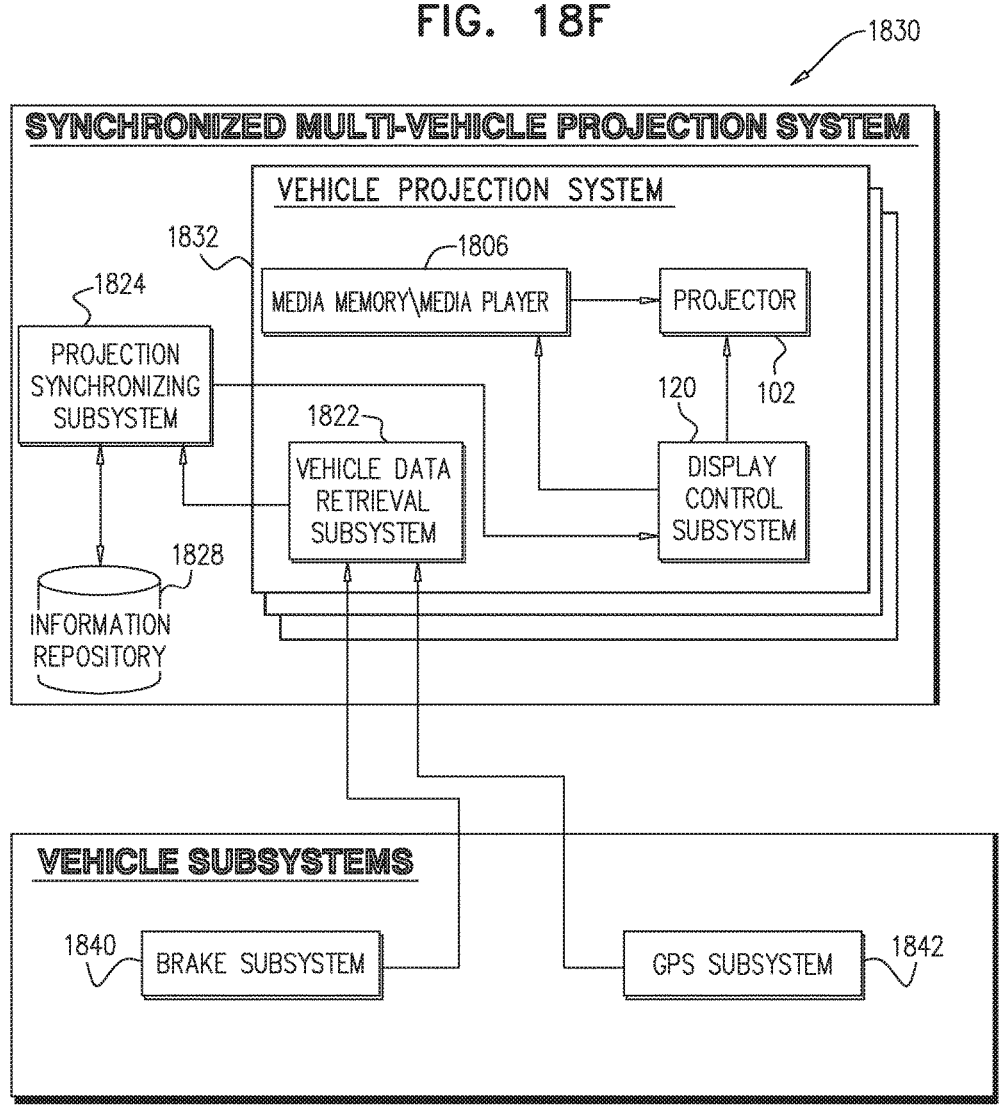
FIG. 18F is a simplified block diagram illustration of the system of FIGS. 18A-18E.
Figure 18G:
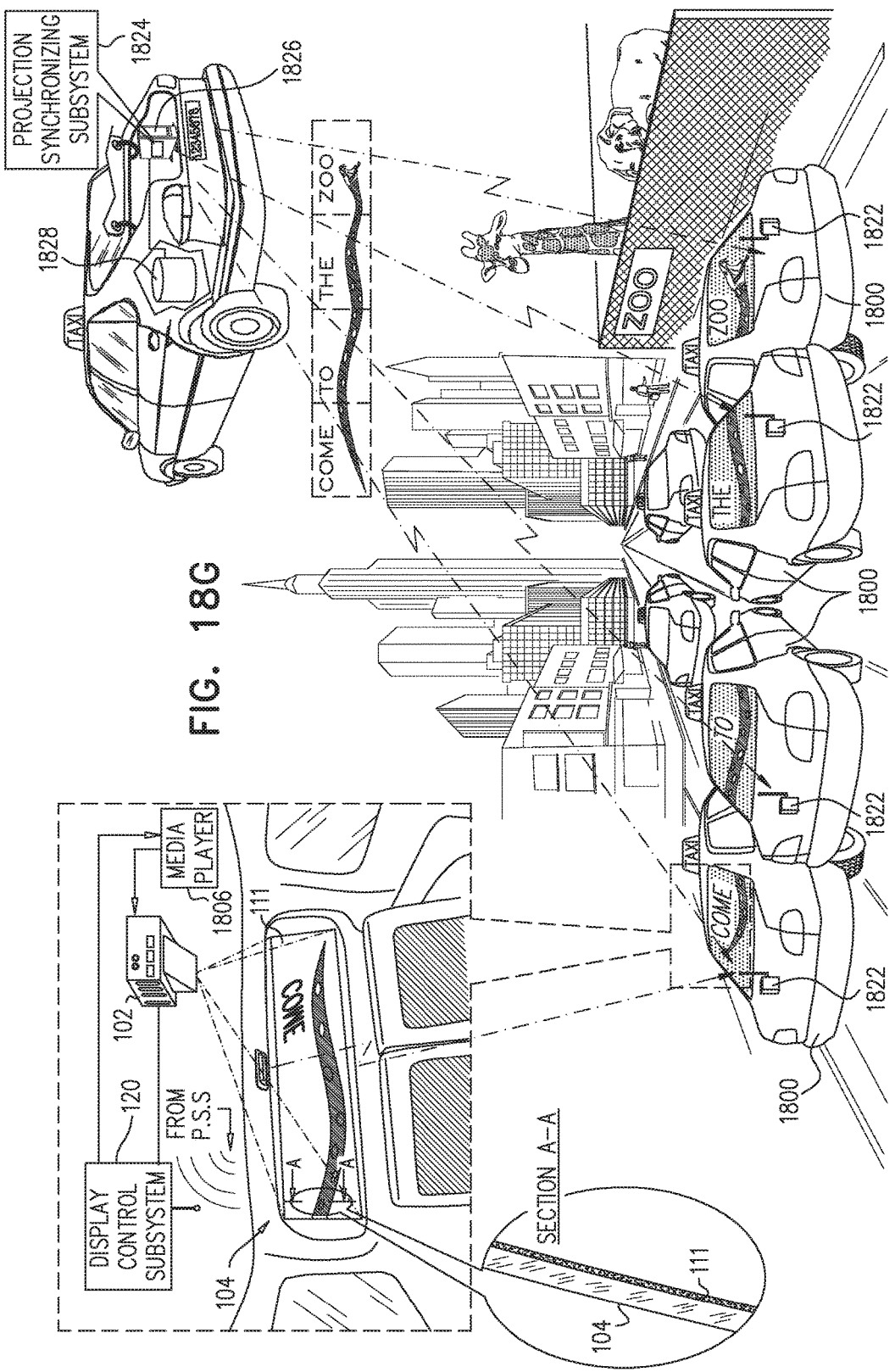
FIG. 18G is a simplified pictorial illustration of an alternative embodiment of the system of FIGS. 18A-18F.

Reference is now made to FIGS. 18A, 18B, 18C, 18D and 18E, which are simplified pictorial illustrations of the use of a system for synchronizing projection of visually sensible patterns onto surfaces of a plurality of vehicles, constructed and operative in accordance with a preferred embodiment of the present invention, to FIG. 18F, which is a simplified block diagram illustration of the system of FIGS. 18A-18E, and to FIG. 18G, which is a simplified pictorial illustration of an alternative embodiment of the system of FIGS. 18A-18F.

The system of FIGS. 18A-18G preferably includes a plurality of vehicle display control subsystems, each of the vehicle display control subsystems being associated with at least one of the plurality of vehicles, each of the vehicle display control subsystems being operative to collect data pertaining to an operational state of a corresponding one of the plurality of vehicles, a plurality of display devices, each of the display devices being operative, in response to an input from a corresponding one of the display control subsystems, to display a visually sensible pattern onto at least one of the surfaces, and a display synchronizing subsystem operative in response to the data received from the plurality of vehicle display control subsystems to employ at least one of the plurality of vehicle display control subsystems to instruct at least one display device associated therewith to display a visually sensible pattern onto at least one of the surfaces.

The plurality of motor vehicles 1800 illustrated in each of FIGS. 18A-18G each employ the fixed semi-opaque configuration of FIG. 1A. Alternatively, any of the plurality of motor vehicles 1800 may employ any of the alternate projection configurations illustrated in FIGS. 1B-1E.

As shown in FIG. 18A, a vehicle media memory player 1806 is preferably provided in each of vehicles 1800 for storing visually sensible patterns suitable for display by projector 102 mounted therewithin and for communicating therewith. Vehicle media memory player 1806 may be, for example, any of the media memory or media player devices described hereinabove with regard to the examples of FIGS. 1A-17B. The visually sensible patterns suitable for display on projectors 102 and stored on vehicle media memory players 1806 may be, for example, any of text, graphic images or video images such as advertisements, pictures, video clips or movies.

A vehicle data retrieval subsystem 1822 is preferably provided in each of vehicles 1800 for retrieving data from at least one subsystem of vehicle 1800 associated therewith, such as, for example, a braking subsystem or a GPS location subsystem, and to transmit the data to a projection synchronizing subsystem 1824.

Projection synchronizing subsystem 1824, which preferably resides on a computer server 1826, is operative to employ the data received from vehicle data retrieval subsystems 1822 to synchronizely employ each of vehicle display control subsystems 120 to employ at least some of corresponding projectors 102 associated therewith to project visually sensible patterns stored on a media memory players 1806 associated therewith onto at least one surface of a vehicle. Alternatively, the visually sensible patterns may be stored in a repository 1828 connected to computer server 1826 and transmitted to projectors 102. Repository 1828 may be any suitable digital storage device, such as a magnetic or optical storage media.

In the example of FIG. 18A, vehicles 1800 are idle and are parked in a lot of vehicles for sale. Projection synchronizing subsystem 1824 utilizes data received from vehicle data retrieval subsystems 1822 of vehicles 1800, such as vehicle velocity data and GPS location data, to ascertain that all of vehicles 1800 are idle and are parked in close mutual proximity in a lot of vehicles for sale. Projection synchronizing subsystem 1824 therefore instructs each of vehicle display control subsystems 120 to employ at least some of corresponding projectors 102 associated therewith to continuously project an advertisement relating to the purchase of the vehicles. As mentioned hereinabove, the advertisement may be stored on media memory devices 1806, or alternatively, the advertisement may be stored in repository 1828 connected to computer server 1826 and transmitted to projectors 102. It is appreciated that each of projectors 102 may be instructed to project a unique advertisement corresponding to the specific vehicle associated therewith.

As further shown in FIG. 18A, communication between projection synchronizing subsystem 1824 and each of vehicle display control subsystems 120 is wireless. Alternatively, for example, in a case where all of vehicles 1800 are stationary for generally long periods of time, communication between projection synchronizing subsystem 1822 and each of vehicle display control subsystems 120 may be wired.

Turning now to FIG. 18B, it is shown that a group of vehicles 1800 wirelessly communicating with a projection synchronizing subsystem 1824 are in motion along a motorway in close mutual proximity. Projection synchronizing subsystem 1824, which preferably resides on a computer server 1826, utilizes data received from vehicle data retrieval subsystems 1822 of vehicles 1800, such as vehicle velocity data and GPS location data, to ascertain that vehicles 1800 are in close proximity to an establishment to be advertised. Projection synchronizing subsystem 1824 therefore instructs each of vehicle display control subsystems 120 to employ at least some of corresponding projectors 102 associated therewith to simultaneously project an identical advertisement related to establishment onto rear windshields 104 of corresponding vehicles 1800. It is appreciated that the simultaneous projection of an identical advertisement onto an externally visible surface of multiple vehicles which are close mutual proximity is operative to significantly amplify the impact of the advertisement on passer-bys.

As mentioned hereinabove, the advertisement may be stored on media memory devices 1806, or alternatively, the advertisement may be stored in repository 1828 connected to computer server 1826 and transmitted to projectors 102. It is appreciated that each of projectors 102 may be instructed to project a unique advertisement corresponding to the specific vehicle associated therewith.

Alternatively, projection synchronizing subsystem 1824 may instruct any of vehicle display control subsystems 120 associated with corresponding vehicles 1800 to employ at least some of corresponding projectors 102 associated therewith to project an advertisement onto rear windshields 104 of corresponding vehicles 1800, regardless of their location and mutual proximity. Alternatively, projection synchronizing subsystem 1824 may utilize data received from vehicle data retrieval subsystems 1822 of vehicles 1800, such as GPS location data, to instruct vehicle display control subsystems 120 associated with corresponding vehicles 1800 to project traffic information related to the location of corresponding vehicles 1800 onto rear windshields 104 of corresponding vehicles 1800.

Turning now to FIG. 18C, it is shown that a group of vehicles 1800 wirelessly communicating with a projection synchronizing subsystem 1824 are in motion along a motorway in close mutual proximity. Projection synchronizing subsystem 1824, which preferably resides on a computer server 1826, utilizes data received from vehicle data retrieval subsystems 1822 of vehicles 1800, such as vehicle velocity data and GPS location data, to ascertain that vehicles 1800 are in motion in close mutual proximity. Projection synchronizing subsystem 1824 therefore instructs each of vehicle display control subsystems 120 to employ at least some of corresponding projectors 102 associated therewith to each simultaneously project a different segment of a visually sensible pattern onto rear windshields 104 of corresponding vehicles 1800. The visually sensible pattern suitable may be, for example, any of text, a graphic image or a video image such as an advertisement, a picture, a video clip or a movie. It is appreciated that the simultaneous projection of a plurality of segments of a visually sensible pattern onto externally visible surfaces of multiple vehicles which are close mutual proximity is operative to significantly enlarge the area on which the complete visually sensible pattern is viewed by passer-bys.

As mentioned hereinabove, the advertisement may be stored on media memory devices 1806, or alternatively, the advertisement may be stored in repository 1828 connected to computer server 1826 and transmitted to projectors 102.

Turning now to FIG. 18D, it is shown that a vehicle media memory player 1806 is preferably provided in each of vehicles 1800 for storing visually sensible patterns suitable for display by projector 102 mounted therewithin and for communicating therewith. Vehicle media memory player 1806 may be, for example, any of the media memory or media player devices described hereinabove with regard to the examples of FIGS. 1A-17B. The visually sensible patterns suitable for display on projectors 102 and stored on vehicle media memory players 1806 may be, for example, any of text, graphic images or video images such as advertisements, pictures, video clips or movies.

A vehicle data retrieval subsystem 1822 is preferably provided in each of vehicles 1800 for retrieving data from at least one subsystem of vehicle 1800 associated therewith, such as, for example, a braking subsystem or a GPS location subsystem, and to transmit the data to a projection synchronizing subsystem 1824.

Projection synchronizing subsystem 1824, which preferably resides on a computer server 1826, is operative to employ the data received from vehicle data retrieval subsystems 1822 to synchronizely employ each of vehicle display control subsystems 120 to employ at least some of corresponding projectors 102 associated therewith to project visually sensible patterns stored on a media memory players 1806 associated therewith onto at least one surface of a vehicle. Alternatively, the visually sensible patterns may be stored in a repository 1828 connected to computer server 1826 and transmitted to projectors 102. Repository 1828 may be any suitable digital storage device, such as a magnetic or optical storage media.

In the example of FIG. 18D, vehicles 1800 are idle and are parked in a parking lot. Projection synchronizing subsystem 1824 utilizes data received from vehicle data retrieval subsystems 1822 of vehicles 1800, such as vehicle velocity data and GPS location data, to ascertain that all of vehicles 1800 are idle and are parked in close mutual proximity. Projection synchronizing subsystem 1824 therefore instructs each of vehicle display control subsystems 120 to employ at least some of corresponding projectors 102 associated therewith to each simultaneously project a different segment of a visually sensible pattern onto rear windshields 104 of corresponding vehicles 1800. The visually sensible pattern suitable may be, for example, any of text, a graphic image or a video image such as an advertisement, a picture, a video clip or a movie. It is appreciated that the simultaneous projection of a plurality of segments of a visually sensible pattern onto externally visible surfaces of multiple vehicles which are close mutual proximity is operative to significantly enlarge the area on which the complete visually sensible pattern is viewed by passer-bys.

As mentioned hereinabove, the advertisement may be stored on media memory devices 1806, or alternatively, the advertisement may be stored in repository 1828 connected to computer server 1826 and transmitted to projectors 102.

As further shown in FIG. 18D, communication between projection synchronizing subsystem 1824 and each of vehicle display control subsystems 120 is wireless. Alternatively, for example, in a case where all of vehicles 1800 are stationary for generally long periods of time, communication between projection synchronizing subsystem 1822 and each of vehicle display control subsystems 120 may be wired.

Turning now to FIG. 18E, it is shown that a group of vehicles 1800 wirelessly communicating with a projection synchronizing subsystem 1824 are in motion in a stadium. Projection synchronizing subsystem 1824, which preferably resides on a computer server 1826, utilizes data received from vehicle data retrieval subsystems 1822 of vehicles 1800, such as vehicle velocity data and GPS location data, to ascertain that vehicles 1800 are in motion in the stadium. Projection synchronizing subsystem 1824 therefore initially instructs each of vehicle display control subsystems 120 to employ at least some of corresponding projectors 102 associated therewith to each simultaneously project different visually sensible patterns onto rear windshields 104 of corresponding vehicles 1800. The visually sensible patterns may be, for example, any of text, a graphic image or a video image such as an advertisement, a picture, a video clip or a movie.

Thereafter, the group of vehicles 1800 arrive generally simultaneously to a predefined location within the stadium. Projection synchronizing subsystem 1824 utilizes data received from vehicle data retrieval subsystems 1822 of vehicles 1800, such as vehicle velocity data and GPS location data, to ascertain that vehicles 1800 are in close mutual proximity and then preferably instructs each of vehicle display control subsystems 120 to employ at least some of corresponding projectors 102 associated therewith to each simultaneously project a different segment of a visually sensible pattern onto rear windshields 104 of corresponding vehicles 1800 where they are preferably visible to a crowd of spectators. The visually sensible pattern may be, for example, any of text, a graphic image or a video image such as an advertisement, a picture, a video clip or a movie. As described hereinabove, the visually sensible pattern may be stored on media memory device 1806 which may be, for example, any of the media memory or media player devices described hereinabove with regard to the examples of FIGS. 1A-17B. It is appreciated that the simultaneous projection of a plurality of segments of a visually sensible pattern onto externally visible surfaces of multiple vehicles which are close mutual proximity is operative to significantly enlarge the area on which the complete visually sensible pattern is viewed by spectators at the stadium.

As mentioned hereinabove, the advertisement may be stored on media memory devices 1806, or alternatively, the advertisement may be stored in repository 1828 connected to computer server 1826 and transmitted to projectors 102.

Turning now to FIG. 18F, it is shown that a synchronized multi-vehicle projection system 1830 includes a plurality of vehicle projection systems 1832, each of vehicle projection systems 1832 being associated with a vehicle. Each of vehicle projection systems 1832 preferably includes a projector 102, a media memory device 1806, a display control subsystem 120 and a vehicle data retrieval subsystem 1822.

Synchronized multi-vehicle projection system 1830 also preferably includes a projection synchronizing subsystem 1824.

It is appreciated that media memory device 1806 may be, for example, any of the media memory or media player devices described hereinabove with regard to the examples of FIGS. 1A-17B.

Vehicle data retrieval subsystem 1822 preferably communicates with a vehicle braking subsystem 1840 and with a vehicle GPS location subsystem 1842 and to communicate the data to projection synchronizing subsystem 1824. Data from braking subsystem 1840 may include, for example, an indication that the vehicle's brakes have been engaged or disengaged, or that the speed of the vehicle has exceeded above a predefined threshold or has decreased below a predefined threshold. Data from GPS location subsystem 1842 may include, for example, the current location of the vehicle or the current distance of the vehicle from a predefined location or starting-point.

Projection synchronizing subsystem 1824 is preferably operative to employ data received from vehicle data retrieval subsystems 1822 to synchronizely employ each of vehicle display control subsystems 120 to employ at least some of corresponding projectors 102 associated therewith to project visually sensible patterns onto at least one surface of a vehicle. The visually sensible patterns projected by each of projectors 102 may be retrieved from media memory device 1806 associated therewith, or from repository 1828. As described hereinabove, repository 1828 may be any suitable digital storage device, such as a magnetic or optical storage media.

Turning now to FIG. 18G, it is shown that a group of vehicles 1800 wirelessly communicating with a projection synchronizing subsystem 1824 located within one of vehicles 1800 are in motion along a motorway in close mutual proximity. Projection synchronizing subsystem 1824, which preferably resides on a computer server 1826, utilizes data received from vehicle data retrieval subsystems 1822 of vehicles 1800, such as vehicle velocity data and GPS location data, to ascertain that vehicles 1800 are in motion in close mutual proximity. Projection synchronizing subsystem 1824 therefore instructs each of vehicle display control subsystems 120 to employ at least some of corresponding projectors 102 associated therewith to each simultaneously project a different segment of a visually sensible pattern onto rear windshields 104 of corresponding vehicles 1800. The visually sensible pattern may be, for example, any of text, a graphic image or a video image such as an advertisement, a picture, a video clip or a movie. It is appreciated that the simultaneous projection of a plurality of segments of a visually sensible pattern onto externally visible surfaces of multiple vehicles which are close mutual proximity is operative to significantly enlarge the area on which the complete visually sensible pattern is viewed by passer-bys.

As mentioned hereinabove, the advertisement may be stored on media memory devices 1806, or alternatively, the advertisement may be stored in repository 1828 connected to computer server 1826 and transmitted to projectors 102. It is appreciated that each of projectors 102 may be instructed to project a unique advertisement corresponding to the specific vehicle associated therewith.

It is also appreciated that projection synchronizing subsystem 1824 may also be employed by an group of vehicles 1800 organized to arrive generally simultaneously to a predefined location and to synchronizely display segments of a predetermined visually sensible pattern as part of a scheduled event or display. Projection synchronizing subsystem 1824 utilizes data received from vehicle data retrieval subsystems 1822 of vehicles 1800, such as vehicle velocity data and GPS location data, to ascertain that vehicles 1800 are in close mutual proximity and then preferably instructs each of vehicle display control subsystems 120 to employ at least some of corresponding projectors 102 associated therewith to each simultaneously project a different segment of a visually sensible pattern onto rear windshields 104 of corresponding vehicles 1800 where they are preferably visible to a crowd of spectators. The visually sensible pattern may be, for example, any of text, a graphic image or a video image such as an advertisement, a picture, a video clip or a movie. As described hereinabove, the visually sensible pattern may be stored on media memory device 1806 which may be, for example, any of the media memory or media player devices described hereinabove with regard to the examples of FIGS. 1A-17B.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for displaying visually sensible patterns onto at least one surface of a vehicle, the system comprising:
   a vehicle display control subsystem operative to collect data pertaining to an operational state of said vehicle; and
   a display device, operative in response to an input from said vehicle display control subsystem, to display a visually sensible pattern onto said at least one surface,
   said at least one surface comprising at least one activatable rear projection surface,
   said vehicle display control subsystem controlling activation and deactivation of said at least one activatable rear projection surface responsive to said operational state of said vehicle.

2. A system for displaying visually sensible patterns onto at least one surface of a vehicle according to claim 1 and wherein said visually sensible pattern is visible from the exterior of said vehicle.

3. A system for displaying visually sensible patterns onto at least one surface of a vehicle according to claim 1 and wherein said display device is a projector mounted inside said vehicle.

4. A system for displaying visually sensible patterns onto at least one surface of a vehicle according to claim 3 and wherein communication between said vehicle display control subsystem and said projector is at least one of wired and wireless communication.

5. A system for displaying visually sensible patterns onto at least one surface of a vehicle according to claim 1 and wherein said surface of a vehicle is one of an interior surface and an exterior surface of one of a rear windshield and a side window of said vehicle.

6. A system for displaying visually sensible patterns onto at least one surface of a vehicle according to claim 1 and wherein said activatable rear projection surface comprises a surface coated with an activatable rear projection film.

7. A system for displaying visually sensible patterns onto at least one surface of a vehicle according to claim 1 and wherein said activatable rear projection surface comprises a surface formed with an activatable rear projection material embedded therewithin.

8. A system for displaying visually sensible patterns onto at least one surface of a vehicle according to claim 1 and wherein said activatable rear projection surface comprises a frame housing an activatable rear projection film which is mounted in close proximity to one of a rear windshield and a side window of said vehicle.

9. A system for displaying visually sensible patterns onto at least one surface of a vehicle according to claim 1 and wherein said visually sensible pattern comprises at least one of graphic images, video images and text.

10. A system for displaying visually sensible patterns onto at least one surface of a vehicle according to claim 1 and wherein said operational state of said vehicle corresponds to the operational state of a braking system of said vehicle.

11. A system for displaying visually sensible patterns onto at least one surface of a vehicle according to claim 1 and wherein said operational state of said vehicle is ascertained by utilizing location data of said vehicle.

12. A system for displaying visually sensible patterns onto at least one surface of a vehicle according to claim 11 and wherein said location data is received from a GPS location system of said vehicle.

13. A system for displaying visually sensible patterns onto at least one surface of a vehicle according to claim 11 and wherein said location data is received from a GPS location system embedded in a media player.

14. A system for displaying visually sensible patterns onto at least one surface of a vehicle according to claim 1 and wherein said visually sensible pattern comprises data pertaining to an operational state of said vehicle obtained by said display control subsystem from said vehicle.

15. A system for displaying visually sensible patterns onto at least one surface of a vehicle according to claim 1 and wherein said display device comprises internal viewer capabilities and said visually sensible pattern is stored and provided by one of a USB flash drive and a solid state memory device which communicates with said display device.

16. A system for displaying visually sensible patterns onto at least one surface of a vehicle according to claim 1 and also comprising television reception functionality operative to wirelessly obtain said visually sensible pattern via a wireless television broadcasting network.

17. A method for displaying visually sensible patterns onto at least one surface of a vehicle, the method comprising:
   collecting data pertaining to an operational state of said vehicle; and
   in response to said operational state of said vehicle:
      controlling activation and deactivation of at least one activatable rear projection surface associated with said vehicle; and
      displaying a visually sensible pattern onto said at least one activatable rear projection surface.

18. A system for displaying visually sensible patterns onto at least one surface of a vehicle, the system comprising:
   a vehicle display control subsystem operative to collect data pertaining to an operational state of said vehicle; and
   a display device, operative in response to an input from said vehicle display control subsystem, to display a visually sensible pattern onto said at least one surface,
   said at least one surface comprising a deployable semi-opaque projection film mounted in close proximity to at least one of a rear windshield and a side window of said vehicle, and
   said display control subsystem being operative, responsive to said operational state of said vehicle, to deploy and retract said deployable semi-opaque projection film.

19. A system for displaying visually sensible patterns onto at least one surface of a vehicle, the system comprising:
   a vehicle display control subsystem operative to collect data pertaining to an operational state of said vehicle; and
   a display device, operative in response to an input from said vehicle display control subsystem, to display a visually sensible pattern onto said at least one surface,
   said at least one surface comprising a deployable emissive display mounted in close proximity to at least one of a rear windshield and a side window of said vehicle, and
   said display control subsystem being operative, responsive to said operational state of said vehicle, to deploy and retract said deployable emissive display.

20. A method for displaying visually sensible patterns onto at least one surface of a vehicle, the method comprising:
   collecting data pertaining to an operational state of said vehicle; and
   in response to said operational state of said vehicle:
      controlling deployment and retraction of at least one deployable projection surface associated with said vehicle; and
      displaying a visually sensible pattern onto said at least one deployable projection surface.

* * * * *